United States Patent
Tanaka

(10) Patent No.: US 6,675,377 B1
(45) Date of Patent: Jan. 6, 2004

(54) PROGRAM CONVERSION APPARATUS

(75) Inventor: Hirohisa Tanaka, Higashiosaka (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 607 days.

(21) Appl. No.: 09/658,614

(22) Filed: Sep. 8, 2000

(30) Foreign Application Priority Data

Sep. 13, 1999 (JP) .......................................... 11-259542

(51) Int. Cl.$^7$ ................................................ G06F 9/45
(52) U.S. Cl. ...................... 717/152; 717/136; 717/137; 717/139
(58) Field of Search ................................ 717/136, 137, 717/139, 152

(56) References Cited

U.S. PATENT DOCUMENTS

| | | | | |
|---|---|---|---|---|
| 5,481,712 A | * | 1/1996 | Silver et al. ................. | 717/109 |
| 5,764,991 A | * | 6/1998 | Carcerano ................... | 717/140 |
| 5,983,020 A | * | 11/1999 | Sweeney et al. ............ | 717/141 |
| 6,230,314 B1 | * | 5/2001 | Sweeney et al. ............ | 717/108 |
| 6,367,067 B1 | * | 4/2002 | Odani et al. ................ | 717/154 |
| 6,438,745 B1 | * | 8/2002 | Kanamaru et al. .......... | 717/137 |
| 2001/0001328 A1 | * | 5/2001 | Yoshida et al ................ | 717/5 |
| 2001/0003822 A1 | * | 6/2001 | Hibi et al. .................. | 709/100 |

FOREIGN PATENT DOCUMENTS

JP  10320204  12/1998  ............ G06F/9/44

OTHER PUBLICATIONS

Kuhn et al., An Enabling Optimization for C++ Virtual Functions, 1996, ACM, pp. 420–428.*
Sreedhar et al., A Framework for Interprocedural Optimization in the Presence of Dynamic Class Loading, 2000, ACM, pp. 196–207.*

* cited by examiner

*Primary Examiner*—John Chavis

(57) ABSTRACT

An optimization information attaching apparatus 100 stores a source program including class definitions and a class instruction. The class definitions each include a class, a virtual function and a base class, and the call instruction calls one of the virtual functions. The optimization information attaching apparatus detects a class that is not inherited by another class, and attaches optimization information to the class definition including the detected class. A compiling apparatus 110 reads the call instruction from the source program, judges whether the virtual function belongs to a class that is not inherited by another class by referring to the optimization information in the source program, and generates an executable instruction group for calling the virtual function directly.

20 Claims, 43 Drawing Sheets

FIG. 3 filex.h — 201

```
class X{
    int x;
    public:
    void f(void);
    virtual int g(int a){return a;}
}; ─ 211
``` filey.h — 202

```
#include "filex.h" ─ 221
class Y : public X {
    int y;
    public:
    int g(int a){return a*a;}
}; ─ 222
``` filez.cc — 203

```
#include "filey.h" ─ 231
class Z : public X {          ─ 232
    int y;
    public:
    int g(int a){return a*a*a;}
};
int func(X*obj_x,Y*obj_y,Z*obj_z)  ─ 233
{
    int x, y, z;
    x=obj_x->g(10);   ─ 234 / 234a,235a
    y=obj_y->g(10);   ─ 235
    z=obj_z->g(10);   ─ 236 / 236a
    return x+y+z;     ─ 237
}
```

FIG. 9 filex.h — 201

```
class X{
    int x;
public:
    void f(void);
    virtual int g(int a) {return a;}
};
```
— 211 filey.h — 202a

```
#include "filex.h"      — 221
#pragma_finalclass Y    — 223
class Y : public X {
    int y;
public:
    int g(int a) {return a*a;}
};
```
— 222 filez.cc — 203a

```
#include "filey.h"               — 231
#pragma_finalclass Z             — 234
class Z : public X {             — 211
    int z;
public:
    int g(int a) {return a*a*a;}
};
```
— 232

```
int func(X*obj_x,Y*obj_y,Z *obj_z)
{
    int x, y, z;
    x=obj_x->g(10);
    y=obj_y->g(10);
    z=obj_z->g(10);
    return x+y+z;
}
```
— 233

FIG. 16

| COMMAND NAME | | CALL |
|---|---|---|
| FUNCTION NAME | | g |
| VIRTUAL FUNCTION FLAG | | virtual |
| ARGUMENT LIST - START OBJECT | OBJECT NAME | obj_x |
| | CLASS TYPE | X |
| ARGUMENT LIST - ARGUMENT | ARGUMENT TYPE | int |
| | ARGUMENT VALUE | 10 |

| COMMAND NAME | | CALL |
|---|---|---|
| FUNCTION NAME | | g |
| VIRTUAL FUNCTION FLAG | | virtual |
| ARGUMENT LIST - START OBJECT | OBJECT NAME | obj_y |
| | CLASS TYPE | Y |
| ARGUMENT LIST - ARGUMENT | ARGUMENT TYPE | int |
| | ARGUMENT VALUE | 10 |

| COMMAND NAME | | CALL |
|---|---|---|
| FUNCTION NAME | | g |
| VIRTUAL FUNCTION FLAG | | virtual |
| ARGUMENT LIST - START OBJECT | OBJECT NAME | obj_z |
| | CLASS TYPE | Z |
| ARGUMENT LIST - ARGUMENT | ARGUMENT TYPE | int |
| | ARGUMENT VALUE | 10 |

FIG. 17

```
_func_FP1XP1YP1Z
   ┌ mov (4,R0),R3      ──562
   │ mov (R3),R3        ──563
561┤ mov 10,R4          ──564
   │ jsr (R3)           ──565
   └ mov R0,R5          ──566
   ┌ mov 10,R4          ──572
571┤ jsr_g_1Y           ──573
   └ mov R0,R6
587┤ ┌ mov 10,R4        ──588
   └ jsr_g_1Z           ──589
   ┌ add R5,R6
591┤
   └ add R6,R0
     rts
```

560
561

FIG. 23 filea.h
```
class X {
    int x;
public:
    void f(void);
    virtual int g(int)
    virtual void h(int);
};
class Y : public X {
    int y;
public:
    int g(int);
    void h(int);
    ..
};
``` fileb.h
```
class Z :public Y {
    int z;
public:
    int g(int);
    void h(int);
    ..
};
```

FIG. 27
(a) OBJECT OF class X
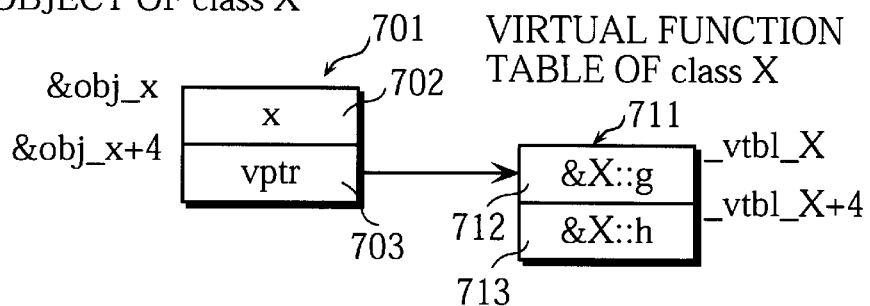
(b) OBJECT OF class Y
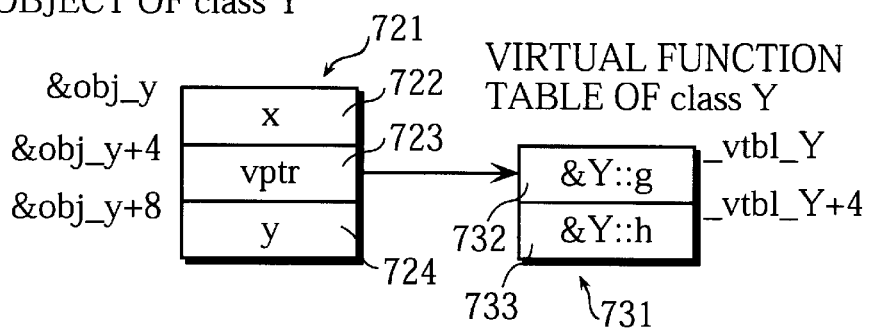
(c) OBJECT OF class Z
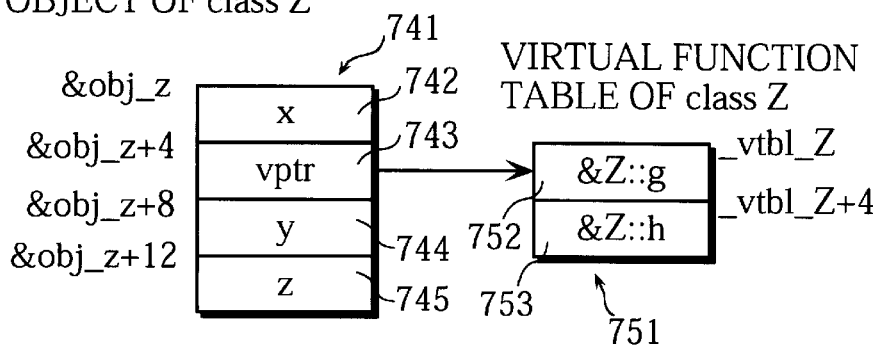

FIG. 28A

```
void func(Z*ptr_z)
{
    ptr_z->g(0);
}
```
781
782

FIG. 28B

```
mov (4,R0),R1
mov (R1),R2
mov 0,R1
jsr (R2)
```
791
792
793
794
795

FIG. 28C

```
mov 0,R1
jsr_g_1Z
```
771
772
773

100a OPTIMIZATION INFORMATION
ATTACHING APPARATUS

OVERRIDDEN SET int X::f(int)

FIG. 39A

NOT OPTIMIZED

```
_func_FP1XP1Y
  mov  R0, R7
  mov  (4, R0), R2
  mov  (R2), R2
  mov  10, R3
  jsr  (R2)
  mov  R0, R4
  mov  R7, R0
  mov  (4, R0), R2
  mov  (4, R2), R2
  mov  10, R3
  jsr  (R2)
  mov  R0, R5
  mov  R1, R7
  mov  (4, R1), R2
  mov  (R2), R2
  mov  10, R3
  jsr  (R2)
  mov  R0, R6
  mov  R7, R1
  mov  (4, R1), R2
  mov  (4, R2), R2
  mov  10, R3
  jsr  (R2)
  add  R4, R5
  add  R5, R6
  add  R6, R0
  rts
```

FIG. 39B

OPTIMIZED

```
_func_FP1XP1Y
  mov  (4, R0), R1
  mov  (R1), R1
  mov  10, R2
  jsr  (R1)
  add  220, R0
  rts
```

PROGRAM CONVERSION APPARATUS

This application is based on an application No. 11-259542 filed in Japan, the content of which is hereby incorporated by reference.

BACKGROUND OF THE INVENTION

1. Field of the Invention

The present invention relates to a program conversion apparatus for converting a source program written in an object-orientated language into an executable program.

2. Description of the Prior Art

The use of object-orientated languages such as C++ and Java (Java is a trademark of Sun Microsystems) in recent software development has caused program development to proceed at an increasingly higher pace.

Such object-orientated languages introduce the concept of a 'class', an abstract data type that binds together a data structure, made up of a set of variables, with a set of routines, performing processing using the data expressed by the data structure. In C++, the data structure is known as a 'data member' and the routine as a 'member function'.

Files 901 and 902 in FIG. 23 show examples of class definitions based on the C++ standard. In the drawing, file 901 includes class definitions 911 and 912 and file 902 include a class definition 913.

The class definition 911 in file 901 includes lines 920 to 924. Line 920 declares the start of the class definition 911 and indicates that its class name is X. Line 921 shows a declaration of a data member, and indicates that class X has an int type member x as a data member. Lines 922 to 924 are declarations of member functions. Line 922 shows that class X has a member function f that has no argument and does not return a return value. Line 923 shows that class X has a function g that has an int type argument and returns an int type return value. Line 924 shows that class X has a function h that has an int type argument and does not return a return value.

The keyword virtual written at the start of the declarations for functions g and h in lines 923 and 924, is a keyword used in C++. This keyword indicates that the relevant member function is a special function known as a 'virtual function'.

FIG. 24 shows the inheritance relationship between the three classes X, Y and Z shown in FIG. 23. As shown in the drawing, class X is inherited by class Y, and class Y by class Z. Here, class X is described as the base class of class Y, and class Y as a derived class of class X. Similarly, class Y is the base class of class Z, and class Z is a derived class of class Y. Furthermore, although class X is not directly inherited by class Z, it is indirectly inherited via class Y. Thus, class X may be referred to as an indirect base class of class Z and class Z as an indirect derived class of class X.

In languages such as C++ and Java, a pointer to a base class is assigned to an address of an object of the base class, so that the pointer to the base class indicates the object of the base class. Furthermore, the pointer to the base class is assigned to an address of an object of a derived class, so that the pointer to the base class can also indicate a derived class object. For example, the pointer to class X can indicate the object of class X, the object of class Y and the object of class Z. Similarly, the pointer to class Y can indicate the object of class Y and also the object of class Z.

In FIG. 25, line 951 shows that an object indicated by a pointer ptr_x belongs to one of the classes X, Y and Z, line 952 shows that an object indicated by a pointer ptr_y belongs to one of the classes Y and Z, and line 953 shows that an object indicated by a pointer ptr_z belongs to the class Z.

Here, a called function dynamically determined at execution according to the type of object shown by the pointer is referred to as a virtual function. An example of coding used when a function to be executed is dynamically determined by the object indicated by the pointer is shown in FIG. 26.

In the drawing, line 961 shows that a function g is called via the pointer ptr_x to class X. When the pointer ptr_x indicates the object for class X, a function g in class X is executed, and when it indicates the object for class Z, a function g in class Z is executed. Line 962 shows that a function g is called via the pointer ptr_y to class Y. When the pointer ptr_y indicates the object for class Y, a function g in class Y is executed, and when it indicates the object for class Z, a function g in class Z is executed. Line 963 shows that a function g is called via the pointer ptr_z to class Z, and executes a function g in class Z.

A declaration of a virtual function in a derived class, as in FIG. 23, lines 931 and 941, must be performed using the same function name, argument type and return type as the virtual function declared in the base class.

In order to express this kind of special function call, a virtual function table is generated for a class when a virtual function is declared in that class. The virtual function table stores the addresses of all the virtual functions declared in the class. Furthermore, an object for a class in which a virtual function is declared holds a pointer to the virtual function table as one of its members. The pointer to the virtual function table is generated implicitly by a compiler.

FIG. 27 shows examples of objects for classes declaring a virtual functions and structures for virtual function tables. In an object obj_x 701 shown in FIG. 27A, an area 702 shown by a start address &obj_x stores a member x, and an area 703 shown by a next address &obj_x+4 stores a pointer to a virtual function table for class X. Furthermore, an area 712 shown by the pointer to the virtual function table for class X, is the start of a virtual function table 711 for class X. A start address of the virtual function table 711, in other words an area 712 shown by _vtbl_X, stores an address of a virtual function g in class X. An area 713 shown by a next address _vtbl_X+4 stores an address of a virtual function h in class x.

Furthermore, FIG. 27B similarly shows an object obje_y 721 of class Y, structured from an area 722 storing a member x, an area 723 storing a pointer to a virtual function table for class Y, and an area 724 storing a member y. A virtual function table 731 for class Y is structured from an area 732 storing an address of a virtual function g in class Y, and an area 733 storing an address of a virtual function h in class Y.

FIG. 27C similarly shows an object obj_z 741 for class Z, structured from an area 742 storing a member x, an area 743 storing a pointer to a virtual function table for class Z, an area 744 storing a member y, and an area 745 storing a member z. A virtual function table 751 for class Z is structured from an area 752 storing an address of a virtual function g in class Z, and an area 753 storing an address of a virtual function h in class Z.

Calling virtual functions is performed in the following way.

First, a pointer to a virtual function table in an object is obtained. Next, a pointer to a call function is obtained from the virtual function table. Finally, the function is called indirectly using the pointer to the function.

If the pointer to class X indicates the object for class X when this processing is performed, a virtual function in class X is called, since the pointer to the virtual function table indicates a virtual function table for class X. If the pointer indicates the object for class Y, the pointer to the virtual function table indicates a virtual function table for class Y, so a virtual function in class Y is called. If, however, the pointer indicates the object for class Z, the pointer to the virtual function table indicates a virtual function table for class Z, so a virtual function in class Z is called.

FIG. 28A shows a source program 781 for calling a virtual function using C++, and FIG. 28B shows an executable program 791 generated based on the source program 781. In the drawing, line 782 shows a call for a function g via a pointer ptr_z to class Z. Line 792 is an instruction for obtaining a pointer to a virtual function table inside an object. Line 793 is an instruction for obtaining a pointer to a call function from the virtual function table. Line 794 is an instruction for setting an argument value for the function. Line 795 is an instruction for calling the function.

On the other hand, suppose that the function written in the source program 781 shown in FIG. 28A is not a virtual function. The resulting executable program generated based on the source program 781 in this case is shown in FIG. 28C. In the drawing, line 772 is an instruction for setting an argument value for a function, and line 773 is an instruction for calling the function.

However, when a virtual function call is converted to an executable program, the number of executable instructions generated is greater than when a function that is not virtual is called. This means that the time taken to execute the virtual function call may be longer.

SUMMARY OF THE INVENTION

The object of the present invention is to overcome the above problem by providing a program conversion apparatus that reduces the number of execution instructions generated when converting into an executable program virtual function calls present in special circumstances in a program written in object-orientated language.

In order to achieve the above object, the present invention may be a program conversion apparatus that generates at least one executable instruction from a source program written in an object-orientated programming language. This program conversion apparatus may include the following. A storage unit stores the source program including a plurality of class definitions and a call instruction having a function name, each class definition defining a class, an inheritance relationship between the class and another class, and a virtual function belonging to the class and identified by the function name. Here, only one of the virtual functions defined in the plurality of class definitions is executed when the call instruction is executed. A judging unit judges whether a single virtual function from the virtual functions can be determined as the virtual function identified by the function name in the call instruction, judgement performed by referring to the source program without executing the call instruction. A generating unit generates, when a single function is determined, an executable instruction for calling directly an executable instruction group corresponding to the single virtual function.

In the above construction, if a single virtual function identified by the function name in the call instruction can be determined, an executable instruction group for calling the virtual function directly is generated. This enables the number of executed executable instructions to be reduced, and increases the generating efficiency of the executable program. Here, the judging unit may judge whether a single virtual function can be determined by using the class definitions to judge whether a virtual function identified by the function name in the call instruction belongs to a class that is not inherited by another class, and the generating unit generates the executable instruction when the virtual function belongs to a class that is not inherited by another class.

The above construction judges whether a single virtual function can be determined, by using class definitions to judge whether a virtual function identified by the function name in the call instruction belongs to a class that is not inherited by another class. This ensures that judgement can be performed accurately.

Here, when a class inherits another class, a class definition in the source program stored in the storage means may include the other class, the other class being a base class. Furthermore, the judging unit may include the following. A class extracting unit reads all class definitions included in the source program, extracts classes from the read class definitions, and stores the extracted classes. An inheritance relationship extracting unit reads all class definitions included in the source program, extracts base classes from the read class definitions, and stores the extracted base classes. An inheritance relationship analyzing unit extracts classes from the classes stored in the class extracting means, excluding the base classes stored in the inheritance relationship extracting unit, and stores the extracted classes. An optimization information attaching unit attaches optimization information to the source program stored by the storage unit when the source program includes a class definition including a class stored in the inheritance relationship analyzing unit. Then, a class judging unit judges, using the optimization information attached to the source program, whether a virtual function identified by the function name in the call instruction belongs to a class that is not inherited by another class.

The above construction attaches optimization information indicating that a class is not inherited by another class to the source program including class definitions. This means that if the source program is reused, the process for attaching optimization information can be omitted.

Here, the optimization information attaching means attaches optimization information to the source program so as to correspond to class definitions that define classes stored by the inheritance relationship analyzing unit.

The above construction attaches optimization information so as to correspond to class definitions including classes stored in the inheritance relationship analyzing unit, enabling such class definitions to be easily extracted.

Here, the optimization information attaching means attaches optimization information to the source program so as to correspond to virtual functions included in class definitions that define classes stored in the inheritance relationship analyzing unit.

The above construction attaches optimization information so as to correspond to virtual functions in class definitions including classes stored in the inheritance relationship analyzing unit, enabling such virtual functions to be easily extracted.

Here, the optimization information is a keyword used in an object-orientated programming language.

In the above construction, the optimization information is a keyword used in an object-orientated programming language, enabling the program to retain its universality, and the optimization information to be recognized by all compilers that can translate the keyword.

Here, the optimization information is a character string unique to the program conversion apparatus.

In the above construction, only a particular compiler apparatus can recognize the optimization information, and other compilers will ignore it, enabling the optimization information for that particular compiler to be held and the authenticity of the program to be maintained.

Here, the program conversion apparatus generates an executable program from the source program by first producing an intermediate program. When a class defined by a class definition in the source program inherits another class, the class definition includes a base class showing the other class. Furthermore, the judging unit includes the following. A class extracting unit reads all class definitions included in the source program, and extracts classes from the read class definitions. An inheritance relationship extracting unit reads all class definitions included in the source program, and extracts base classes from the read class definitions. An inheritance relationship analyzing unit extracts classes from the classes extracted by the class extracting unit, excluding the base classes extracted by the inheritance relationship extracting unit. An intermediate generating unit generates, from the call instruction included in the source program, an intermediate call instruction having a function name. An intermediate judging unit judges whether the virtual function called by the generated intermediate call instruction belongs to a class extracted by the inheritance relationship analyzing unit. Here, the generating unit generates the executable instruction when the virtual function is judged to belong to an extracted class.

The above construction can judge whether a virtual function identified by the function name in the call instruction belongs to a class that is not inherited by another class, without altering the source program, making unified management of the source program easier.

Here, the judging unit judges whether a single virtual function can be determined by using a class definition included in the source program to judge whether a virtual function identified by the function name in the call instruction is overridden. The generating unit generates the executable instruction when the judging means judges that the virtual function is not overridden.

This construction judges whether a single virtual function can be determined by using a class definition included in the source program to judge whether a virtual function identified by the function name in the call instruction is overridden. This ensures that judgement is performed accurately.

Here, when a class defined by a class definition in the source program inherits another class, the class definition includes a base class showing the other class. Furthermore, the judging unit includes an overridden function extracting unit, an optimization information attaching unit, an overridden judging unit and the generating unit. The overridden function extracting unit reads all class definitions included in the source program, extracts overridden virtual functions by using the read class definitions, and includes the following. A reading/judging unit reads a class definition included in the source program, and judges whether the read class definition includes a base class. A first determining unit determines, when a base class is not included in the read class definition, that a virtual function included in the read class definition belongs to the class defined by the read class definition. A second determining unit provisionally determines, when a base class is included in the read class definition, that a virtual function determined to belong to the base class belongs to the class defined in the read class definition. Then, the second determining unit judges whether a virtual function included in the read class definition is identical to the provisionally determined virtual function. If the virtual functions are identical, the second determining unit determines that the virtual function included in the read class definition is to override the provisionally determined virtual function, and extracts the provisionally determined virtual function as an overridden function. Following this, the optimization information attaching unit attaches optimization information showing an extracted overridden function to the source program. Then, the overridden judging unit judges whether an virtual function identified by the function name in the call instruction is an overridden function, using the optimization information attached to the source program, and the generating unit generates the executable instruction when the overridden judging unit judges that the virtual function is an overridden function.

In the above construction, optimization information showing overridden virtual functions is attached to the source program, enabling processing for attaching optimization information to be omitted if such a source program is reused.

Here, the program conversion apparatus generates an executable program from the source program via an intermediate program, each class definition in the source program stored in the storage means including, when a defined class inherits another class, a base class showing another class. Furthermore, the judging unit includes an overridden function extracting unit, an optimization information attaching unit, an intermediate extracting unit, an intermediate judging unit and the generating unit. The overridden function extracting unit reads all class definitions included in the source program, extracts overridden virtual functions by using the read class definitions, and includes the following. A reading/judging unit reads a class definition included in the source program, and judges whether the read class definition includes a base class. A first determining unit determines, when a base class is not included in the read class definition, that a virtual function included in the read class definition belongs to the class defined by the read class definition. A second determining unit provisionally determines, when a base,class is included in the read class definition, that a virtual function determined to belong to the base class belongs to the class defined in the read class definition. Then, the second determining unit judges whether a virtual function included in the read class definition is identical to the provisionally determined virtual function. If the virtual functions are identical, the second determining unit determines that the virtual function included in the read class definition is to override the provisionally determined virtual function, and extracts the provisionally determined virtual function as an overridden function. The intermediate generating unit generates, from the call instruction included in the source program, an intermediate call instruction having a function name. Then, the intermediate judging unit judges whether a virtual function identified by the function name in the generated intermediate call instruction is an overridden function. If the virtual function is judged to be an overridden function, the generating unit generates the executable instruction.

The above construction can judge whether a virtual function identified by the function name in the call instruction is an overridden function without altering the source program, making unified management of the source program easier.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 3 shows examples of files stored in a program storage unit 11;

FIG. 9 shows examples of files stored in the program storage unit 11 after optimization information has been attached;

FIG. 16 shows examples of intermediate code;

FIG. 17 shows examples of an executable program generated by the code generating unit 42;

FIG. 23 shows an example of class definitions based on the C++ language standard;

FIG. 27 shows example structures for class objects in which virtual functions are declared, and virtual function tables;

FIG. 28 shows a source program performing virtual function calls in C++, and executable programs generated based on the source program;

FIG. 30 shows example files stored in program storage unit 11a;

FIG. 34 is a flowchart showing the overall operation of the optimization information attaching apparatus 100a;

FIG. 35 is a flowchart showing the operation of virtual function analysis performed by the optimization information attaching apparatus 100a;

FIG. 36 is a flowchart showing the operation of optimization information attachment performed by the optimization information attaching apparatus 100a;

FIG. 37 is a flowchart showing the operation of syntax analysis performed by the compiling apparatus 110a;

FIG. 38 is a flowchart showing the operation of optimization performed by the compiling apparatus 110a;

FIG. 39A shows executable instructions generated when virtual function calls from a file 1103 are left unaltered;

FIG. 39B shows executable instructions generated from the file 1103 by performing optimization by converting calls for virtual functions that are not overridden to direct calls, and applying inline expansion to the functions;

DESCRIPTION OF THE PREFERRED EMBODIMENTS

I First Ebodiment

The following is an explanation of a program conversion apparatus 120 in a first embodiment of the invention.

Figure 1:
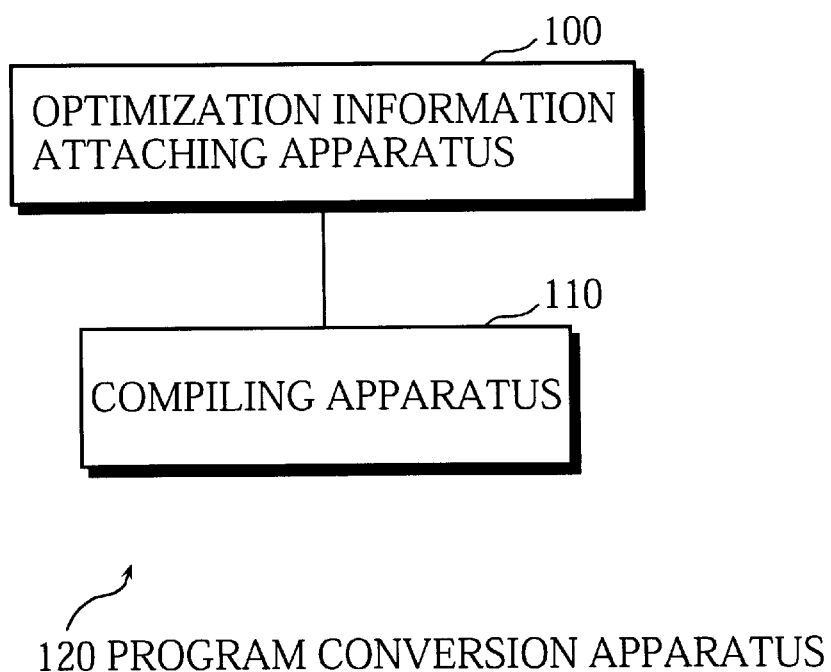
FIG. 1 is a block diagram showing a construction of a program conversion apparatus 120 in a first embodiment of the present invention.

The program conversion apparatus 120 includes an optimization information attaching apparatus 100 and a compiling apparatus 110, as shown in FIG. 1.

1 Optimization Information
Attaching Apparatus 100

The following is an explanation of the optimization information attaching apparatus 100.

1.1 Construction of Optimization Information Attaching Apparatus 100

Figure 2:
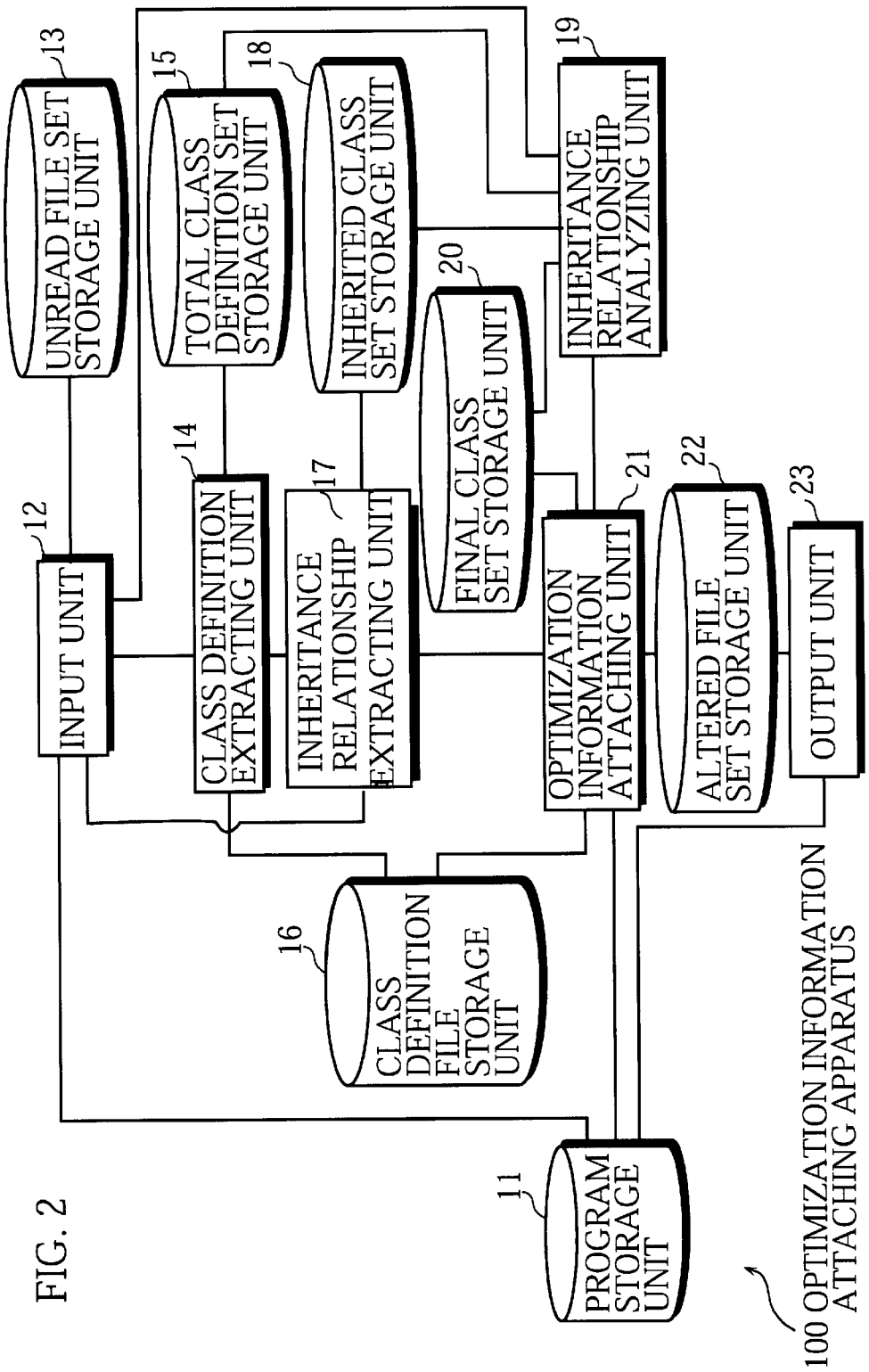
FIG. 2 is a block diagram showing a construction of an optimization information attaching apparatus 100 in the present invention.

The optimization information attaching apparatus 100, as shown in FIG. 2, includes a program storage unit 11, an input unit 12, an unread file set storage unit 13, a class definition extracting unit 14, a total class definition set storage unit 15, a class definition file storage unit 16, an inheritance relationship extracting unit 17, an inherited class set storage unit 18, an inheritance relationship analyzing unit 19, a final class set storage unit 20, an optimization information attaching unit 21, an altered file set storage unit 22, and an output unit 23.

Program Storage Unit 11

The program storage unit 11 stores a source program written based on the C++ standard as a data file.

Examples of such files are shown in FIG. 3. As shown in the drawing, the program storage unit 11 stores files 201, 202 and 203, having the filenames filex.h, filey.h and filez.cc respectively.

The file 201 includes a class definition 211. The file 202 includes an #include line 221 and a class definition 222. The file 203 includes an #include line 231, a class definition 232 and a function definition 233.

Here, a class definition includes a keyword class indicating the start of the class definition, and includes a class name, data member definition, member function definition and the like. A more detailed description of class definitions has been made public in the C++ standard and so further explanation is omitted here.

Note that #include lines have a statement #include indicating the start of an #include line, and a filename. An #include line is a control line indicating that the #include line should be replaced by the content of the filename.

Input Unit 12

Figure 4:
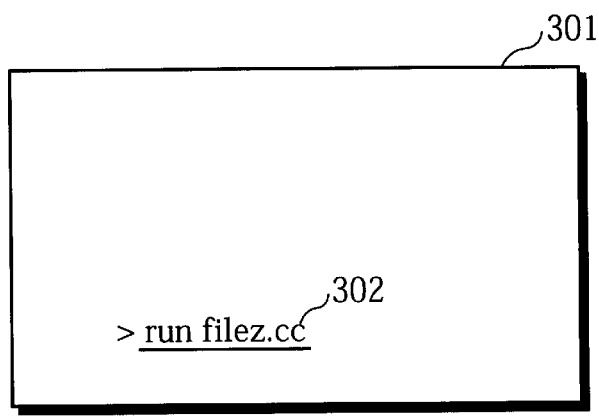
FIG. 4 shows an example of a display showing a character string received as input by an input unit 12.

The input unit 12 receives input of a character string from an operator, and displays the input character string. The input character string includes one command name and at least one filename. FIG. 4 shows an example of a display for an input character string. The input unit 12 displays a character string 302 run filez.cc input by the operator, on a screen 301. Once a character string has been input by the operator, the input unit 12 parses the input character string, generating one command and at least one filename. If the command name is run, the input unit 12 executes the input processing described below, but if the command name is not run, the input unit 12 produces a display indicating that the generated command name contains an error, and waits for the operator to input a character string again. In the example shown in FIG. 4, the input unit 12 receives an input character string run filez.cc, and parses this input character string to generate a command name run and a file name filez.cc. Since the command name is run, the input unit 12 executes the processing described below.

Here, the operator inputs a file name of at least one file. When a class definition defined in the file includes a base class, the operator further inputs a file name of a file including a class definition defining the base class as a class. The operator continues to input file names in the same way until a file no longer includes a base class. The same procedure is carried out for derived classes.

The input unit 12 reads the at least one file having the generated at least one file name from the program storage unit 11, and writes the read at least one file into the unread file set storage unit 13, using the same file name. A set formed from the at least one file written into the unread file set storage unit 13 by the input unit 12 is called the unread file set TF.

In the example shown in FIG. 4, the input unit 12 reads a file having the file name filez.cc from the program storage unit 11, and writes the read file into the unread file set storage unit 13 with the same file name filez.cc. The unread file set TF includes the file having the file name filez.cc. Here, the content of the file having the file name filez.cc is the same as the file 203 shown in FIG. 3.

The input unit 12 reads files stored in the unread file set storage unit 13 one at a time. Here, a read file is f1. The input unit 12 outputs the read file f1 and corresponding file name to the class definition extracting unit 14. In the example of FIG. 4, the input unit 12 reads the file having the file name filez.cc from the unread file set storage unit 13, and outputs the read file and the file name filez.cc to the class definition extracting unit 14.

The input unit 12 judges whether an #include line is included in the read file f1. If an #include line is judged to be included, the input unit 12 obtains the file name in the #include line, and reads a file f2 having the same filename as the obtained file name from the program storage unit 11. The input unit 12 then writes the read file f2 into the unread file set storage unit 13 using the same file name.

In the example in FIG. 4, the input unit 12 judges that the #include line 231 is included in the file 203, obtains the file name filey.h from the #include line 231, reads a file f2 having the same file name as filey.h from the program storage unit 11, and writes the read file f2 in the unread file set storage unit 13 using the file name filey.h.

The input unit 12 deletes the read file f1 from the unread file set.

The input unit 12 repeats reading of a file f1 from the unread file set storage unit 13, judgement of whether an #include line is included in the read file f1, obtaining of a file name from the #include line, if such is present, reading a file f2 having a same file name as that obtained, writing of the read file f2 into the unread file set storage unit 13, and deletion of the read file f1. This processing sequence is repeated until all the files stored in the unread file set storage unit 13 have been read.

Once the input unit 12 has processed all of the files stored in the unread file set storage unit 13, it outputs an operational instruction to the inheritance relationship analyzing unit 19.

Unread File Set Storage Unit 13

The unread file set storage unit 13 stores files read by the input unit 12.

Class Definition Extracting Unit 14

The class definition extracting unit 14 receives a file f1 and corresponding file name from the input unit 12, and obtains all the class definitions defined in the file f1. The set of obtained class definitions is known as DSET, and each class definition included in this set DSET is referred to as element E. The class definition extracting unit 14 outputs the class definition set DSET to the inheritance relationship extracting unit 17.

Figure 5:
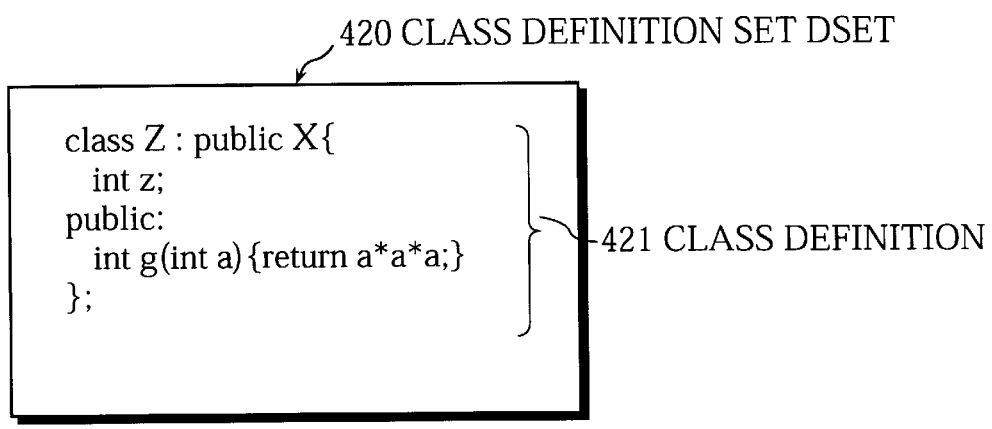
FIG. 5 shows an example of a class definition set DSET 420.

In the above example, as shown in FIG. 5, the class definition extracting unit 14 obtains a class definition 232 defined in the filez.cc, and outputs the obtained class definition 232 to the inheritance relationship extracting unit 17 as an element E in a class definition set DSET. In this example, the class definition set DSET 420 includes one class definition 421. If a plurality of class definitions is included in the file f1, the class definition set DSET will also include a plurality of class definitions.

Next, the class definition extracting unit 14 writes pairs consisting of the class name of each element E from the class definition set DSET, and a file name of the file f1 in which the corresponding element E is defined, into the class definition file storage unit 16.

In the above example, the class definition extracting unit 14 writes a paired class name Z and file name filez.cc into the class definition file storage unit 16.

Furthermore, the class definition extracting unit 14 judges whether each element E of the class definition set DSET is included in the total class definition set TSET stored in the total class set storage unit 15. If an element E is judged not to be included in the total class definition set TSET, the element E is written into the total class definition set TSET. In the above example, the class definition extracting unit 14 judges whether a class definition having the class name Z included as an element E in the class definition DSET is stored in the total class definition set storage unit 15. If the class definition is judged not to be stored in the total class definition set storage unit 15, the class definition extracting unit 14 writes the class definition having the class name Z into the total class definition set TSET as an element E.

Total Class Definition Set Storage Unit 15

The total class definition set storage unit 15 stores the total class definition set TSET. The total class definition set TSET includes class definitions.

Figure 6:
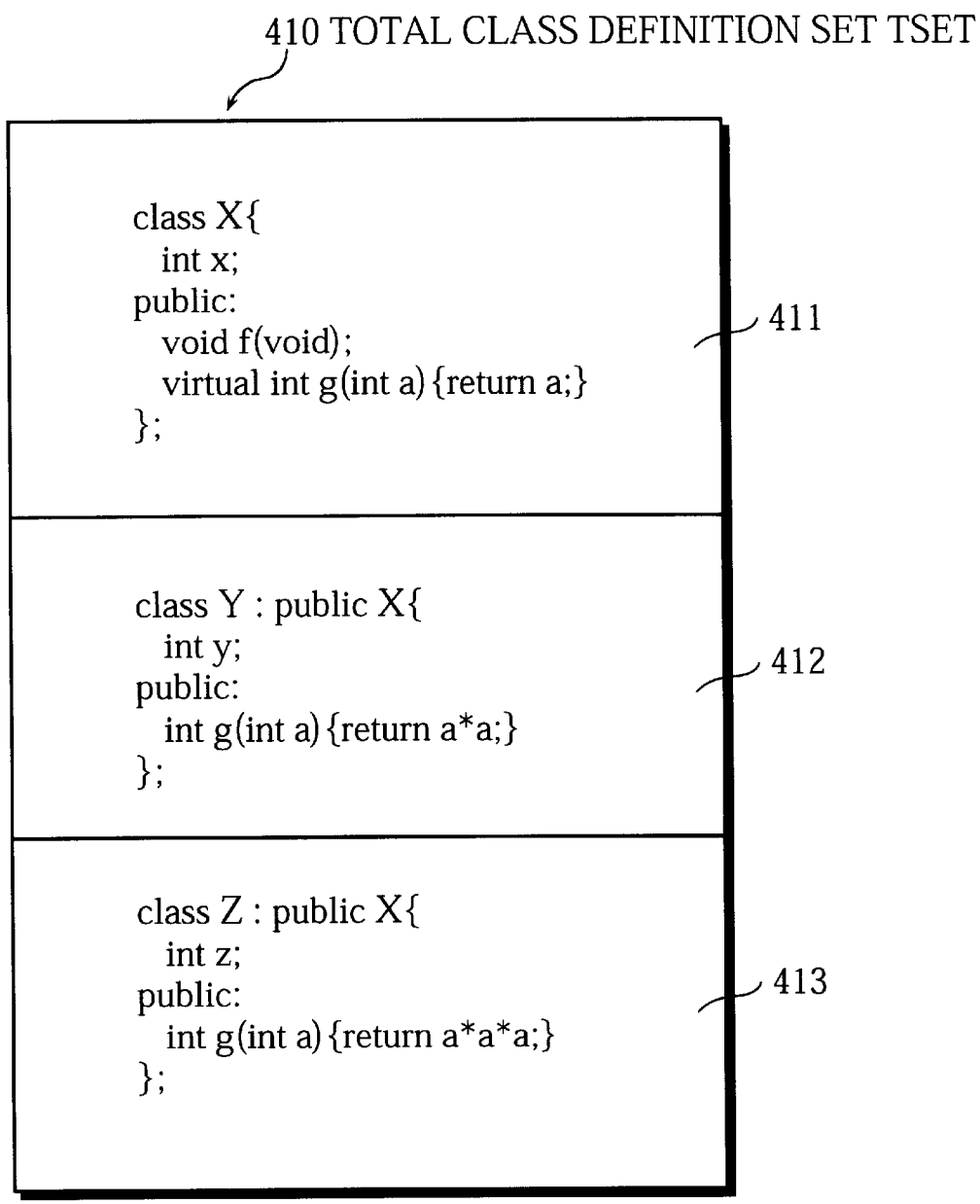
FIG. 6 shows an example of a total class definition set TSET 410.

An example of the total class definition set TSET is shown in FIG. 6. In the drawing, a total class definition set TSET 410 includes class definitions 411, 412 and 413. The class definitions 411, 412 and 413, have the class names X, Y and Z respectively.

Class Definition File Storage Unit 16

The class definition file storage unit 16 stores a class definition file including paired class names and file names.

Figure 7:
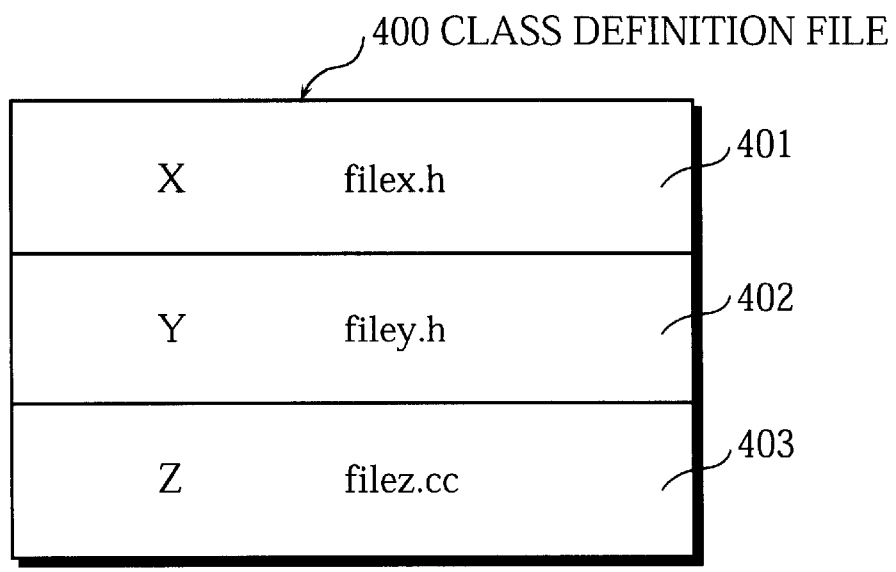
FIG. 7 shows an example of a class definition file.

An example of a class definition file is shown in FIG. 7. In the drawing, a class definition file 400 includes class name and file name pairs 401, 402 and 403. Pair 401 is formed from a class name X and a file name filex.h. Pair 402 is formed from a class name Y and a file name filey.h. Pair 403 is formed from a class name Z and a file name filez.cc.

Inheritance Relationship Extracting Unit 17

The inheritance relationship extracting unit 17 receives a class definition set DSET from the class definition extracting unit 14.

The inheritance relationship extracting unit 17 judges whether any class definitions are included in the received class definition set DSET, and if none are included, ends processing.

If one or more class definitions are included, the inheritance relationship extracting unit 17 obtains a class definition C1 from the class definition set DSET, and judges whether the class defined by the class definition C1 inherits another class.

Judgement of whether the class defined by the class definition C1 inherits another class is performed by checking whether the class definition includes a class name of a base class. If the class name of a base class is included, another class is inherited, but if the class name of a base class is not included, another class is not inherited.

If the inheritance relationship extracting unit 17 judges that the class defined by the class definition C1 inherits another class, the class name of a class defined as a base class in the class definition C1 is written into the inherited class set ISET in the inherited class set storage unit 18.

Next, the inheritance relationship extracting unit 17 deletes the obtained class definition C1 from the received class definition set DSET.

The inheritance relationship extracting unit 17 repeats the processing for obtaining a class definition C1 from the class definition set DSET, determining whether the class defined by the class definition C1 inherits another class, and if the class is judged to inherit another class, writing the class name of the class defined in the class definition C1 as a base class into the inherited class set ISET. The inherited class extracting unit 17 repeats this sequence until no class definitions remain in the class definition set DSET.

Inherited Class Set Storage Unit 18 The inherited class set storage unit 18 stores an inherited class set ISET. The inherited class set ISET includes class names.

Figure 8:
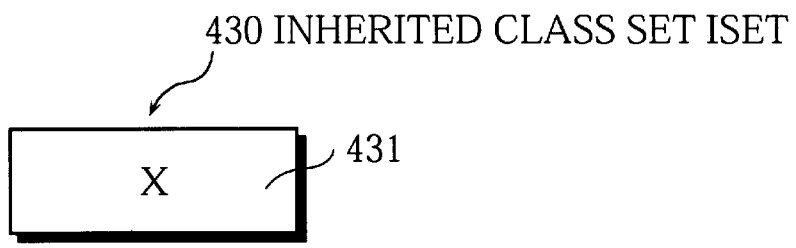
FIG. 8 shows an example of an inherited class set ISET.

An example of the inherited class set ISET is shown as an inherited class set ISET 430 in FIG. 8. The inherited class set ISET 430 includes a class name 431 X.

Inheritance Relationship Analyzing Unit 19

The inheritance relationship analyzing unit 19 receives operational instructions from the input unit 12.

When the inheritance relationship analyzing unit 19 receives an operational instruction from the input unit 12, the total class definition set TSET in the total class definition set storage unit 15 includes all class definitions from all files input into the input unit 12, and from the include files of the input files. Furthermore, the inherited class set ISET in the inherited class set storage unit 18 includes class names of all class definitions that have been inherited by another class from the input files and the include files of the input files. Here, when a file includes an #include line, an include file for the file is a secondary file shown by the file name included in the #include line. Furthermore, if the secondary file includes an #include line, the include file for the file is a tertiary file shown by the file name in the #include line, and so on.

Upon receiving an operational instruction, the inheritance relationship analyzing unit 19 reads all class definitions included in the total class definition set TSET in the total class definition set storage unit 15, and all class names included in the inherited class set ISET in the inherited class set storage unit 18.

Next, the inheritance relationship analyzing unit 19 deletes class definitions shown by all of the class names included in the read inherited class set ISET from all the class definitions included in the read total class definition set TSET. The remaining class definitions are referred to as a final class set FSET.

The inheritance relationship analyzing unit 19 writes the final class set FSET in the final class set storage unit 20.

Final Class Set Storage Unit 20

The final class set storage unit 20 stores the final class set FSET. The final class set FSET includes class definitions.

Optimization Information Attaching Unit 21

The optimization information attaching unit 21 judges whether any class definitions are included in the final class set FSET in the final class set storage unit 20. If no class definitions are included, the processing is ended.

If class definitions are included, the optimization information attaching unit 21 reads a class definition C2 from the final class set FSET, and obtains a class name included in the class definition C2. Next, the optimization information attaching unit 21 reads a file name corresponding to the obtained class name from the class definition file stored in the class definition file storage unit 16, and reads a file f3 shown by the read file name from the program storage unit 11.

The optimization information attaching unit 21 inserts optimization information prior to the class definition recorded in the file f3. This optimization information is a character string formed from a character string #pragma__final class and the obtained class name. Then, the optimization information attaching unit 21 writes the file f3, in which the optimization information has been inserted, into the altered file set storage unit 22, using the same file name as the read file name.

The optimization information attaching unit 21 deletes the read class definition C2 from the final class set.

The optimization information attaching unit 21 repeats processing for reading a class definition C2, reading a file name, reading a file f3, inserting optimization information, writing the file f3 into the altered file set storage unit 22, and deleting the class definition C2. This processing sequence is repeated until no class definitions remain in the final class definition set FSET.

Altered File Set Storage Unit 22

The altered file set storage unit 22 stores files in which optimization information has been inserted.

Output Unit 23

The output unit 23 reads a file stored in the changed file storage unit 22, and replaces a file having the same name stored in the program storage unit 11 with the read file. Here, the output unit 23 changes the file with the same file name originally stored in the program storage unit 11 to a backup file by giving it a different file name.

FIG. 9 shows an example of files stored in the program storage unit 11. As shown in the drawing, the program storage unit 11 stores files 201, 202a, and 203a. The files 202a and 203a are replacement files written by the output unit 23.

Line 223 in the file 202a and line 234 in file 203a are optimization information inserted by the optimization information attaching unit 21.

Line 223 is formed from #pragma__final class and Y, and line 224 is formed from #pragma__final class and Z.

1.2 Operation of Optimization Information Attaching Apparatus 100

The following is an explanation of the optimization information attaching apparatus 100.

Overall Operation of Optimization Information Attaching Unit 100

Figure 10:
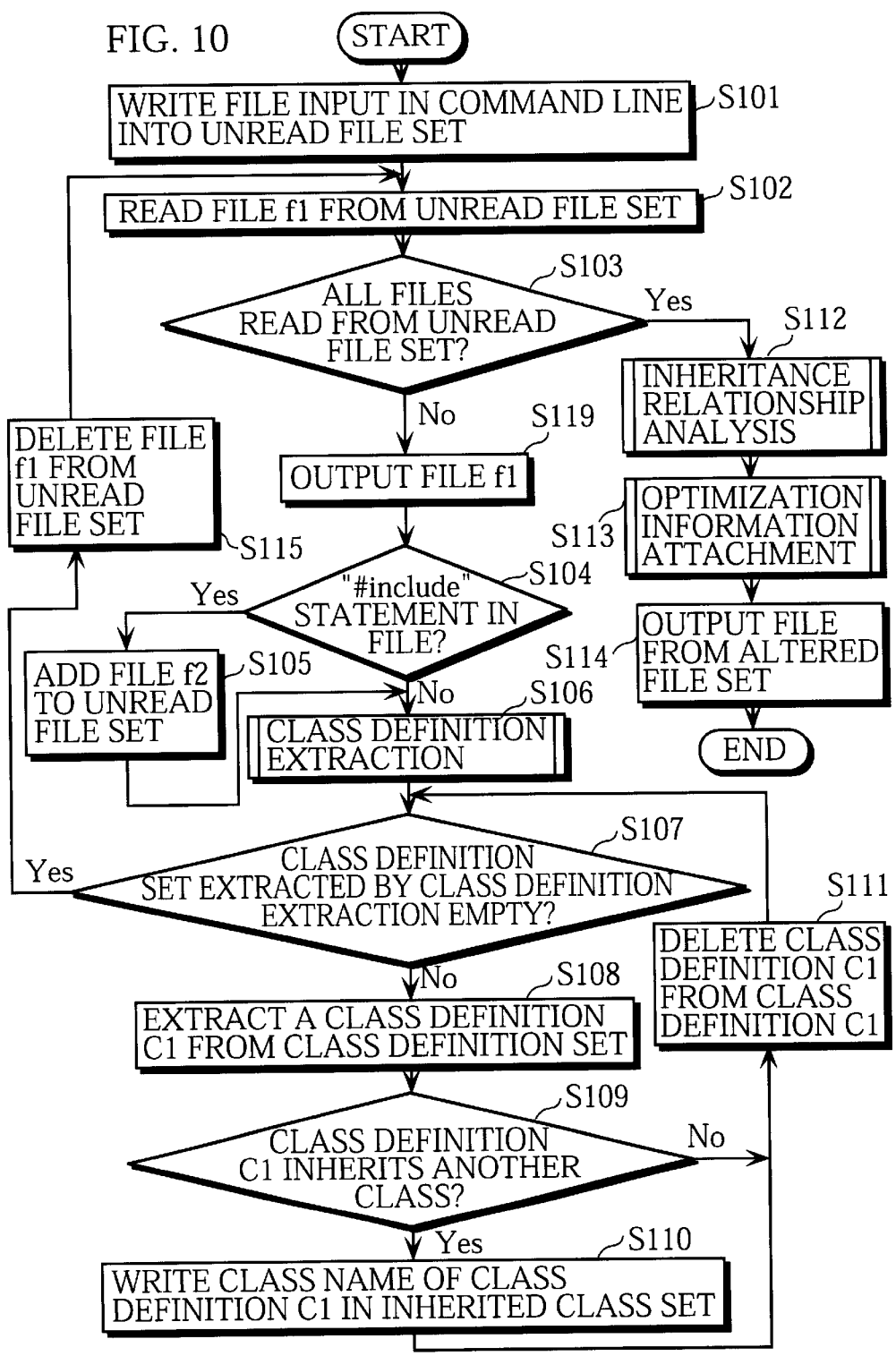
FIG. 10 is a flowchart showing the overall operation of the optimization information attaching apparatus 100.

The overall operation of the optimization information attaching unit 100 is explained with reference to the flowchart of FIG. 10.

The input unit 12 receives an input character string from an operator, reads a file having a file name included in the input character string from the program unit 11, and writes the read file into the unread file set storage unit 13 using the same file name (step S101).

The input unit 12 reads a file f1 stored in the unread file set storage unit 13 (step S102). If the input unit 12 has finished reading all of the files stored in the unread file set storage unit 13 (step S103), the inheritance relationship analyzing unit 19 executes inheritance relationship analysis (step S112), the optimization information attaching unit 21 executes optimization information attachment processing (step S113), and the output unit 23 reads each file stored in the altered file set storage unit 22, and replaces files in the program storage unit 11 having the same file name as each read file with the corresponding read file (step S114). This completes processing.

If the input unit 12 has not finished reading all of the files in the unread file set storage unit 13 (step S103), it outputs a read file f1 and a corresponding file name to the class definition extracting unit 14 (step S119). Then, the input unit 12 judges whether an #include line is included in the file f1, and if such a line is included (step S104), obtains a file name included in the #include line, reads a file f2 having a same file name as the obtained file name from the program storage unit 11, and writes the read file f2 into the unread file set storage unit 13 using the same file name (step S105).

Next, the class definition extracting unit 14 executes class definition extraction processing (step S106). The inheritance relationship extracting unit 17 receives the class definition set DSET from the class definition extracting unit 14, and judges whether any class definitions are included in the class definition set DSET. If no class definitions are included (step S107), the inheritance relationship extracting unit 17 deletes the file f1 from the unread file set (step S115), and returns to step S102, repeating the above processing until all of the files in the unread file set have been read.

If class definitions are included (step S107), the inheritance relationship extracting unit 17 obtains a class definition C1 from the class definition set DSET (step S108). The inheritance relationship extracting unit 17 judges whether the class defined in the class definition C1 inherits another class. If the class defined in the class definition C1 inherits another class (step S109), the inheritance relationship extracting unit 17 writes a class name for a class defined as a base class in the class definition C1 into the inherited class set ISET in the inherited class set storage unit 18 (step S110). Next, the inheritance relationship extracting unit 17 deletes the class definition C1 from the set DSET (step S111), returns to step S107, and repeats the above processing sequence until there are no class definitions remaining in the class definition set DSET.

Operation of Class Definition Extracting Unit 14

Figure 11:
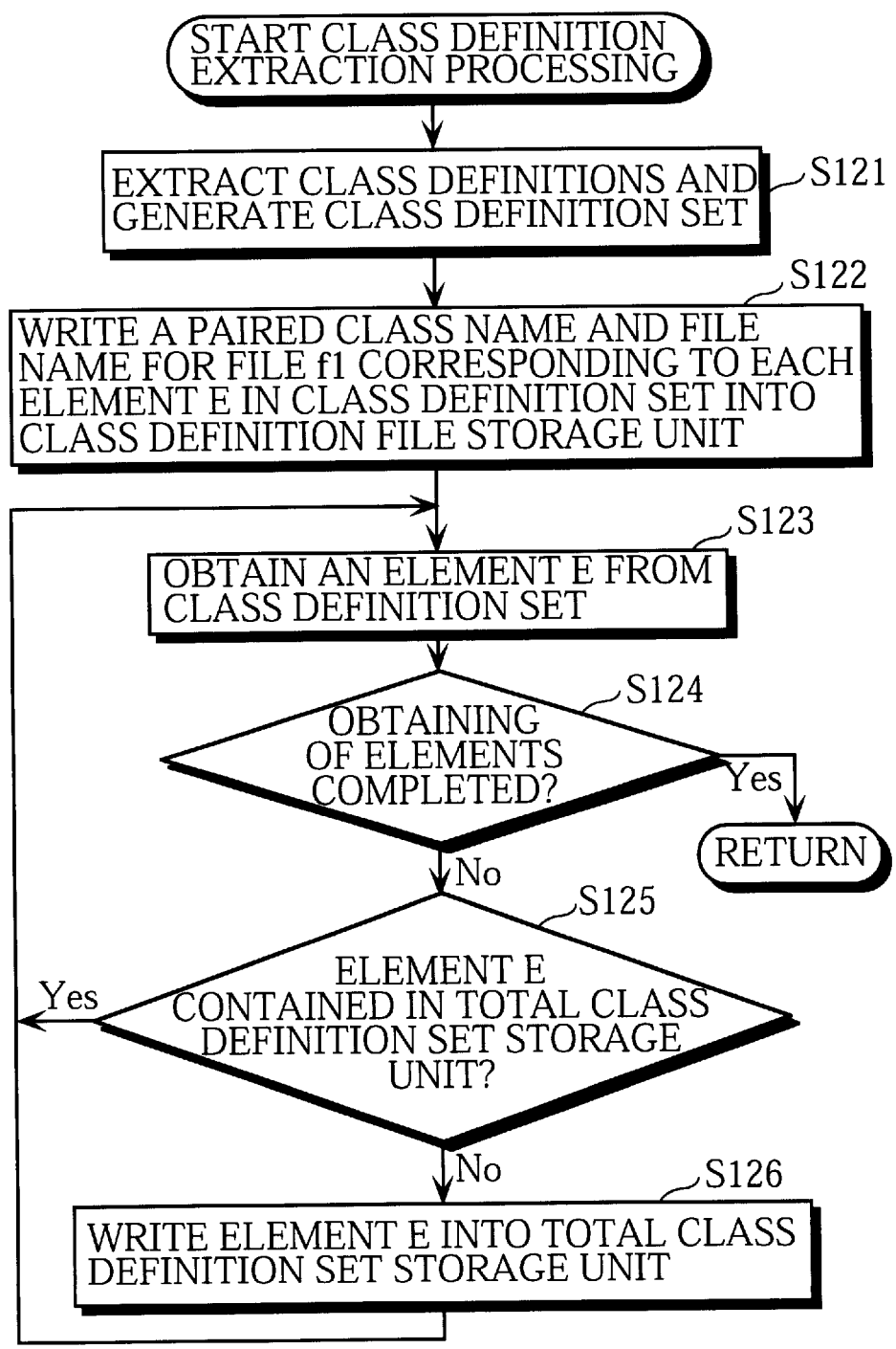
FIG. 11 is a flowchart showing the operation of a class definition extracting unit 14.

The operation of the class definition extracting unit 14 is explained with reference to the flowchart in FIG. 11.

The class definition extracting unit 14 receives the file f1 and corresponding file name from the input unit 12, obtains all the class definitions defined in the file f1, generates a class definition set DSET, and outputs the generated class definition set DSET to the inheritance relationship extracting unit 17 (step S121).

Next, the class definition extracting unit 14 writes a class name of each element E in the class definition set DSET, and a corresponding file name of the file f1 in which each element E is defined as pairs in the class definition file storage unit 16 (step S122).

Furthermore, the class definition extracting unit 14 obtains an element E from the class definition set DSET (step S123) and if all elements E have been obtained (step S124) ends processing.

If there is an element E that has not been obtained (step S124), the class definition extracting unit 14 judges whether the element E is included in the total class definition set TSET. If the element:E is judged not to be included (step S125), the class definition extracting unit 14 writes the element E into the total class definition set TSET (step S126). Next, control is returned to step S123, and the class definition extracting unit 14 repeats the above processing until all elements E have been obtained.

Operation of inheritance Relationship Analyzing Unit 19

Figure 12:
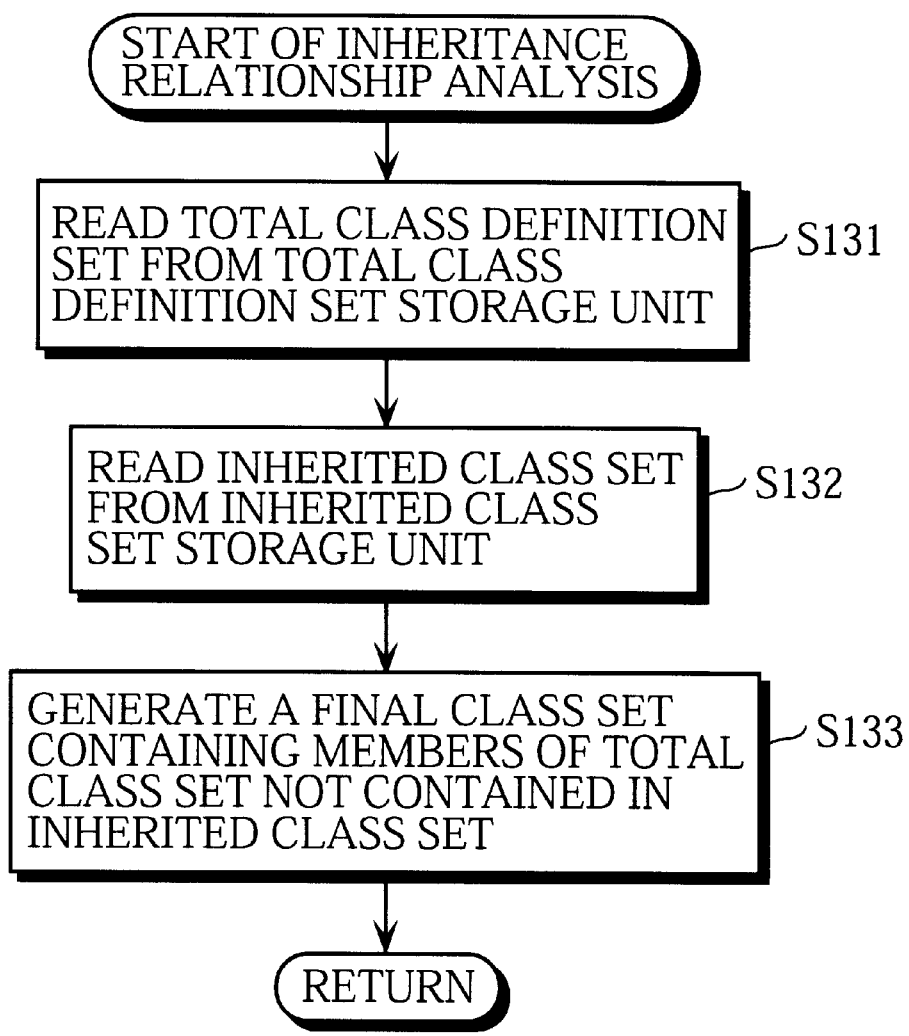
FIG. 12 is a flowchart showing the operation of an inheritance relationship analyzing unit 19.

The operation of the inheritance relationship analyzing unit 19 is explained with reference to the flowchart in FIG. 12.

Upon receiving an operational instruction, the inheritance relationship analyzing unit 19 reads all class definitions included in the total class definition set TSET in the total class definition set storage unit 15 (step S131), and reads all class names included in the inherited class set ISET in the inherited class set storage unit 18 (step S132). Next, the inheritance relationship analyzing unit 19 deletes class definitions shown in all the class names included in the read inherited class set ISET from all the class definitions included in the read total class definition set TSET, thereby generating a final class set FSET, and writes the generated final class set FSET in the final class set storage unit 20 (step S133).

Operation of Optimization Information Analyzing Unit 21

Figure 13:
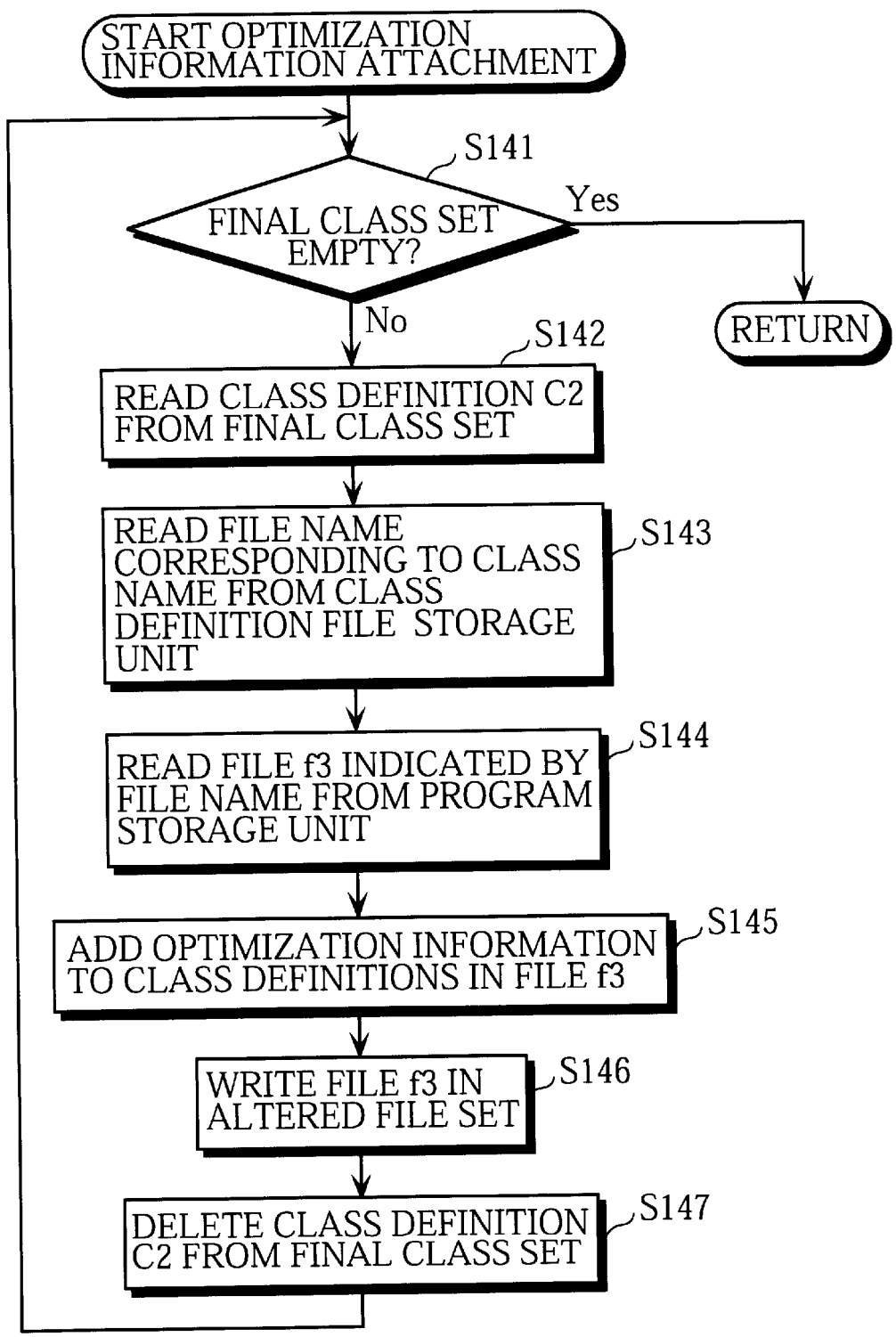
FIG. 13 is a flowchart showing the operation of an optimization information attaching unit 21.

The operation of the optimization information analyzing unit 21 is explained with reference to the flowchart shown in FIG. 13.

The optimization information analyzing unit 21 judges whether any class definitions are included in the final class set FSET in the final class set storage unit 20. If no class definitions are included (step S141), processing ends.

If class definitions are included (step S141), the optimization information unit 21 reads a class definition C2 from the final class set FSET, and obtains a class name included in the class definition C2 (step S142). Then, the optimization information unit 21 reads a file name corresponding to the obtained file name from the class definition file in the class definition file storage unit 16 (step S143), reads a file f3 shown by the read file name from the program storage unit 11 (step S144), and inserts optimization information into the file f3 in the line before the class definition (step S145). Then, the optimization information attaching unit 21 writes the file f3 into which optimization information has been inserted into the altered file set storage unit 22 (step S146) and deletes the class definition C2 read from the final class set (step S147). Control then moves to step S141, and the above processing is repeated until no class definitions remain in the final class set FSET.

2 Compiling Apparatus 110

The following is an explanation of the compiling apparatus 110.

2.1 Construction of Compiling Apparatus 110

Figure 14:
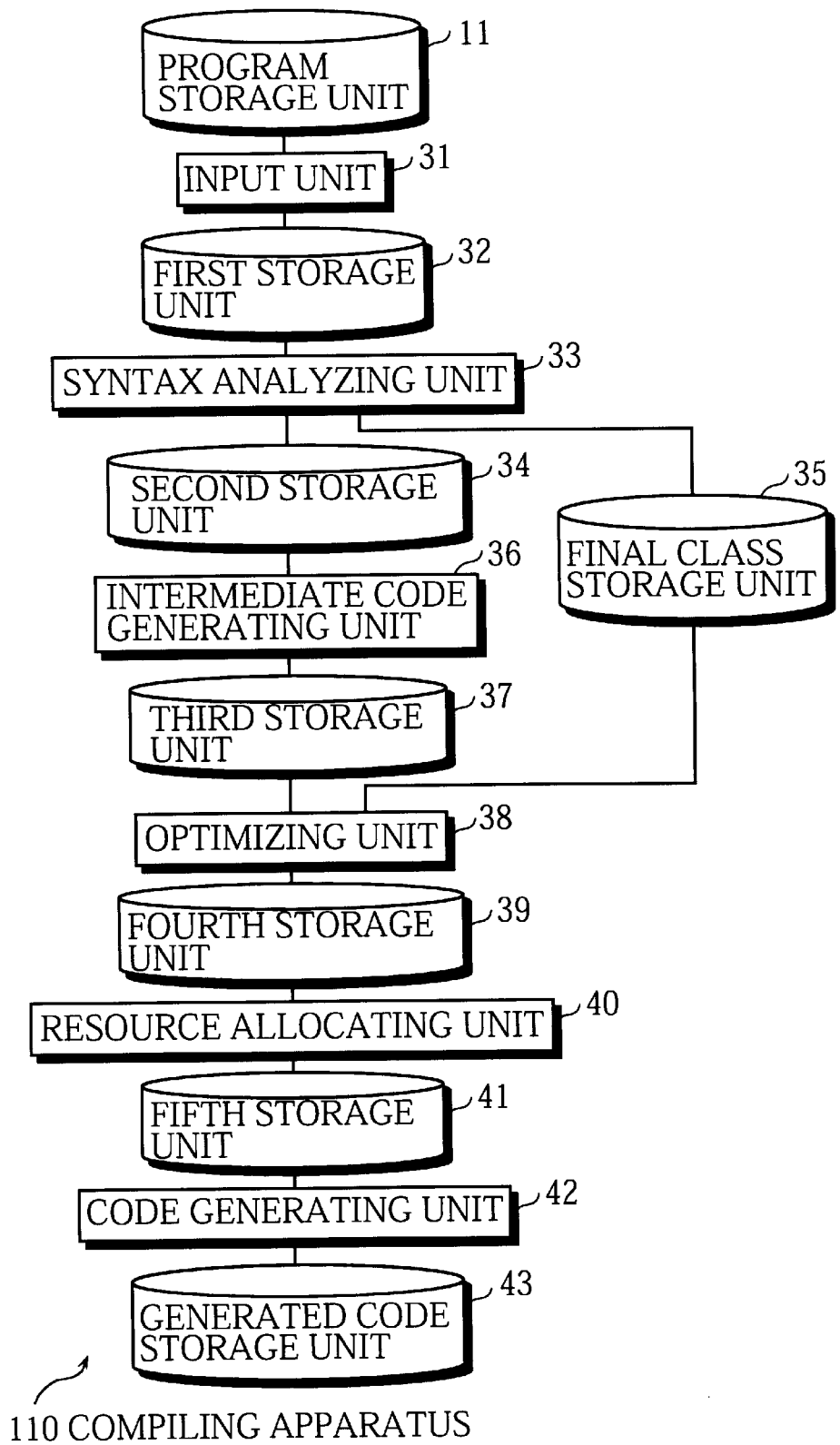
FIG. 14 is a block diagram showing a construction of a compiling apparatus 110.

As shown in FIG. 14, the compiling apparatus 110 includes a program storage unit 11, an input unit 31, a first storage unit 32, a syntax analyzing unit 33, a second storage unit 34, a final class storage unit 35, an intermediate code generating unit 36, a third storage unit 37, an optimizing unit 38, a fourth storage unit 39, a resource allocating unit 40, a fifth storage unit 41, a code generating unit 42, and a generated code storage unit 43.

Program Storage Unit 11

The program storage unit 11, like the program storage unit 11 in the optimization information attaching apparatus 100, stores source programs written based on the C++ standard as data files. These files include files to which optimization information has been attached by the optimization information attaching apparatus 100.

Input Unit 31

The input unit 31, like the input unit 12, receives a character string input by an operator, parses the received character string, generates a command name and at least one file name, and reads at least one file having the generated at least one file name from the program storage unit 11.

If the read at least one file includes an #include line, the input unit 31 reads a file having the same file name as that included in the #include line from the program storage unit 11, and replaces the #include line with the content of the read file. If an #include line is included in the read file, further replacement is performed. Replacement is performed until an #include line is no longer included in a file.

The input unit 31 writes at least one file including replaced files into the first storage unit 32.

As one example, if a file name filez.cc is generated by the input unit 12, the input unit 31 reads a file filez.cc from the program storage unit 11, reads a file having the same file name as the file name filey.h included in the #include line of the file filez.cc from the program storage unit 11, and replaces the #include line with the content of the read file. In this way, a program in which filey.h and filex.h have been inserted in file filez.cc can be obtained.

First Storage Unit 32

The first storage unit 32 stores at least one file on which replacement has been performed by the input unit 31.

Syntax Analyzing Unit 33

The syntax analyzing unit 33 repeats the following syntax analysis for each of the files stored in the first storage unit 32.

The syntax analyzing unit 33 reads tokens from each file stored in the first storage unit 32.

Here, tokens are character strings forming the basic syntax units of a program. Examples include keywords such as identifiers, constants and operators.

Figure 15:
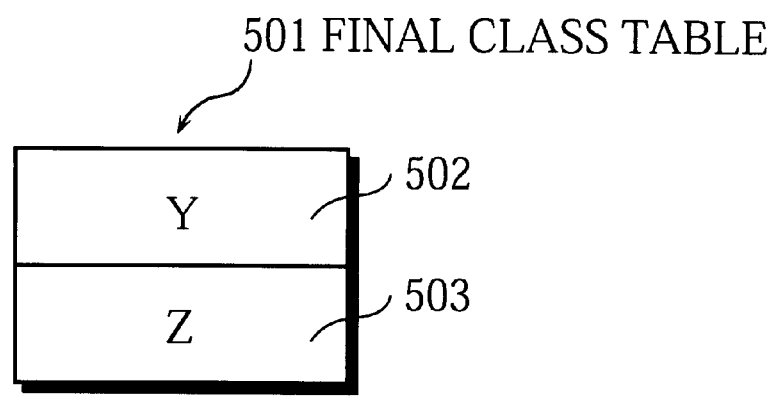
FIG. 15 shows an example of a final class table.

If the syntax analyzing unit 33 reads a token #pragma that is followed by a token _final class, the token following _final class is written into a final class table in the final class storage unit 35, as a class name showing a final class. An example of such a final class table is shown in FIG. 15. A final class table 501 shown in the drawing stores final classes 502 Y and 503 Z.

If the read token #pragma is not followed by a token_final class, or if the read token is not #pragma, the syntax analyzing unit 33 performs conventional syntax analysis and writes the analysis result into the second storage unit 34. Conventional syntax analysis is well known in the art and further explanation is therefore omitted here.

The syntax analyzing unit 33 repeats processing for writing tokens into the final class table, or performing conventional syntax analysis and writing the analysis result into the second storage unit 34 for each file stored in the first storage unit 32 until all tokens in that particular file have been read.

Second Storage Unit 34

The second storage unit 34 stores analysis results produced by the syntax analyzing unit 33.

Final Class Storage Unit 35

The final class storage unit 35 stores a final class storage table. The final class storage table includes class names.

Intermediate Code Generating Unit 36

The intermediate code generating unit 36 reads the analysis results produced by the syntax analyzing unit 33 and stored in the second storage unit 34, generates an intermediate code sequence (internal representation code) based on the read analysis result, and writes the generated intermediate code sequence in the third storage unit 37.

The intermediate code generating unit 36 repeats processing for reading an analysis result, generating an intermediate code sequence and writing the generated code sequence in the third storage unit 37 until all of the analysis results stored in the second storage unit 24 have been read.

Generation of intermediate code based on an analysis result is well known in the art, so further explanation is omitted here.

Examples of intermediate code are shown in FIG. 16. In the drawing, intermediate code sequences 521, 531 and 541 are generated based on the function calls 234a, 235a and 236a, shown in FIG. 3.

The intermediate code sequence 521 is formed from a command name 522 CALL, a function name 523 g, a virtual function flag 524 virtual, an object name 525 obj_x, a class type 526 X, an argument type 527 int, and an argument value 528 10. The intermediate code sequence 531 is formed from a command name 532 CALL, a function name 533 g, a virtual function flag 534 virtual, an object name 535 obj_y, a class type 536 Y, an argument type 537 int, and an argument value 538 10. The intermediate code sequence 541 is formed from a command name 542 CALL, a function name 543 g, a virtual function flag 544 virtual, an object name 545 obj_z, a class type 546 Z, an argument type 547 int, and an argument value 548 10.

In the intermediate code sequence 521, the command name 522 CALL shows that intermediate code sequence 521 is a function call, the function name 523 g shows the name of the called function, the virtual function flag 524 virtual shows that the called function is a virtual function, the object name 525 obj_x shows a name of an active object of the called function, the class type 526 X shows the class type of the object, the argument type 527 int shows the type of the argument of the function, and the argument value 528 10 shows the value of the argument for the function.

The above description also applies to the intermediate code sequences 531 and 541.

Third Storage Unit 37

The third storage unit 37 stores intermediate code generated by the intermediate code generating unit 36.

Optimizing Unit 38

The optimizing unit 38 reads an intermediate code sequence stored in the third storage unit 37, and judges whether the command name for the read intermediate code sequence is a function call and whether the virtual function flag is virtual.

If the command name of the read intermediate code sequence is CALL, showing a function call, and the virtual function flag is virtual, the optimizing unit 38 judges whether a class type included in the read intermediate code sequence is contained in the final class table in the final class storage unit 35. If a class type is included in the final class table, the optimizing unit 38 rewrites the virtual function flag in the read intermediate code sequence as real, indicating that a function is not a virtual function, and writes the intermediate code sequence in the fourth storage unit 39.

If the command name in the read intermediate code sequence is not the function call CALL, or if the command name is CALL, and the virtual function flag is virtual, but the class type of the read intermediate code sequence is not contained in the final class table in the final class storage unit 35, the optimizing unit 38 performs conventional optimization processing on the intermediate code sequence, and writes the optimized intermediate code sequence in the fourth storage unit 39.

The optimizing unit 38 repeats the processing for reading an intermediate code sequence, rewriting the virtual function flag or performing conventional optimization, and writing the intermediate code sequence in the fourth storage unit 39 until all the intermediate code stored in the third storage unit 37 is read.

Conventional optimization processing is well known in the art, so description of this process is omitted here.

Fourth Storage Unit 39

The fourth storage unit 39 stores intermediate code that has been optimized by the optimizing unit 38.

Resource Allocating Unit 40

The resource allocating unit 40 reads an intermediate code sequence stored in the fourth storage unit 39, allocates a hardware resource to an operand in the read intermediate code sequence, and writes the intermediate code sequence to which a resource has been allocated into the fifth storage unit 41.

The resource allocating unit 40 repeats the above processing for reading an intermediate code sequence, allocating a hardware resource and writing the intermediate code sequence into the fifth storage unit 41 until all intermediate code stored in the fourth storage unit 39 has been read.

The process for allocating hardware resources is well known in the art, and so explanation of this process will be omitted here.

Fifth Storage Unit 41

The fifth storage unit 41 stores intermediate code which has been allocated a hardware resource by the resource allocating unit 40.

Code Generating Unit 42

The code generating unit 42 reads an intermediate code sequence stored in the fifth storage unit 41 and judges whether the command name of the read intermediate code sequence is a function call.

If the command name of the read intermediate code sequence is CALL, showing a function call, the code generating unit 42 further judges whether a virtual function flag included in the read intermediate code sequence is virtual. If the virtual function flag is virtual, the code generating unit 42 generates an executable instruction for setting an address of a virtual function table, an executable instruction for setting an address of a virtual function, an executable instruction for setting a value of an argument, and an executable instruction for jumping to a virtual function. If the virtual function flag is not virtual, the code generating unit generates an executable instruction for setting an argument value, and an executable instruction for jumping directly to a function. Then, the code generating unit 42 writes the generated executable instructions into the generated code storage unit 43.

If the command name of the read intermediate code sequence is not a function call CALL, the code generating unit 42 generates executable instructions by performing conventional code generation for a command other than a function call, and writes the generated executable instructions into the generated code storage unit 43.

The code generating unit 42 repeats reading of an intermediate code sequence, executable instruction generation when the command name is a function call, or conventional executable instruction generation when the command name is not a function call, and writing generated executable instructions into the generated code storage unit 43 until all intermediate code stored in the fifth storage unit 41 has been read.

Conventional code generation is well known in the art, and so explanation of this process is omitted here.

An example of an executable program generated by the code generating unit 42 is shown in FIG. 17. In the drawing, an executable program 560 has been generated based on the source program 233 shown in FIG. 3.

A function g in the source instruction 234 is a virtual function. On the other hand, a function g in the source instruction 235 and a function g in the source instruction 236 are functions that perform a direct call.

Source instructions 234, 235 and 236 correspond to executable instruction sets 561, 571 and 587 respectively.

The instruction set 561 is formed from executable instructions 562 to 566. Executable instruction 562 sets the address of a virtual function table, executable instruction 563 sets the address of a virtual function, executable instruction 564 sets an argument value, and executable instruction 565 jumps to the virtual function. Executable instruction 566 sets a return value for the virtual function.

The executable instruction set 571 includes executable instructions 572 and 573. The executable instruction 572 sets an argument value, and the executable instruction 573 jumps directly to a function.

The executable instruction set 587 includes executable instructions 588 and 589. The executable instruction 588 sets an argument value, and the executable instruction 589 jumps directly to a function.

Generated Code Storage Unit 43

The generated code storage unit 43 stores executable instructions generated by the code generating unit 42.

2.2 Operation of Compiling Apparatus 110

The following is an explanation of the compiling apparatus 110.

Overall Operation of Compiling Apparatus 110

Figure 18:
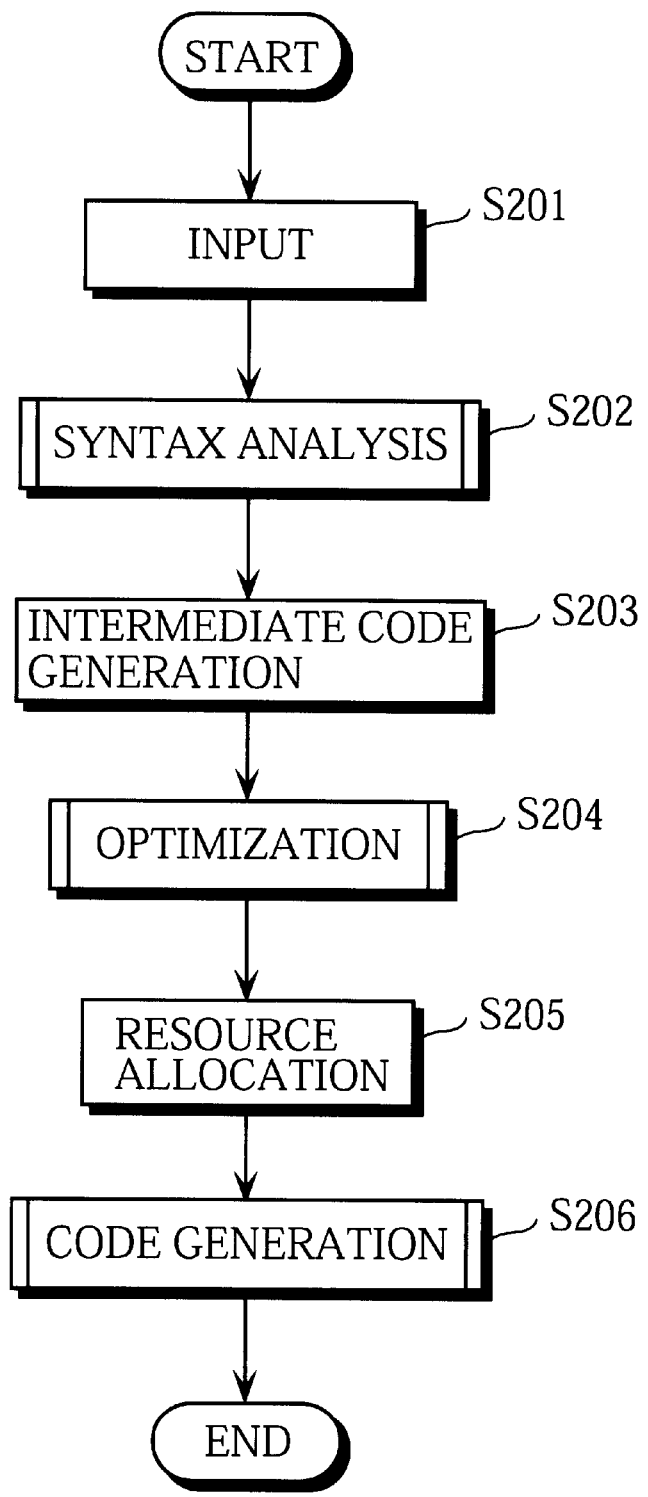
FIG. 18 is a flowchart showing the overall operation of the compiling apparatus 110.

The following is an explanation of the overall operation of the compiling apparatus 110 with reference to the flowchart in FIG. 18.

The compiling apparatus 110 performs input processing using the input unit 31 (step S201), syntax analysis using the syntax analyzing unit 33 (step S202), intermediate code generation using the intermediate code generating unit 36 (step S203), optimization using the optimizing unit 38 (step S204), resource allocation using the resource allocating unit 40 (step S205) and code generation using the code generating unit 42 (step S206).

Operation of Syntax Analyzing Unit 33

Figure 19:
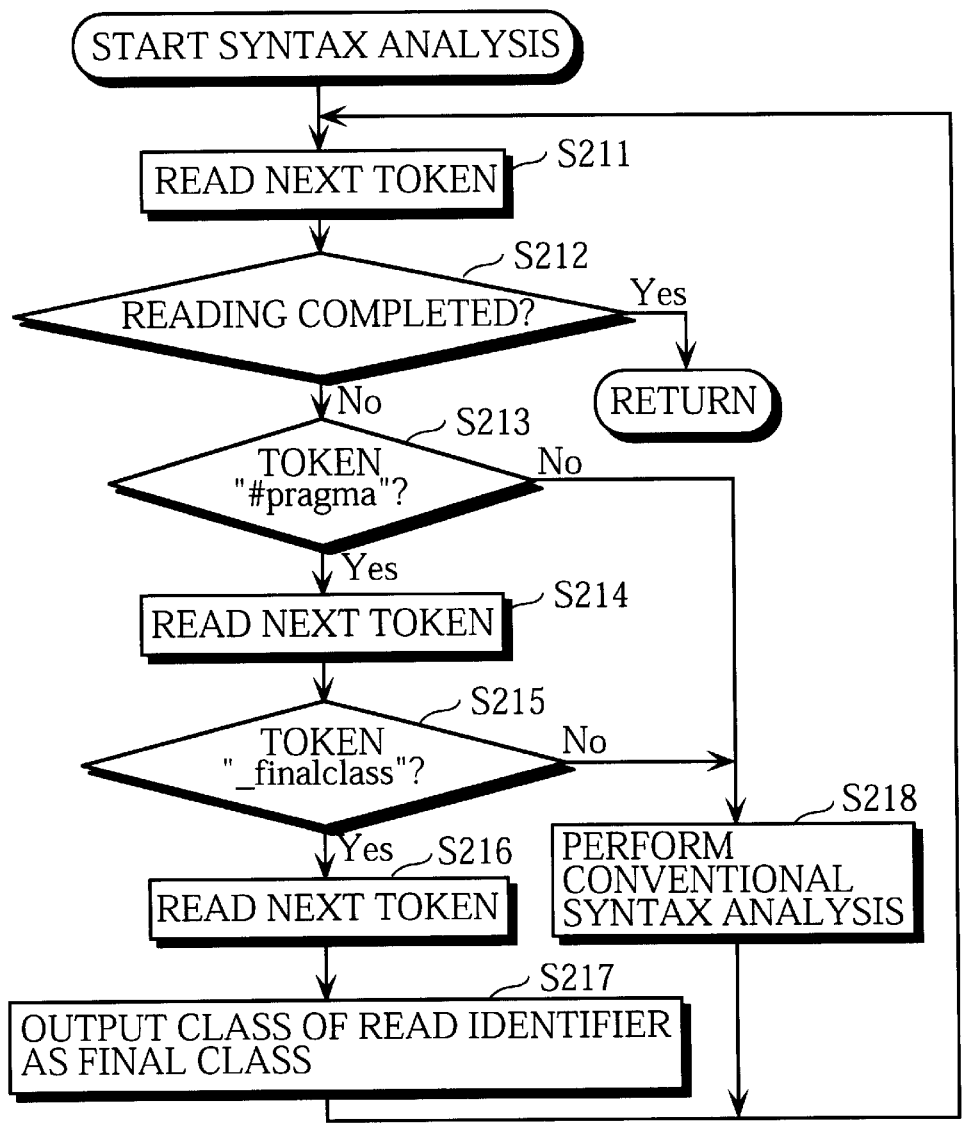
FIG. 19 is a flowchart showing the operation of a syntax analyzing unit 33.

The operation of the syntax analyzing unit 33 is explained with reference to the flowchart in FIG. 19.

The syntax analyzing unit 33 repeats the syntax analysis described below on each of the files stored in the first storage unit 32.

The syntax analyzing unit 33 reads a token from each file stored in the first storage unit 32 (step S211) judges whether all tokens have been read, and if all tokens have been read (step S212), ends processing.

If all tokens have not been read (step S212), the syntax analyzing unit 33 judges whether the read token is #pragma. If the read token is not #pragma (step S213), the syntax analyzing unit 33 performs conventional syntax analysis, writes the analysis result in the second storage unit 34 (step S218), moves control to step S211 and repeats the processing.

If the token is judged to be #pragma (step S213), the syntax analyzing unit 33 reads the next token (step S214), and if the read token is not _final class (step S215), performs conventional syntax analysis and writes the analysis result into the second storage unit 34 (step S218). Control then moves to step S211 and processing is repeated.

If the token is _final class (step S215) the syntax analyzing unit 33 reads the next token (step S216), and writes the read token in a final class table in the final class storage unit 35, as a class name showing a final class (step S217). Control then moves to step S211, and processing is repeated.

Operation of Optimizing Unit 38

Figure 20:
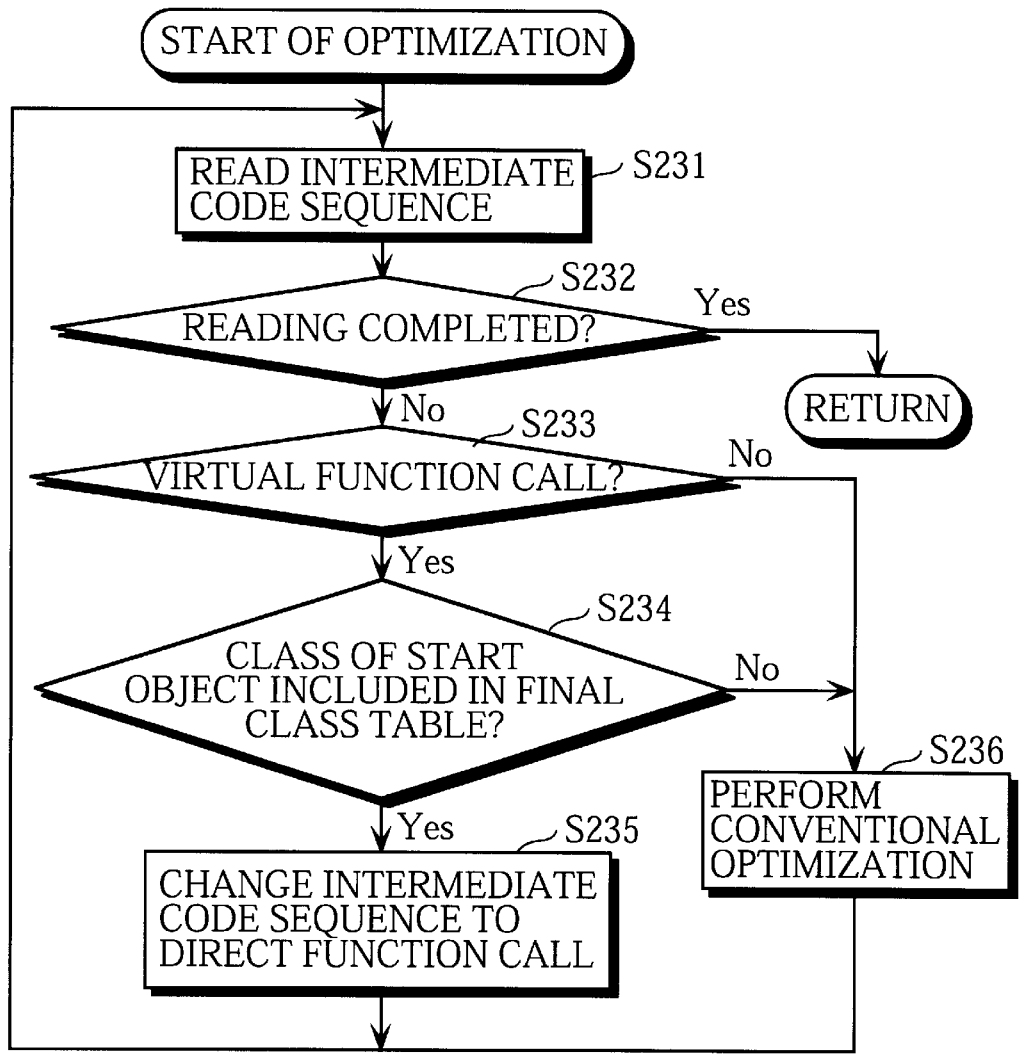
FIG. 20 is a flowchart showing the operation of an optimizing unit 38.

The operation of optimizing unit 38 is explained with reference to the flowchart in FIG. 20.

The optimizing unit 38 reads an intermediate code sequence stored in the third storage unit 37 (step S231), judges whether reading has been completed, and if this is so (step S232) completes processing.

If reading has not been completed (step S232) and the command name of the read intermediate code sequence is a function call, the optimizing unit 38 judges whether the virtual function flag is virtual, and if the command is a virtual function call (step S233) judges whether the class type included in the read intermediate code sequence is contained in the final class table in the final class storage unit 35. If the class type is contained in the final class table (step S234), the optimizing unit 38 rewrites the virtual function flag included in the read intermediate code sequence as real, and writes the intermediate code sequence in the fourth storage unit 39 (step S235). Then control moves to step S231 and the processing is repeated.

If the class type included in the read intermediate code sequence is not contained in the final class table (step S234), the optimizing unit 38 performs conventional optimization on the intermediate code sequence, and writes the optimized intermediate code sequence in the fourth storage unit 39 (step S236). Control then moves to step S231 and processing is repeated.

If the command name of the read intermediate code sequence is a function call and the virtual function flag is virtual, but the command is not a virtual function call (step S233), the optimizing unit 38 performs conventional optimization on the intermediate code sequence, and writes the optimized intermediate code sequence in the fourth storage unit 39 (step S236). Control then moves to step S231 and processing is repeated.

Operation of Code Generating Unit 42

Figure 21:
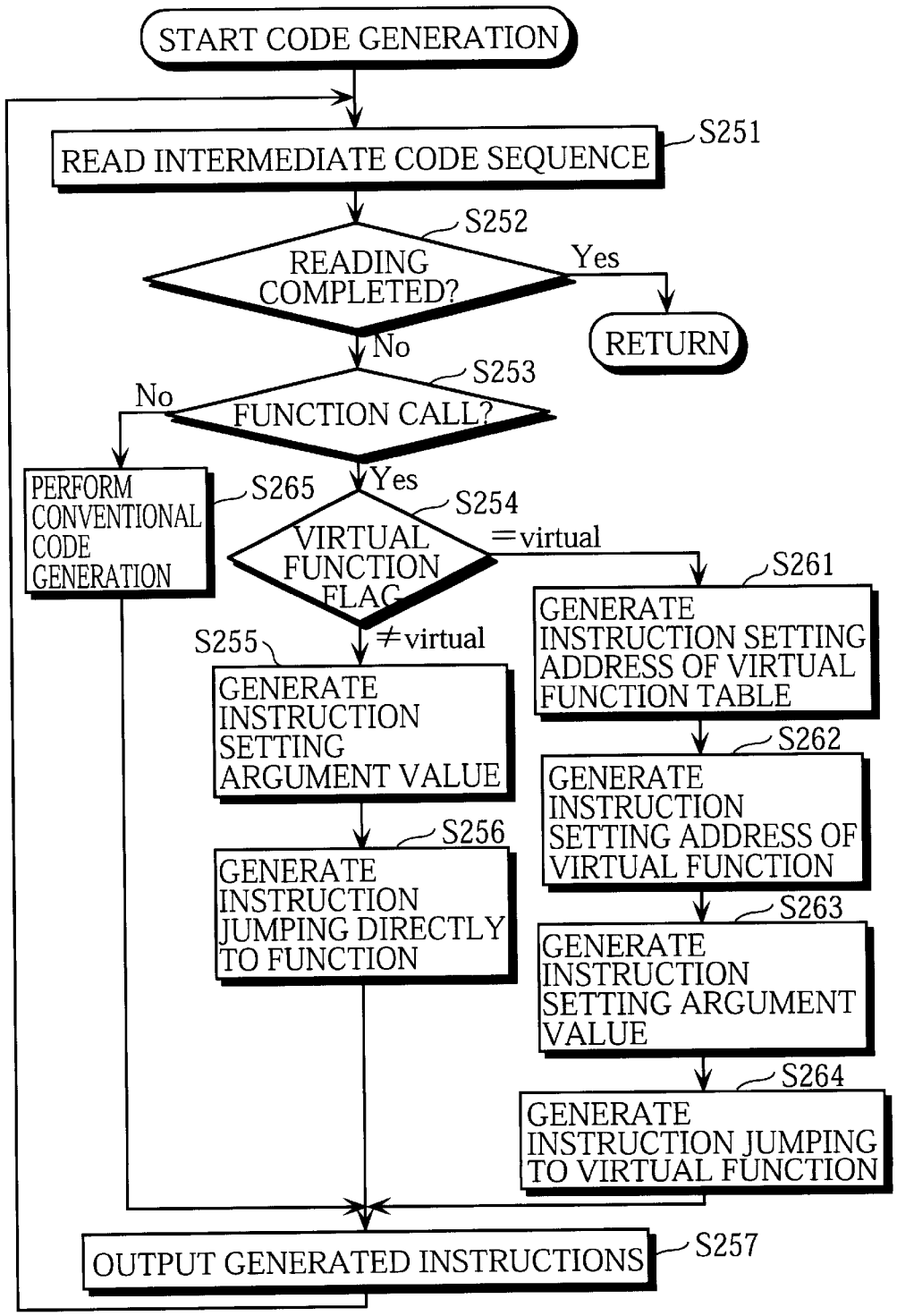
FIG. 21 is a flowchart showing the operation of a code generating unit 42.

The operation of the code generating unit 42 is explained with reference to the flowchart in FIG. 21.

The code generating unit 42 reads intermediate code sequence stored in the fifth storage unit 41 (step S251), judges whether reading is completed, and if reading is completed (step S252) completes processing.

If reading has not been completed (step S252), the code generating unit 42 judges whether the command name of the read intermediate code sequence is a function call. If the command name is a function call (step S253), the code generating unit 42 further judges whether the virtual function flag included in the read intermediate code sequence is virtual. If the virtual function flag is virtual (step S254), the code generating unit 42 generates an executable instruction for setting an address of a virtual function table (step S261), generates an executable instruction for setting an address of a virtual function (step S262), generates an executable instruction for setting an argument value (step S263), and generates an executable instruction for jumping to a virtual function (step S264). If the virtual function flag is not virtual (step S254), the code generating unit 42 generates an executable instruction for setting an argument value (step S255), and generates an executable instruction for jumping directly to a function (step S256). Next, the code generating unit 42 writes the generated executable instructions in the generated code storage unit 43 (step S257). Control moves to step S251, and processing is repeated.

If the command is not a function call (step S253), the code generating unit 42 performs conventional code generation for a command other than a function call (step S265), and writes the generated executable instructions in the generated code storage unit 43 (step S257). Control then moves to step S251 and processing is repeated.

3 Conclusion

As explained above, the optimization information attaching apparatus of the present invention analyzes classes that are not inherited, and attaches optimization information to these classes, and the compiling apparatus of the present invention converts a virtual function call for each of these classes into a direct function call. This increases the opportunities for performing optimization and decreases the number of executable instructions.

The invention has been explained based on the above embodiment, but it need not be limited to the form described in the embodiment. The following examples are also included in the invention.

1. Inline function expansion may be applied as a type of optimization to intermediate code in lines 235 and 236 of FIG. 3, this code having been generated by changing virtual function calls into direct function calls.

If inline function expansion is applied to the direct function call in line 235, a member function g in class Y performs processing for squaring an argument value. This means that calling the function g results in a return value of 100, and the function g becomes a code for replacing the value of a variable y with 100.

Similarly, if inline function expansion is applied to the direct function call in line 236, a member function g in class Z performs processing for cubing an argument value. This means that calling the function g results in a return value of 1000, and the function g becomes a code for replacing the value of a variable z with 1000.

Therefore, a return value x+y+z for a function func is a value obtained by adding 1100 to the value of a variable x.

Figure 22:
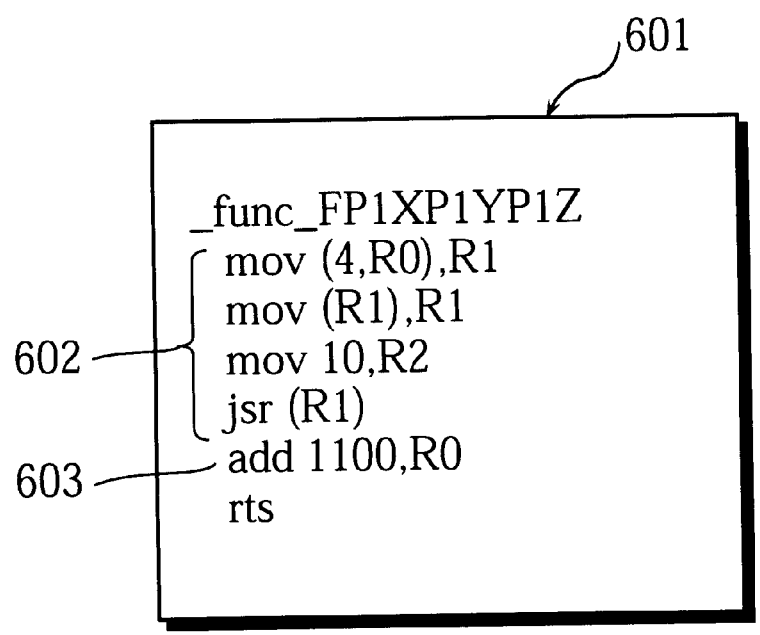
FIG. 22 shows an example of an executable program generated when a resource allocating unit 40 allocates resources to optimized intermediate code and the code generating unit 42 then performs code generation.
Figure 24:
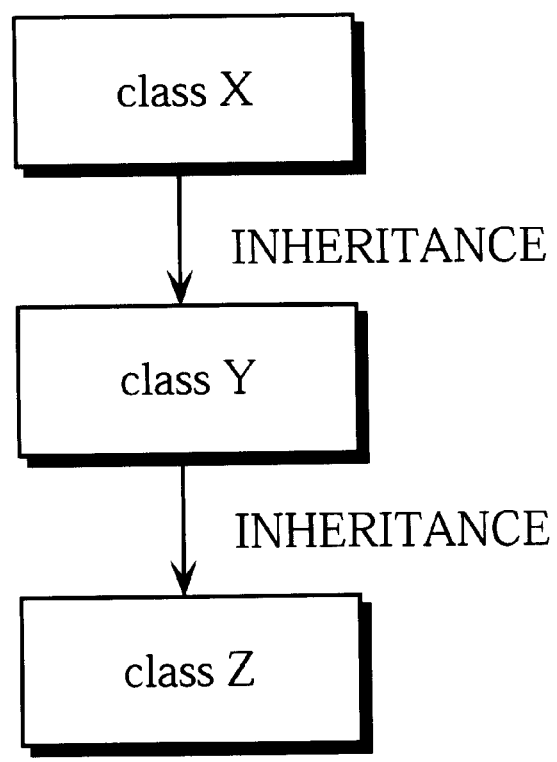
FIG. 24 shows the inheritance relationships between the three classes X, Y and Z shown in FIG. 23.
Figure 25:
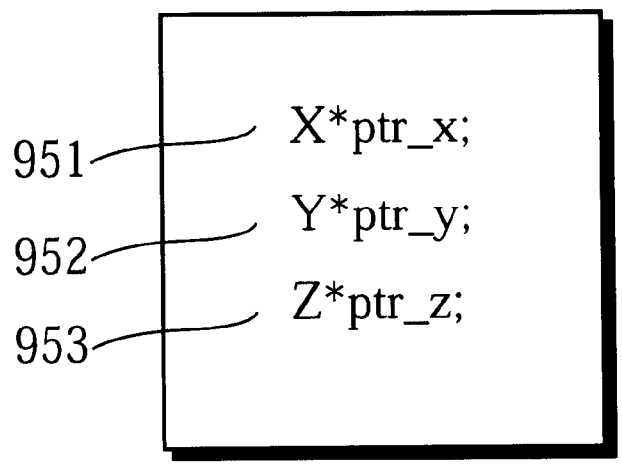
FIG. 25 shows an example of relationships between objects indicated by pointers, and classes.
Figure 26:
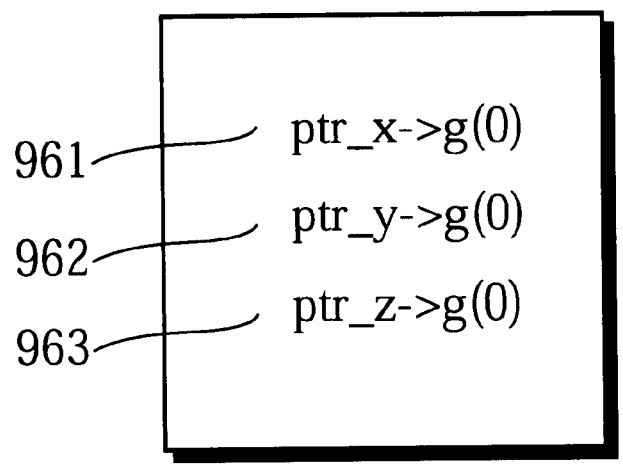
FIG. 26 shows examples of coding when a function to be executed is determined dynamically.

The resource allocating unit 40 allocates resources for intermediate code optimized in the above way. An executable program generated when code generation is performed by the code generating unit 42 is shown in FIG. 22. An executable program 601 shown in the drawing has been generated based on the source program 233.

Executable instructions 602 and 603 correspond to source instructions 234 and source instructions 235 to 237 respectively.

This means that applying inline expansion to functions in this way reduces the amount of generated code still further.

2. In the first embodiment, the optimization information attaching apparatus of the present invention attaches optimization information to class definitions for classes that are not inherited by any other class, but optimization information may be attached to virtual member functions belonging to class definitions for classes that are not inherited by any other class.

3. In the first embodiment, the optimization information attaching apparatus of the present invention attaches #pragma_final class class name as optimization information, but a keyword indicating that this class definition is not inherited from any class may be used. For example, in Java, the keyword final may be used.

Furthermore, optimization information may also be a character string unique to the optimization information attaching apparatus and the compiling apparatus, and this character string may also be translated by other compiling devices as a comment line.

4. In the first embodiment, optimization information is attached to class definitions including a class not inherited by other classes, but optimization information may also be attached to functions including class definitions that include a class not inherited by other classes.

5. The input unit 31 may receive a character string input from the input unit 12 rather than a character string input by an operator. This means that the compiling apparatus 110 can compile all files received as input by the input unit 12 in the optimization information attaching apparatus 100.

II Second embodiment

The following is an explanation of a program conversion apparatus 120a (not shown in the drawings) in a second embodiment of the invention.

The program conversion apparatus 120a includes an optimization information attaching apparatus 100a and a compiling apparatus 110a (not shown), in the same way as the program conversion apparatus 120.

1 Optimization Information Attaching Apparatus 100a

The following is an explanation of the optimization information attaching apparatus 100a.

1.1 Construction of Optimization Information Attaching Apparatus 100a

Figure 29:
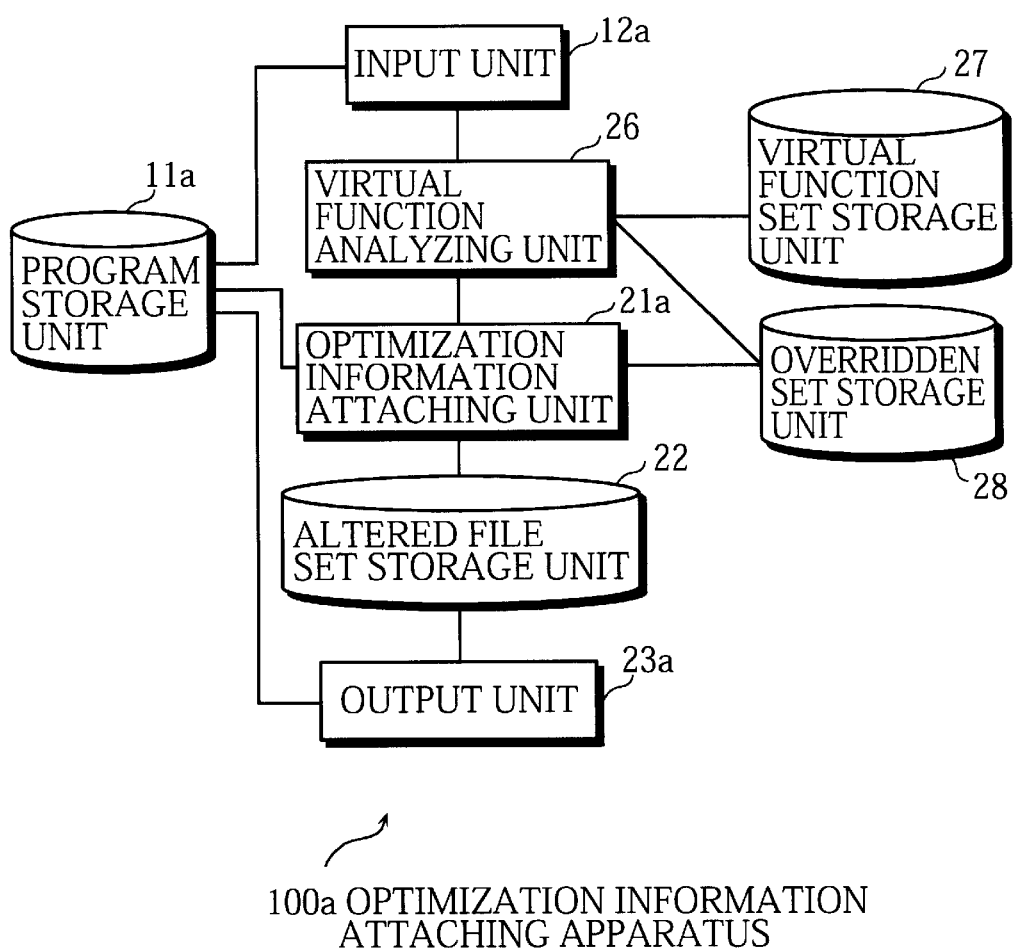
FIG. 29 is a block diagram showing a construction of an optimization information attaching apparatus 100a in a program conversion apparatus 120 in a second embodiment of the invention.

The optimization information attaching apparatus 100a, as shown in FIG. 29, includes a program storage unit 11a, an input unit 12a, a virtual function analyzing unit 26, a virtual function set storage unit 27, an overridden set storage unit 28, an optimization information attaching unit 21a, a altered file set storage unit 22, and an output unit 23a Program Storage Unit 11a The program storage unit 11a, like the program storage unit 11, stores a source program written based on the C++ standard as a data file.

Figure 30:
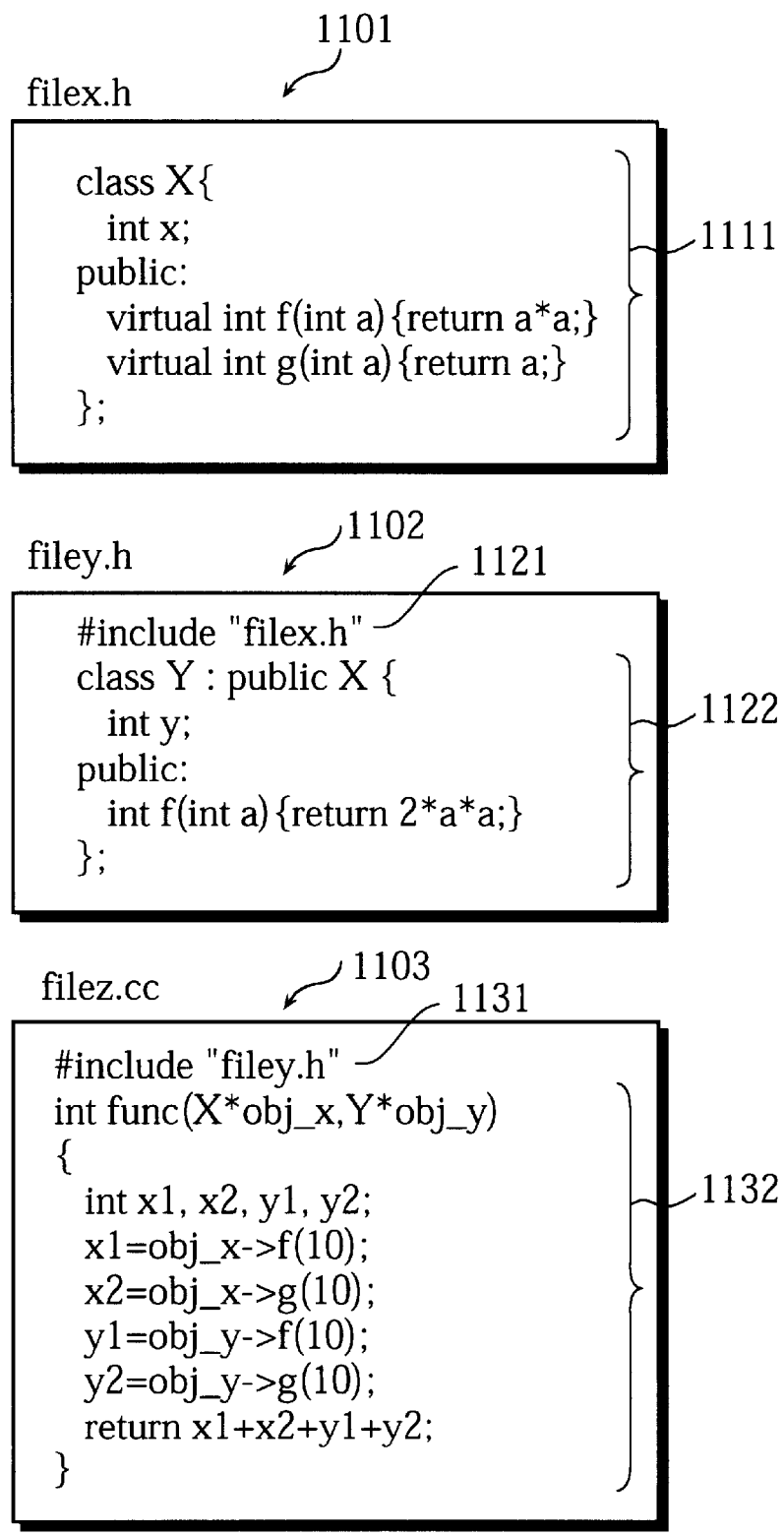

Examples of such files are shown in FIG. 30. As shown in the drawing, the program storage unit 11a stores files 1101, 1102 and 1103, having the filenames filex.h, filey.h and filez.cc respectively.

The file 1101 includes a class definition 1111. The file 1102 includes an #include line 1121 and a class definition 1122. The file 1103 includes an #include line 1131, and a class definition 1132.

Input Unit 12a

The input unit 12a, like the input unit 12, receives a character string input by an operator, parses the received character string, generating a command name and at least one file name, and if the command name is run, performs the following input processing.

The input unit 12a reads at least one file having the generated at least one file name from the program storage unit 11a. Reading is performed for each statement in the file. If a read statement is #include, a file indicated in the #include statement is read so as to be expanded at the position in the program at which the #include statement is written.

The input unit 12a judges whether the read statement is a class definition statement, and if it is a class definition statement, outputs the read statement to the virtual function analyzing unit 26. Alternatively, if the statement is not a class definition statement, the input unit 12a reads a next statement.

In this way, the input unit 12a repeats processing for reading a statement, determining whether it is a class definition and outputting the read statement to the virtual function analyzing unit 26 until all files indicated by file names received as input from the operator have been read.

Virtual Function Set Storage Unit 27

The virtual function set storage unit 27 stores virtual function sets. A virtual function set contains a class name and at least one group composed of a class name and virtual function name, and indicates virtual functions defined by the class shown by the class name.

Figures 31, 32:
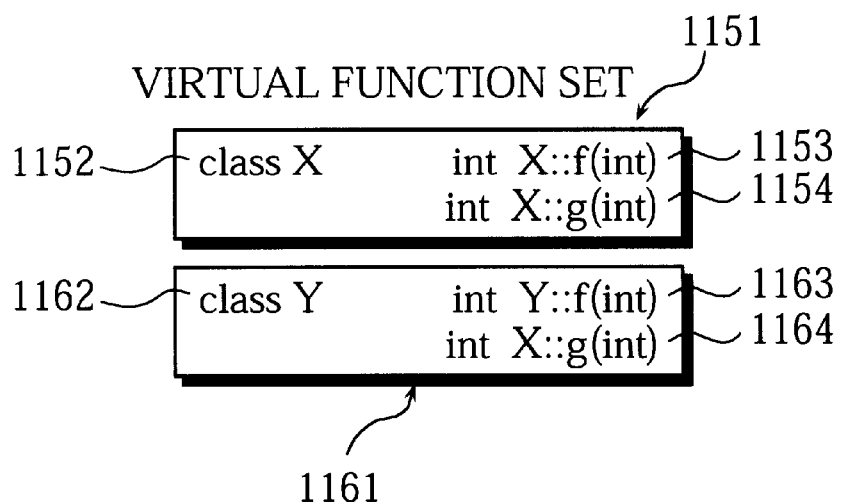
FIG. 31 shows an example of data stored in a virtual function set storage unit 27.
FIG. 32 shows an example of data stored in an overridden set storage unit 28.

Examples of virtual function sets stored in the virtual function set storage unit 27 are shown in. FIG. 31. In the drawing, the virtual function set storage unit 27 stores virtual function sets 1151 and 1161. The virtual function set 1151 contains a class name 1152 and a class name and virtual function name pairs 1153 and 1154. The virtual function set 1152 contains a class name 1162 and a class name 1163 and virtual function name pair 1164.

Virtual Function Analyzing Unit 26

The virtual function analyzing unit 26 has one or more virtual function sets VFSET to be used as internal variables. The virtual function set VFSET has an area storing a class name and at least one pair formed from a class name and function name.

The virtual function analyzing unit 26 receives a class definition statement from the input unit 12 and judges whether a base class is written in the received class definition statement.

If a base class is not written in the statement, the virtual function analyzing unit 26 stores a class name C1 defined in the class definition in the area for storing the class name of VFSET, and deletes data from the area storing pairs in VFSET. If a base class is written, the virtual function analyzing unit 26 obtains a virtual function set having a base class C2 written in the class definition from the virtual function set storage unit 27, takes the obtained set to be the virtual function set VFSET, and replaces the base class C2 stored in the area storing the class set for VFSET with the class name C1 defined in the class definition statement.

Next, the virtual function analyzing unit 26 judges whether each virtual function VF written in a class definition statement received from the input unit 12a is included in the virtual function set VFSET.

If a virtual function is included in the virtual function set VFSET, the virtual function analyzing unit 26 writes a paired virtual function name VF' included in the virtual function set VFSET, having the same name as the virtual function VF, and a corresponding class name into the overridden set OVSET in the overridden set storage unit 28. The virtual function analyzing unit 26 then deletes paired virtual function name VF' and class name from the virtual function set VFSET, and replaces the deleted data with the virtual function VF and the class name C1 defined in the class definition statement.

If the virtual function is not contained in the virtual function set VFSET, the virtual function analyzing unit 26 writes a pair composed of the class name C1 defined in the class definition statement and the virtual function VF into the area storing pairs for the virtual function set VFSET.

Next, the virtual function analyzing unit 26 writes the virtual function set VFSET into the virtual function set storage unit 27.

Thus, the virtual function set 1151 shown in FIG. 31, and the overridden set shown in FIG. 32 are formed from the file 1101 shown in FIG. 30. Furthermore, the virtual function set 1161 shown in FIG. 31 is formed from the file 1102 shown in FIG. 30.

Overridden Set Storage Unit 28

The overridden set storage unit 28 stores the overridden set OVSET, and the overridden set OVSET is formed from class names and virtual function names. One example of an overridden set OVSET is shown in FIG. 32.

Optimization Information Attaching Unit 21a

Once the input unit 12a has read all files indicated by file names received as input from the operator, the optimization information attaching unit 21a judges whether the overridden set OVSET stored in the overridden set storage unit 28 is an empty set. If it is an empty set, processing is completed.

If the overridden set OVSET is not an empty set, the optimization information attaching unit 21a extracts a class name and virtual function VF1 included in the overridden set OVSET, and reads a file declared by the extracted class name and virtual function VF1 from the program storage unit 11a. The optimization information attaching unit 21a then combines a character string #pragma_ovfunc, the extracted class name, and the extracted virtual function VF1 to form optimization information, attaches the optimization information to the read file and outputs the file to the altered file set storage unit 22.

Figure 33:
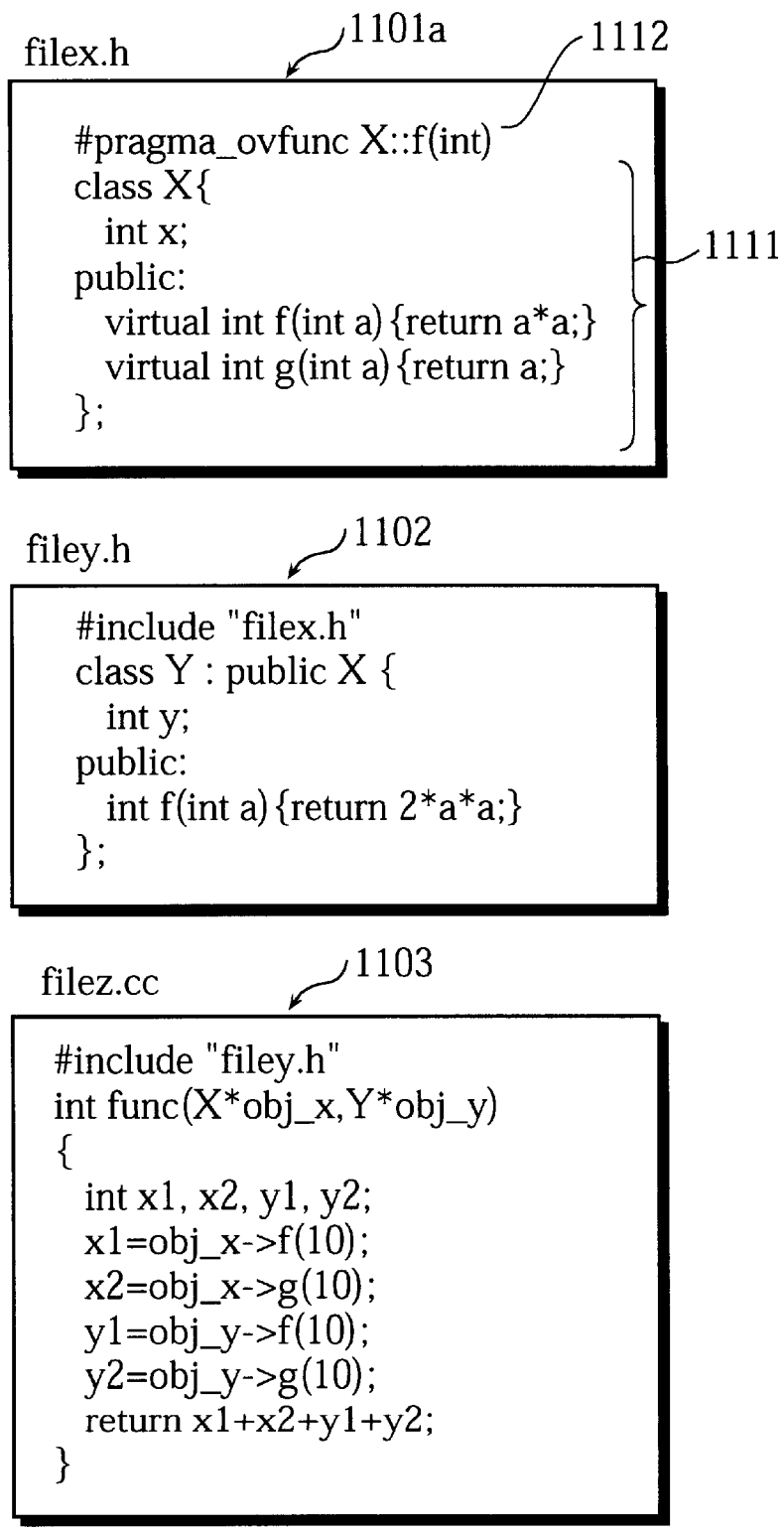
FIG. 33 shows examples of programs after optimization information has been attached.

An example of a program to which optimization information has been attached is shown in FIG. 33. In the drawing, file 1101 is a program to which optimization information 1112 has been attached. Files 1102 and 1103 have no attached optimization information.

Altered File Set Storage Unit 22

The altered file set storage unit 22 stores files to which optimization information has been attached, in the same way as the altered file set storage unit 22 in the optimization information attaching apparatus 100.

Output Unit 23a

The output unit 23a is the same as the output unit 23 in the optimization information attaching apparatus 100, and reads files to which optimization information has been attached from the altered file set storage unit 22 and outputs such files to the program storage unit 11a.

1.2 Operation of Optimization Information Attaching Apparatus 100a

Overall Operation of Optimization Information Attaching Apparatus 100a

Figure 34:
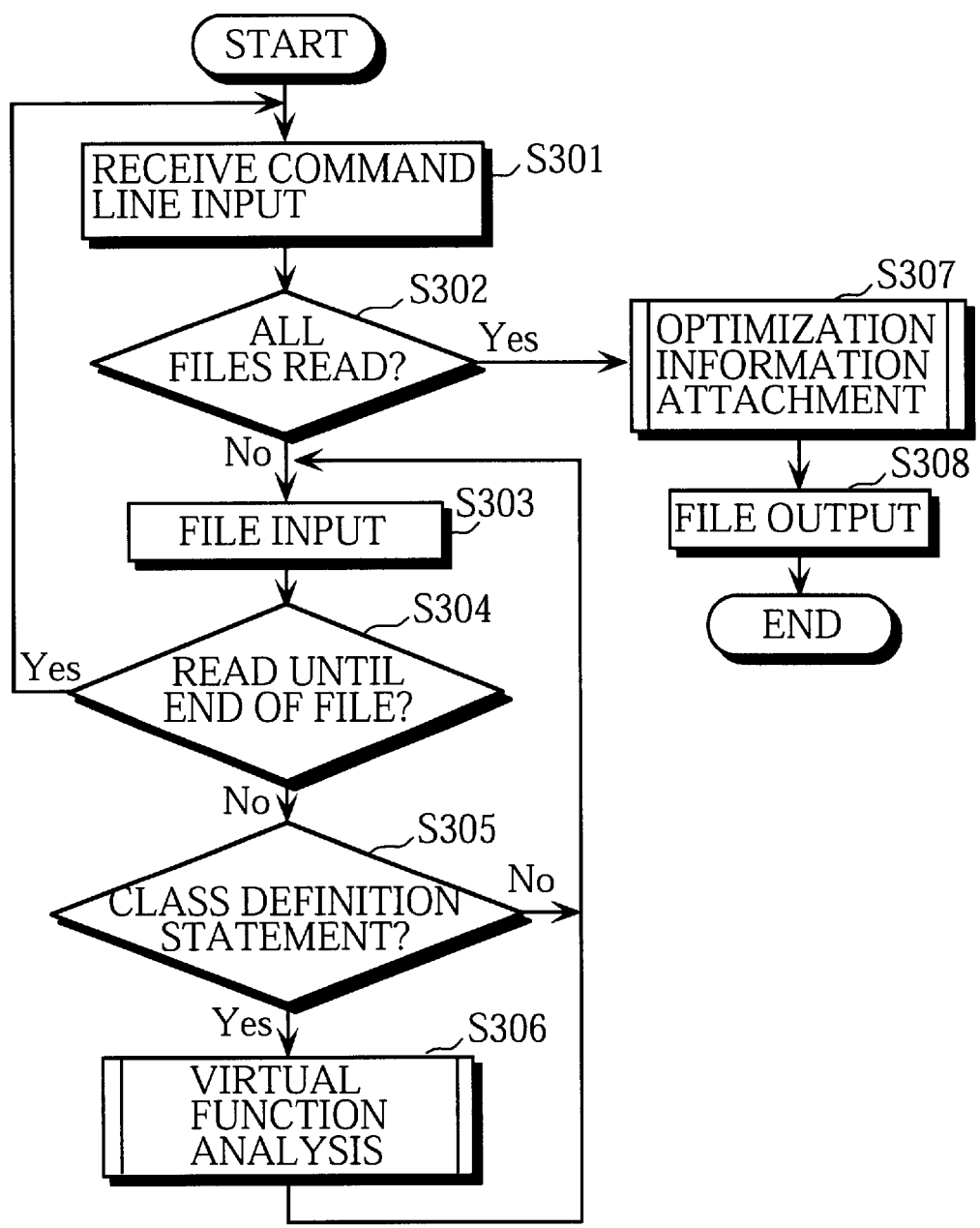

The following is an explanation of the operation of the optimization information attaching apparatus 100a with reference to the flowchart in FIG. 34.

The input unit 12a receives a character string including a command name, and a file name input by an operator (step S301), and reads the file from the program storage unit 11a. If all files have been read (step S302), the input unit 12a performs optimization information processing (step S307). The output unit 23a reads a file to which optimization information has been attached from the altered file set storage unit 22, and writes the read file in the program storage unit 11a (step S308).

If unread files are still remaining (step S302) the input unit 12a reads a file one statement at a time (step S303) and when the entire file has been read (step S304), returns to step S301 and receives operator input again. If the entire file has not been read (step S304), the input unit 12a judges whether the read statement is a class definition statement. If the read statement is a class definition statement (step S305), the input unit 12a outputs the read statement to the virtual function analyzing unit 26 and virtual function analysis is performed (step S306). If the read statement is not a class definition statement (step S305), the input unit 12a returns to step S303 and reads a next statement.

Detailed Operation of Virtual Function Analysis

Figure 35:
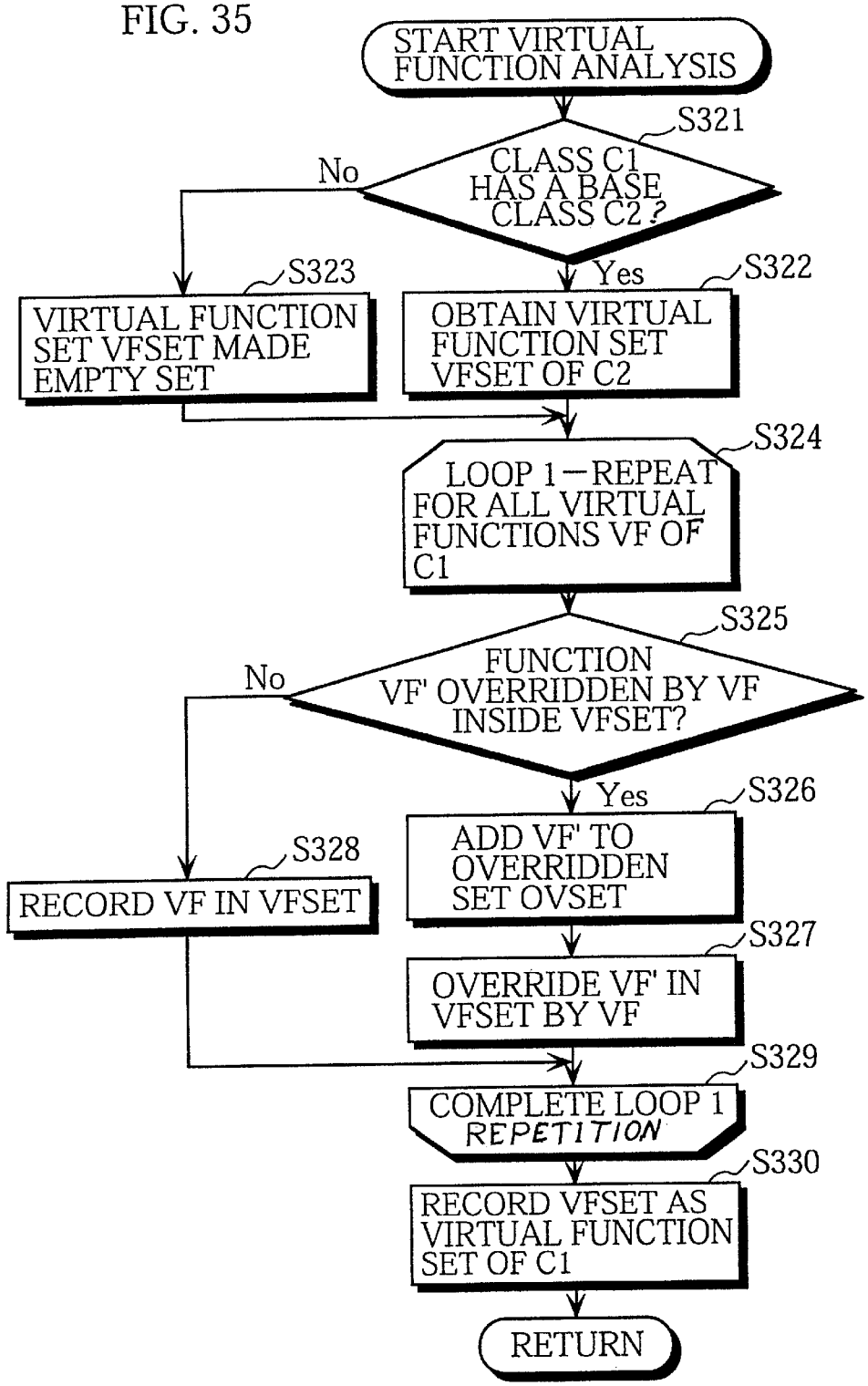

The following is a detailed explanation of the operation of virtual function analysis with reference to the flowchart in D FIG. 35.

The virtual function analyzing unit 26 receives a class definition statement from the input unit 12a, and judges whether a base class is written in the received class definition statement. If a base class is not written (step S321), the virtual function analyzing unit 26 stores a class name C1 defined in the class definition statement in the area for storing a class name for the virtual function set VFSET, and deletes the content of the area storing pairs for the virtual function set VFSET (step S323). If a base class is written in the statement (step S321), the virtual function analyzing unit 26 obtains a virtual function set having a base class C2 written in the class definition as a class name from the virtual function set storage unit 27, takes the obtained set to be the virtual function set VFSET, and stores the class name C1 defined in the class definition statement in the area storing the class name in the virtual function set VFSET, replacing the base class C2 (step S322).

Next, the virtual function analyzing unit 26 repeats steps S325 to S328 for each virtual function VF written in the class definition statement received from the input unit 12a.

In steps S325 to S328, the virtual function analyzing unit 26 judges whether the virtual function VF is included in the virtual function set VFSET, and if it is (step S325), writes a pair formed from the virtual function name VF' and a class name into an overridden set OVSET in the overridden set storage unit 28 (step S326). The virtual function analyzing unit 26 then deletes a paired virtual function VF' and class name from inside the virtual function set VFSET, and replaces the deleted data by writing the virtual function set VF and the class name C1 defined in the class definition statement into the virtual function set VFSET (step S327).

If the virtual function VF is not included in the virtual function set VFSET (step S325), the virtual function analyzing unit 26 writes the paired class name C1, defined in the class definition statement, and the virtual function VF into the area storing pairs in the virtual function set VFSET (step S328)

Next, the virtual function analyzing unit 26 writes the virtual function set VFSET in the virtual function set storage unit 27 (step S330).

Detailed Operation of Optimization Information Attachment Processing

Figure 36:
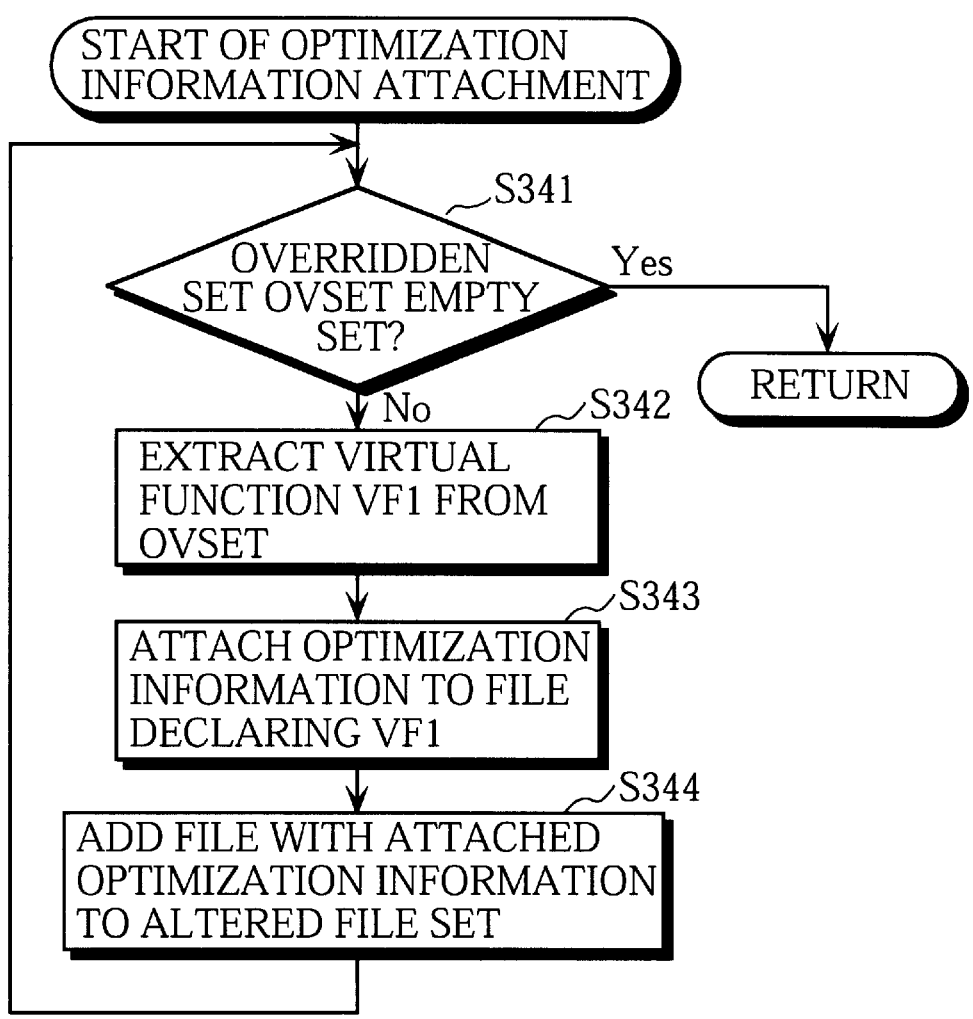

The following is an explanation of the detailed operation of optimization information attachment processing, with reference to the flowchart of FIG. 36.

Once the input unit 12a has completed reading files indicated by received file names input by an operator, the optimization information attaching unit 21a judges whether the overridden set OVSET stored in the overridden set storage unit 28 is an empty set. If so (step S341), processing is completed.

If the overridden set OVSET is not an empty set (step S341), the optimization information attaching unit 21a extracts a class name and virtual function VF1 included in the overridden set OVSET (step S342), and reads a file declared in the extracted class name and virtual function VF1 from the program storage unit 11a. A character string #pragma_ovfunc, the extracted class name, and virtual function VF1 are combined to generate optimization information, the optimization information is attached to the read file (step S343) and the file is output to the altered file set storage unit 22 (step S344).

2 Compiling Apparatus 110a

The following is an explanation of the compiling apparatus 110a.

2.1 Construction of Compiling Apparatus 110a

The compiling apparatus 110a, like compiling apparatus 110, includes a program storage unit 11a, an input unit 31, a first storage unit 32, a syntax analyzing unit 33, a second storage unit 34, an overridden set storage unit 35a, an intermediate code generating unit 36, a third storage unit 37, an optimizing unit 38, a fourth storage unit 39, a resource allocating unit 40, a fifth storage unit 41, a code generating unit 42 and a generated code storage unit 43. The compiling apparatus 110a includes the program storage unit 11a and the overridden set storage unit 35a in place of the program storage unit 11 and the final class storage unit 35 in the compiling apparatus 110.

Furthermore, those components of the compiling apparatus 110a that have the same numerical references as components of the compiling apparatus 110 have the same construction. The following explanation focuses on the differences from the components of the compiling apparatus 110.

Program Storage Unit 11a

The program storage unit 11a, like the program storage unit 11a in the optimization information attaching apparatus 100a, stores files to which optimization information generated by the optimization information attaching apparatus 10a has been attached.

Overridden Set Storage Unit 35a

The overridden set storage unit 35a stores overridden functions. An overridden function is formed from a paired class name and virtual function name.

Syntax Analyzing Unit 33

The syntax analyzing unit 33 reads a token from each file stored in the first storage unit 32, and if a read token is #pragma, and the token following #pragma is _ovfunc, writes the token following _ovfunc into the overridden set storage unit 35a as a class name and virtual function name pair.

Optimizing Unit 38

The optimizing unit 38 reads an intermediate code sequence stored in the third storage unit 37, and if the command name in the read intermediate code sequence is a function call, judges whether a class name and function name included in the intermediate code sequence are stored in the overridden set storage unit 35a. If the class name and function name are stored in the overridden set storage unit 35a, the optimizing unit 38 performs conventional optimization; if not, it rewrites the virtual function flag in the read intermediate code sequence as real, indicating that the function is not a virtual function, and writes the intermediate code sequence into the fourth storage unit 39.

In the example overridden set shown in FIG. 32, a class is X and a function is f. Meanwhile, in the file 1103 in FIG. 30, a virtual function call is performed in assignment statements for variables x1, x2, y1 and y2.

The virtual function called in the right side of the assignment statement for the variable x1 is a function f belonging to class X, so the function is included in the overridden set, and a conventional virtual function call is performed.

The virtual functions called by the right side of the assignment statements for the variables x2, y1 and y2 are a function g belonging to class X, a function f belonging to class Y, and a function g belonging to class Y. None of these functions are included in the overridden set, and so the virtual function call for each of these functions is rewritten as a direct function call.

2.2 Operation of Compiling Apparatus 110a

The overall operation of the compiling apparatus 110a is the same as the overall operation of the compiling apparatus 110, so explanation is omitted here. The following is a detailed explanation of the syntax analyzing unit 33 and the optimizing unit 38.

Operation of Syntax Analyzing Unit 33

Figure 37:
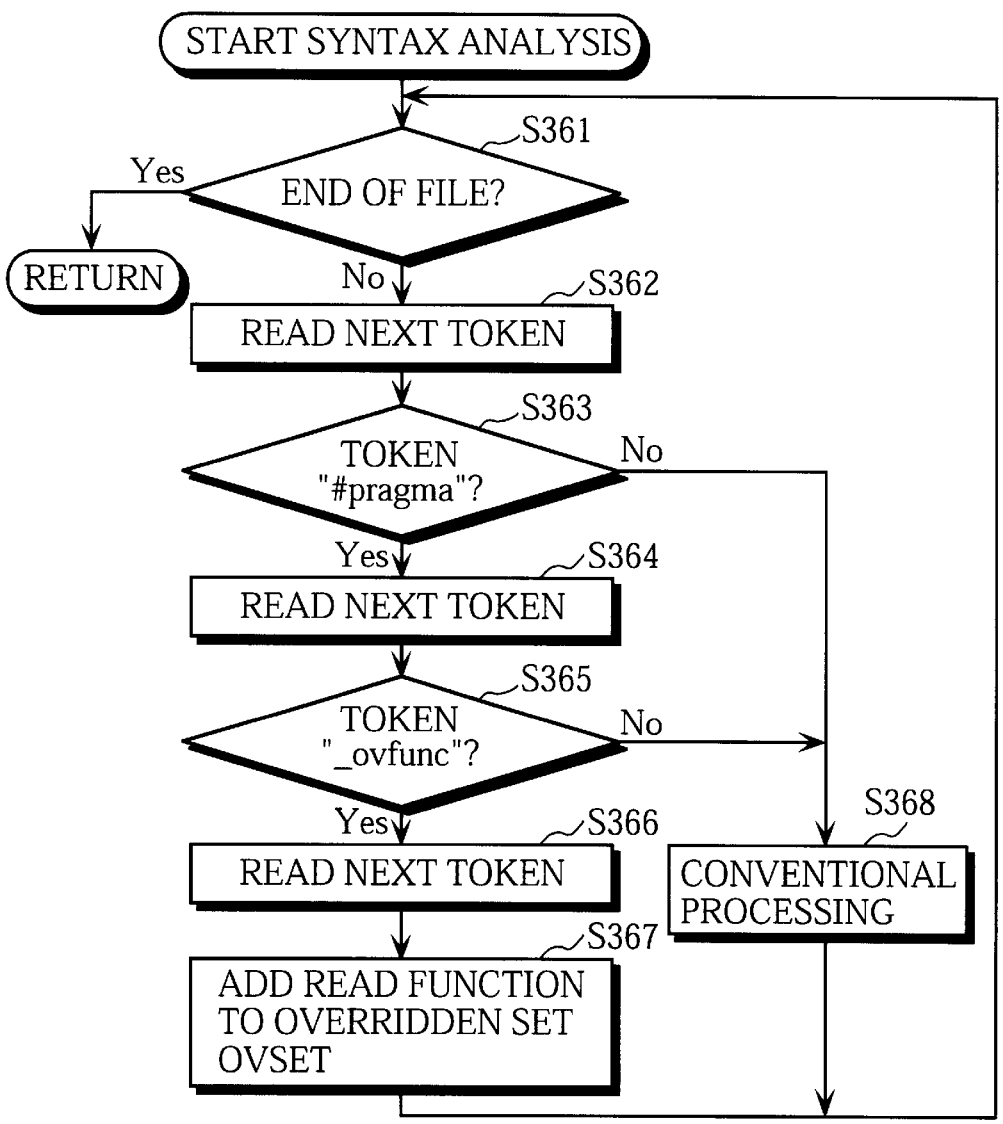

The operation of the syntax analyzing unit 33 is explained with reference to the flowchart of FIG. 37.

The syntax analyzing unit 33 repeats the following syntax analysis for all files stored in the first storage unit 32.

The syntax analyzing unit 33 judges whether tokens has been read from all the files stored in the first storage unit 32, and if reading has finished (step S361), completes processing. If reading has not finished (step S361), the syntax analyzing unit 33 reads the next token (step S362), judges whether the read token is #pragma, and if it is not (step S363) performs conventional syntax analysis, and writes the analysis result into the second storage unit 34 (step S368). Control then returns to step S361, and processing is repeated.

If the read token is judged to be #pragma (step S363), the syntax analyzing unit 33 reads the next token (step S364). If the next token is not _ovfunc (step S365), the syntax analyzing unit 33 performs conventional syntax analysis, and writes the analysis result in the second storage unit 34

(step S368). Control then moves to step S361, and processing is repeated.

If the next token is _ovfunc (step S365), the syntax analyzing unit 33 reads a next token (step S366), and writes this token as a paired class name and virtual function name into the overridden set storage unit 35a (step S367). Control then moves to step S361 and processing is repeated.

Operation of Optimizing Unit 38

Figure 38:
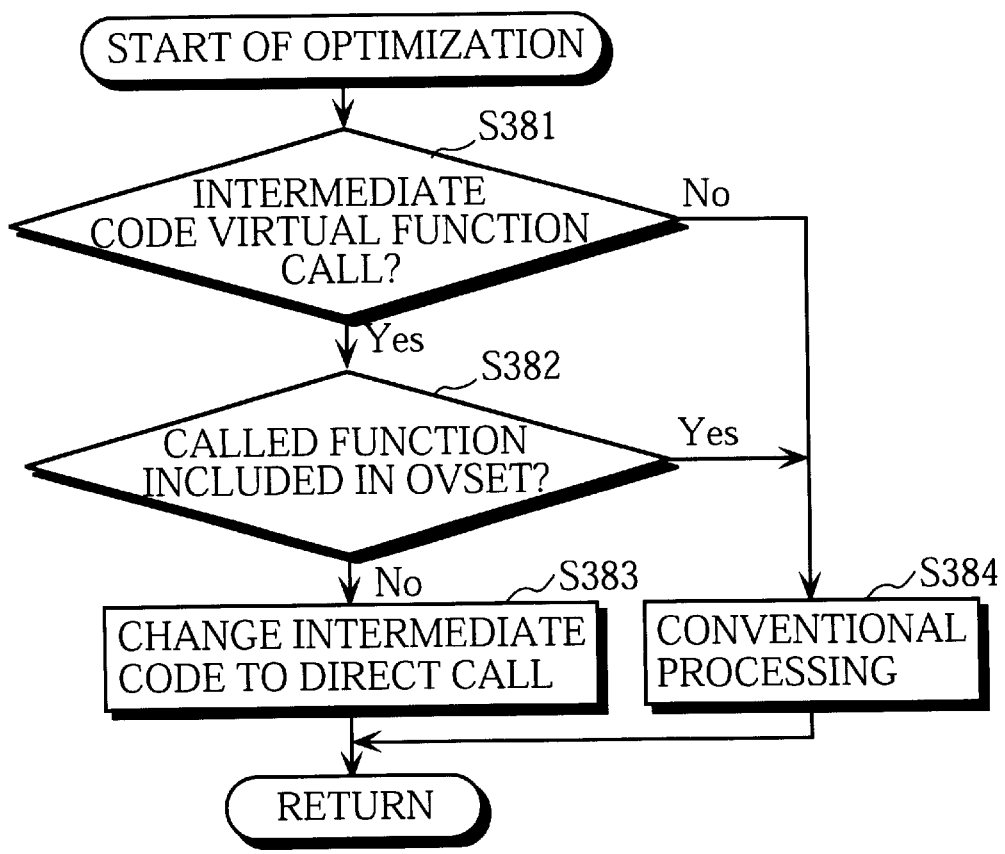

The operation of optimizing unit 38 is explained with reference to the flowchart in FIG. 38.

The optimizing unit 38 reads intermediate code sequence stored in the third storage unit 37, and judges whether the command name of the read intermediate code sequence is a function call, and whether the virtual function flag is virtual. If the command is a virtual function call (step S381), the optimizing unit 38 judges whether the class name and function name included in the read intermediate code sequence are stored in the overridden set storage unit 35a. If the class name and function name are not stored (step S382), the virtual function flag included in the read intermediate code sequence is rewritten as real, and the intermediate code sequence is written into the fourth storage unit 39 (step S383). Processing is then repeated.

If the class name and function name included in the intermediate code sequence are stored in the overridden set storage unit 35a (step S382), the optimizing unit 38 performs conventional optimization, and writes the optimized intermediate code sequence into the fourth storage unit 39 (step S384). Processing is then repeated.

3 Conclusion

As explained above, calls for virtual functions that are not overridden functions are converted to direct calls, increasing the opportunity for optimization, and reducing the number of executable instructions generated.

FIGS. 39A and 39B show examples of executable instructions generated from the file 1103 in FIG. 30. FIG. 39A shows executable instructions generated when virtual function calls are used without any alteration. FIG. 39B shows executable instructions generated when virtual function calls for functions that are not overridden are converted into direct function calls, and inline expansion performed on the functions. As shown in the drawing, this process reduces the number of generated executable instructions.

III Third embodiment

The following is an explanation of a program conversion apparatus 120b (not shown in the drawings) in a third embodiment of the present invention.

The program conversion apparatus 120b includes an optimization information analyzing apparatus 130 and a compiling apparatus 10b, and collects information relating to class inheritance relationships as optimization information, generates intermediate program code, and performs optimization using the collected information and generated program code.

1 Optimization Information Analyzing Apparatus 130 The following is an explanation of optimization information analyzing unit 130.

1.1 Operation of Optimization Information Analyzing Apparatus 130

Figure 40:
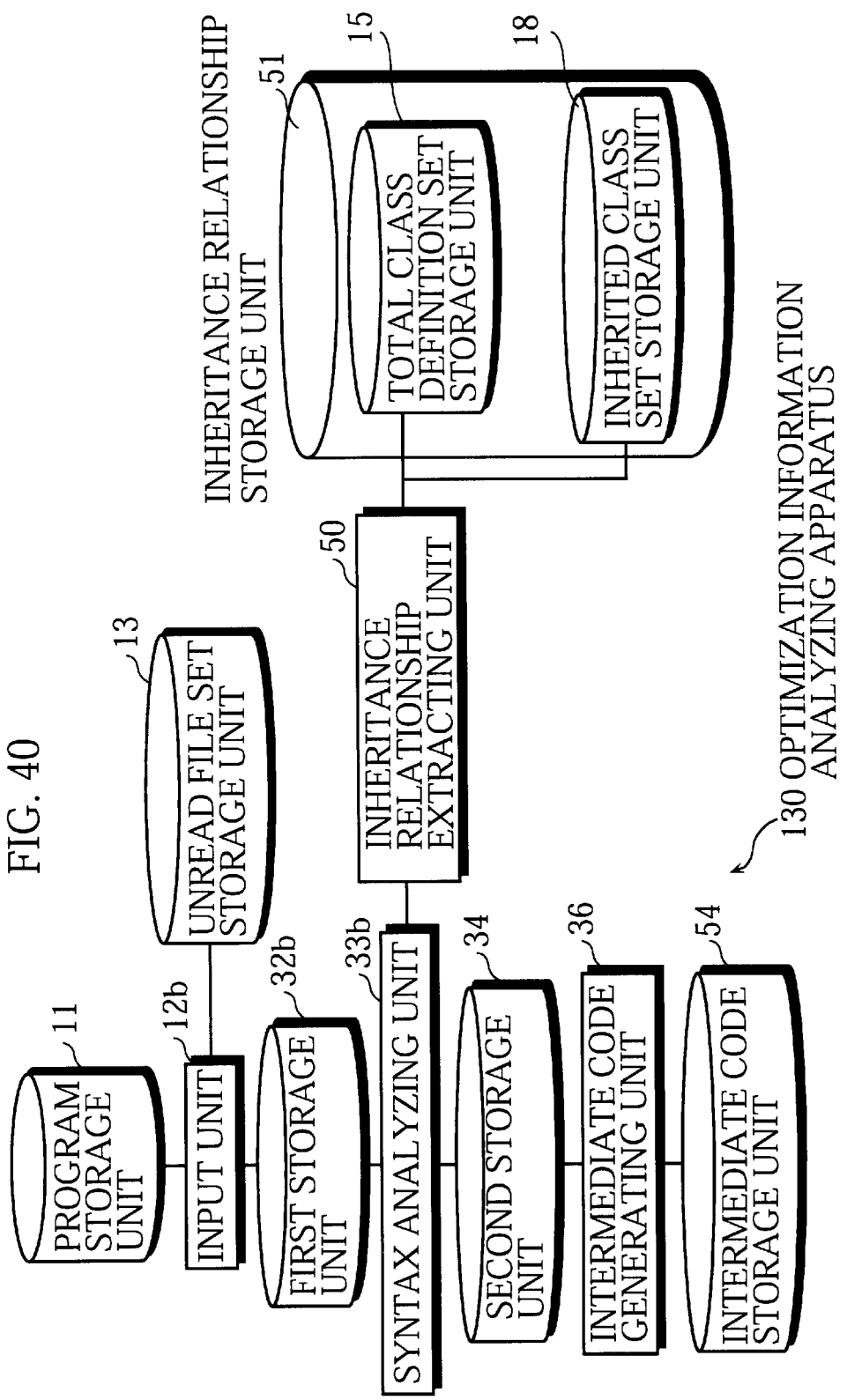
FIG. 40 is a block diagram showing a construction for an optimization information analyzing apparatus 130 in a program conversion apparatus 120b of a third embodiment of the invention.

The optimization information analyzing apparatus 130 shown in FIG. 40 includes a program storage unit 11, an input unit 12b, an unread file set storage unit 13, a first storage unit 32b, a syntax analyzing unit 33b, a second storage unit 34, an intermediate code generating unit 36, an inheritance relationship extracting unit 50, an inheritance relationship storage unit 51, and an intermediate code storage unit 54. The inheritance relationship storage unit 51 includes a total class definition set storage unit 15 and an inherited class set storage unit 18.

Components of the optimization information analyzing apparatus 130 that have the same numerical references as components in the optimization information attaching apparatus 100 or the compiling apparatus 110 are identical to those components. The following explanation focuses on those points that are unique to this embodiment.

Input Unit 12b

The input unit 12b, like the input unit 12, receives input of a command name run and at least one file name from an operator.

The input unit 12b reads files having the received at least one file name from the program unit 11. A file is read out one statement at a time. If a read statement is an #include statement, the input unit 12 reads a file indicated by the #include statement, and expands the content of the read file at the position in the program where the #include statement is written.

The input unit 12b writes the read file into the unread file set storage unit 13 using the same file name. The set of files written into the file set storage unit 13 by the input unit 12b is referred to as the unread file set TF.

Next, the input unit 12b reads files f1 stored in the unread file storage unit 13 one by one, writes each read file f1 into the first storage 32, and deletes each file f1 read from the unread file set TF.

The input unit 12b repeats processing for reading, writing and deleting files f1 until all files stored in the unread file set storage unit have been read.

First Storage Unit 32b

The first storage unit 32b stores files output from the input unit 12b.

Syntax Analyzing Unit 33b

The syntax analyzing unit 33b reads tokens from each file stored in the first storage unit 32b in turn, performs conventional analysis, attaches a file name to the information resulting from the analysis and writes it into the second storage unit 34. Conventional syntax analysis is a well-known technique, so explanation is omitted here.

If the analyzed syntax is a class definition, the syntax analyzing unit 33b extracts a class definition C1 and a base class set BSET of the class definition C1, and outputs the extracted class definition C1 and base class set BSET to the inheritance relationship extracting unit 50.

The syntax analyzing unit 33b repeats processing for extraction of a token, conventional syntax analysis, extraction and output of a class definition C1 and a base class set BSET if the analyzed syntax is a class definition, and writing of an analysis result until reading of tokens from each file stored in the first storage unit 32b is completed.

Total Class Definition Set Storage Unit 15

The total class definition set storage unit 15, like the total class definition set storage unit 15 in the first embodiment, stores a total class definition set TSET. The total class definition set TSET contains class definitions.

Inherited Class Set Storage Unit 18

The inherited class set storage unit 18, like the inherited class set storage unit 18 in the first embodiment, stores an inherited class set ISET. The inherited class set ISET contains class names.

Inheritance Relationship Extracting Unit 50

The inheritance relationship extracting unit 50 receives a class definition C1 and a base class set BSET from the syntax analyzing unit 33b.

The inheritance relationship extracting unit 50 judges whether the received class definition C1 is included in the total class definition set TSET in the total class definition set storage unit 52. If the received class definition C1 is judged not to be included, the inheritance relationship extracting unit 51 writes the class definition C1 into the total class definition set TSET.

The inheritance relationship extracting unit 50 judges whether each element C2 in the received base class set BSET is included in the inherited class set ISET in the inherited class set storage unit 18. If an element C2 is judged not to be included, the inheritance relationship extracting unit 50 writes the element C2 into the inherited class set ISET.

Intermediate Code Generating Unit 36

The intermediate code generating unit 36 reads information for analysis results from the second storage unit 34, generates intermediate code, attaches a file name to the generated intermediate code, and stores it in the intermediate code storage unit 54.

Intermediate Code Storage Unit 54

The intermediate code storage unit 54 stores generated intermediate code.

1.2 Operation of Optimization Information Analyzing Unit 130

The following is an explanation of the operation of the optimization information analyzing unit 130.

Overall Operation of Operation Information Analyzing Unit 130

Figure 41:
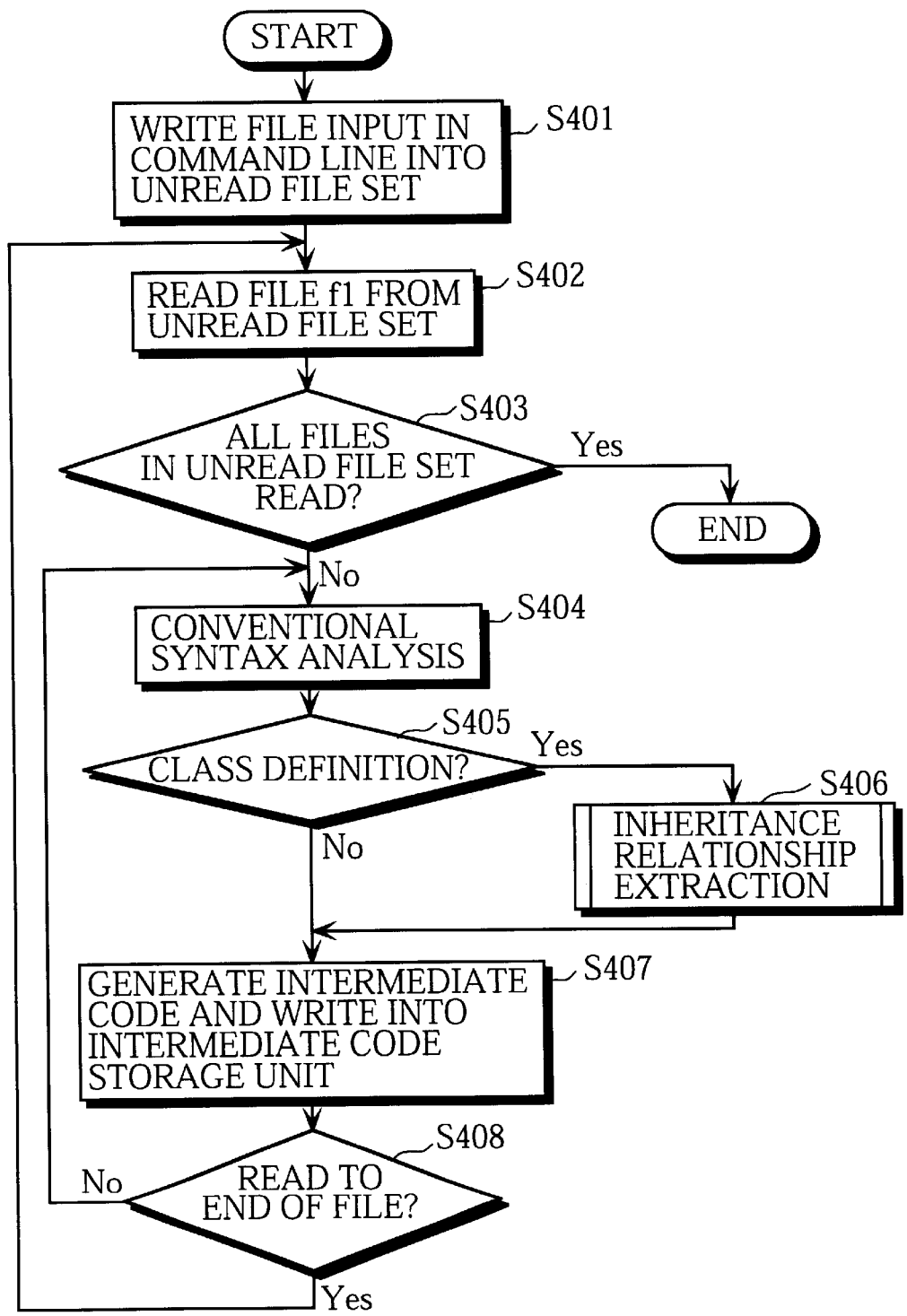
FIG. 41 is a flowchart showing the overall operation of an optimization information analyzing apparatus 130.

The following is an explanation of the overall operation of the optimization information analyzing unit 130 with reference to the flowchart in FIG. 41.

The input unit 12b receives input from an operator, reads a file having the file name included in the received character string from the program storage unit 11, and writes the read file into the unread file set storage unit 13 using the same. file name (step S401).

The input unit 12b reads a file f1 stored in the unread file set storage unit 13 (step S402). If all files have been read from the unread file set storage unit 13 (step S403), processing ends.

If the input unit 12b has not read all the files in the unread file set storage unit 13 (step S403), the syntax analyzing unit 33b performs conventional syntax analysis on the read file f1, and writes information including the analysis result in the second storage unit 34 (step S404).

Next, the syntax analyzing unit 33b judges whether the analyzed statement is a class definition, and if it is (step S405), outputs the class C1 and the base class set BSET to the inheritance relationship extracting unit 50, which executes inheritance relationship extraction (step S406).

Following this, the code generating unit 36 reads information including an analysis result, generates intermediate code and writes the generated intermediate code into the intermediate code storage unit 54 (step S407).

Next, the syntax analyzing unit 33b judges whether the entire file has been processed, and if processing of the file is not yet completed (step S408), control returns to step S404, and processing for conventional syntax analysis and, if a class definition is present, inheritance relationship extraction and intermediate code generation, is repeated until the entire file is processed.

If the entire file has been processed (step S408), control returns to step S402, and the above processing is repeated until all files in the unread file set have been read.

Operation of Inheritance Relationship Extracting Unit 50

Figure 42:
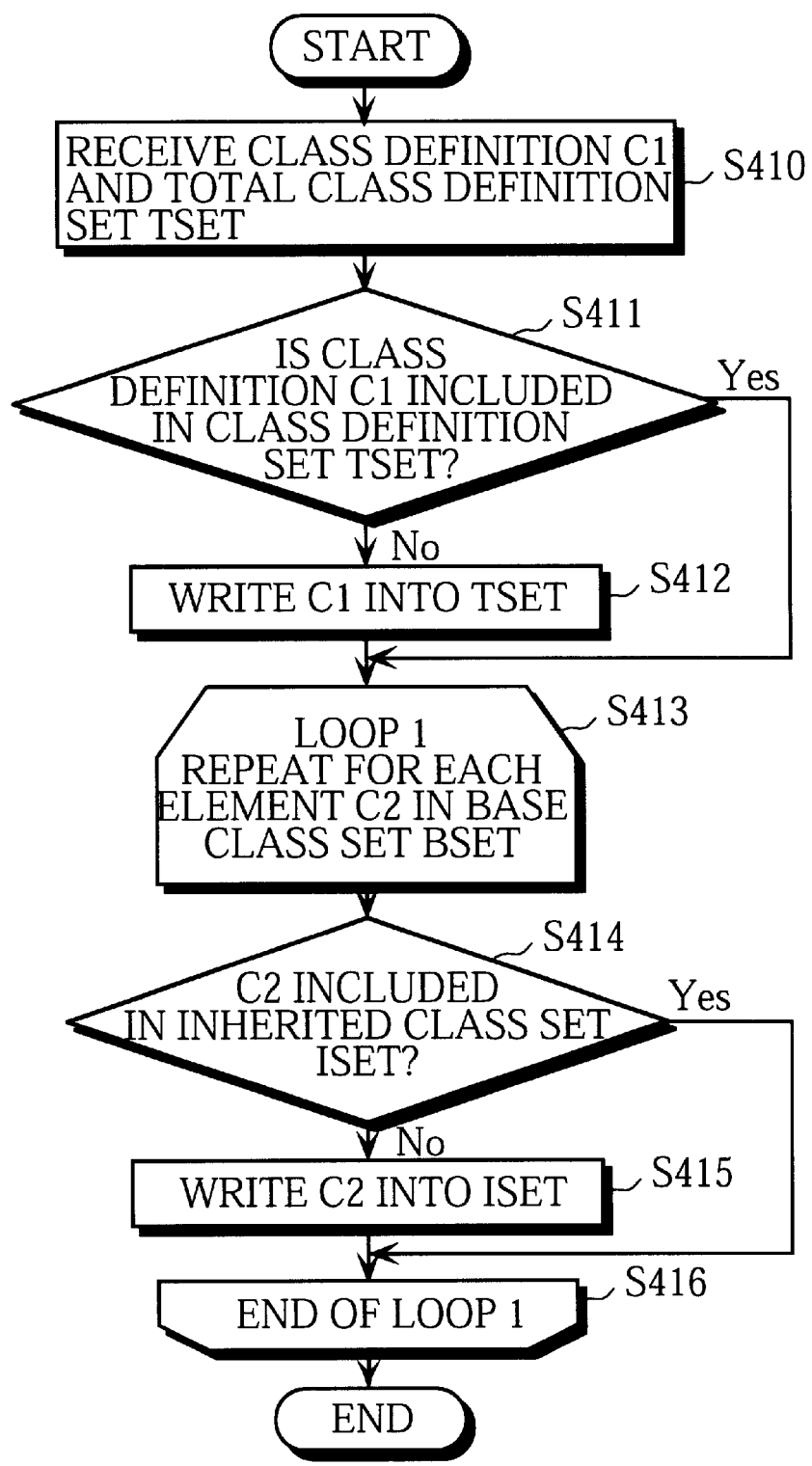
FIG. 42 is a flowchart showing the operation of an inheritance relationship extracting unit 50.

The operation of the inheritance relationship extracting unit 50 is explained with reference to the flowchart in FIG. 42.

The inheritance relationship extracting unit 50 receives a class definition C1 analyzed by the syntax analyzing unit 33b, and a base class set BSET containing base classes inherited by the class definition C1 (step S410). Next, the inheritance relationship extracting unit 50 judges whether the received class definition C1 is included in the total class definition set TSET. If the class definition C1 is included (step S411), control moves to step S413, and if not (step S411), the inheritance relationship extracting unit 50 writes the class definition C1 in the total class definition set TSET (step S412).

Next, the inheritance relationship extracting unit 50 repeats loop 1, i.e. steps S413 to S416 for each class C2 included in the received base class set BSET. Once processing of all classes included in the base class set BSET has been completed, the processing performed by the inheritance relationship extracting unit 50 is completed.

The inheritance relationship extracting unit 50 judges whether a class C2 is included in the inherited class set ISET. If the class C2 is included in the inherited class set ISET (step S414), control moves to step S416. If not (step S414), the inheritance relationship extracting unit 50 writes the class C2 into the inherited class set ISET (step S415).

2 Compiling Apparatus 110b

The following is an explanation of the construction of the compiling apparatus 110b.

2.1 Construction of Compiling Apparatus 110b

Figure 43:
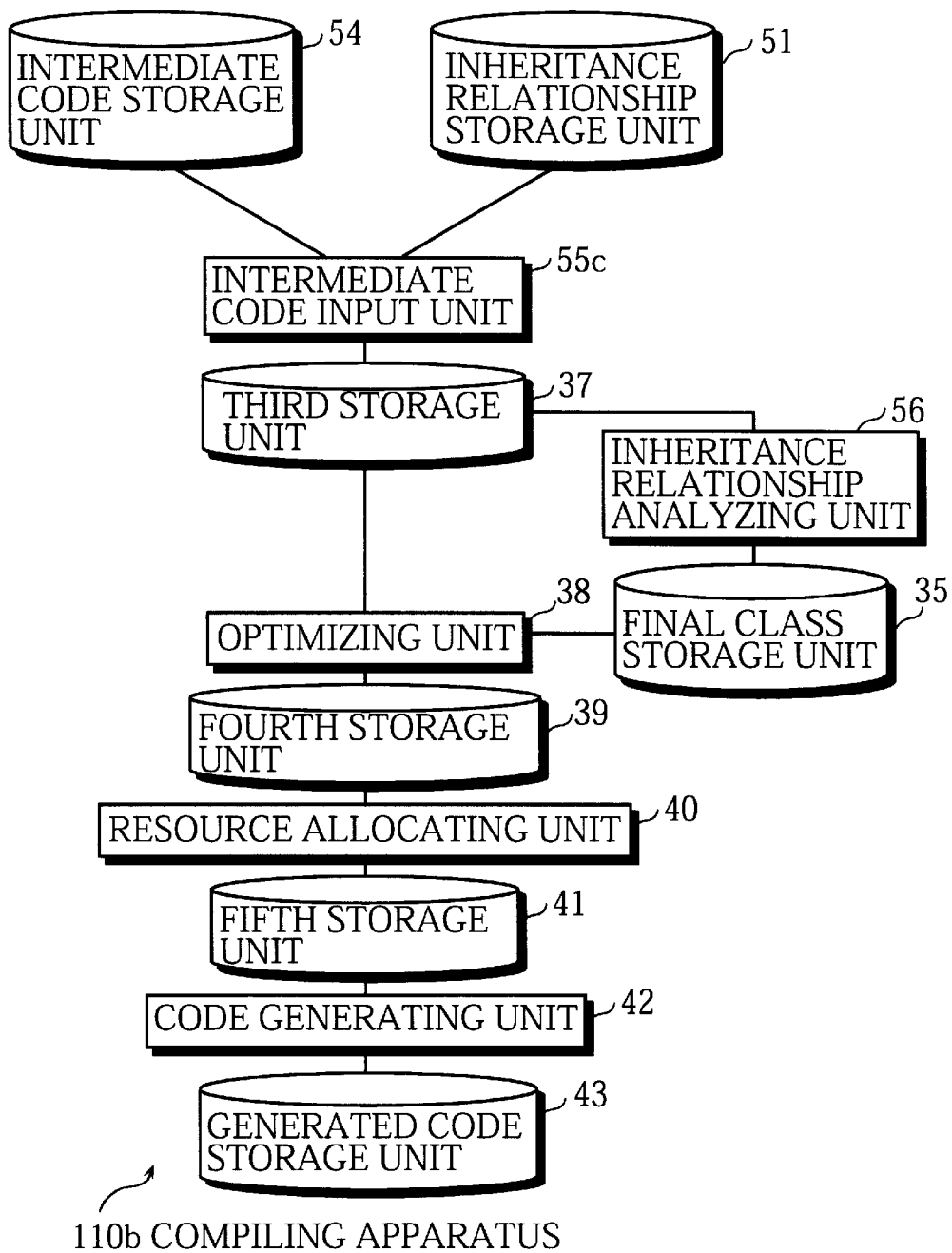
FIG. 43 is a block diagram showing a construction of a compiling apparatus 10b.

The compiling apparatus 10b shown in FIG. 43 includes an intermediate code generating unit 54, an inheritance relationship storage unit 51, an intermediate code input unit 55, a third storage unit 37, an inheritance relationship analyzing unit 56, a final class storage unit 35, an optimizing unit 38, a fourth storage unit 39, a resource allocating unit 40, a fifth storage unit 41, a code generating unit 42, and a generated code storage unit 43.

The intermediate code storage unit 54 and the inheritance relationship storage unit 51 are the same as the intermediate code storage unit 54 and the inheritance relationship storage unit 51 in the optimization information analyzing unit 130. In addition, components of the compiling apparatus 110b are identical to components in the compiling apparatus 110 that have the same numerical references. The following explanation concentrates on those points which differ from the previous embodiments.

Intermediate Code Input Unit 55

The intermediate code input unit 55, like the input unit 12b, receives an input character string from an operator, and parses the received input, generating a command name and at least one file name. Here, one example of an input file name is filez.cc. A file name consists of a file identifier for identifying the individual file, a separator '.' and a file type. Here, filez is the file identifier and cc the file type. Next, the intermediate code input unit 55 converts the at least one file name to a file name for an intermediate code file. One example of a file name indicating an intermediate to code file is filez.m. In this conversion example, the file type cc in the file name filez.cc is converted to the file type m. Next, the intermediate code input unit 55 reads at least one file having the converted file name from the intermediate code storage unit 54, attaches a same file name to the read file, and writes the file into the third storage unit 37. Furthermore, the intermediate code input unit 55 reads the total class definition set TSET from the total class definition set storage unit 15, and writes the read total class definition set TSET in the third storage unit 37. Then, the intermediate code input unit 55 reads the inherited class set ISET from the inherited class set storage unit 18, and writes the read inherited class set ISET in the third storage unit 37.

Note that, rather than receiving an input file name from an operator and reading intermediate code, the intermediate code input unit 15 may read all intermediate code files stored in the intermediate code storage unit 54.

Third Storage Unit 37

The third storage unit 37 stores intermediate code files, the total class definition set TSET and the inherited class set ISET.

Inheritance Relationship Analyzing Unit 56

The inheritance relationship analyzing unit 56, like the inheritance relationship analyzing unit 19 in the first embodiment, reads all class definitions included in the total class definition set TSET and all class definitions included in the inherited class set ISET, stored in the third storage unit 37.

Next, the inheritance relationship analyzing unit 56 deletes all the class names included in the read inherited class set ISET from the class definitions included in the total class definition set TSET. The remaining class definitions form the final class set FSET.

The inheritance relationship analyzing unit 56 writes the final class set FSET into the final class storage unit 35.

Figure 44:
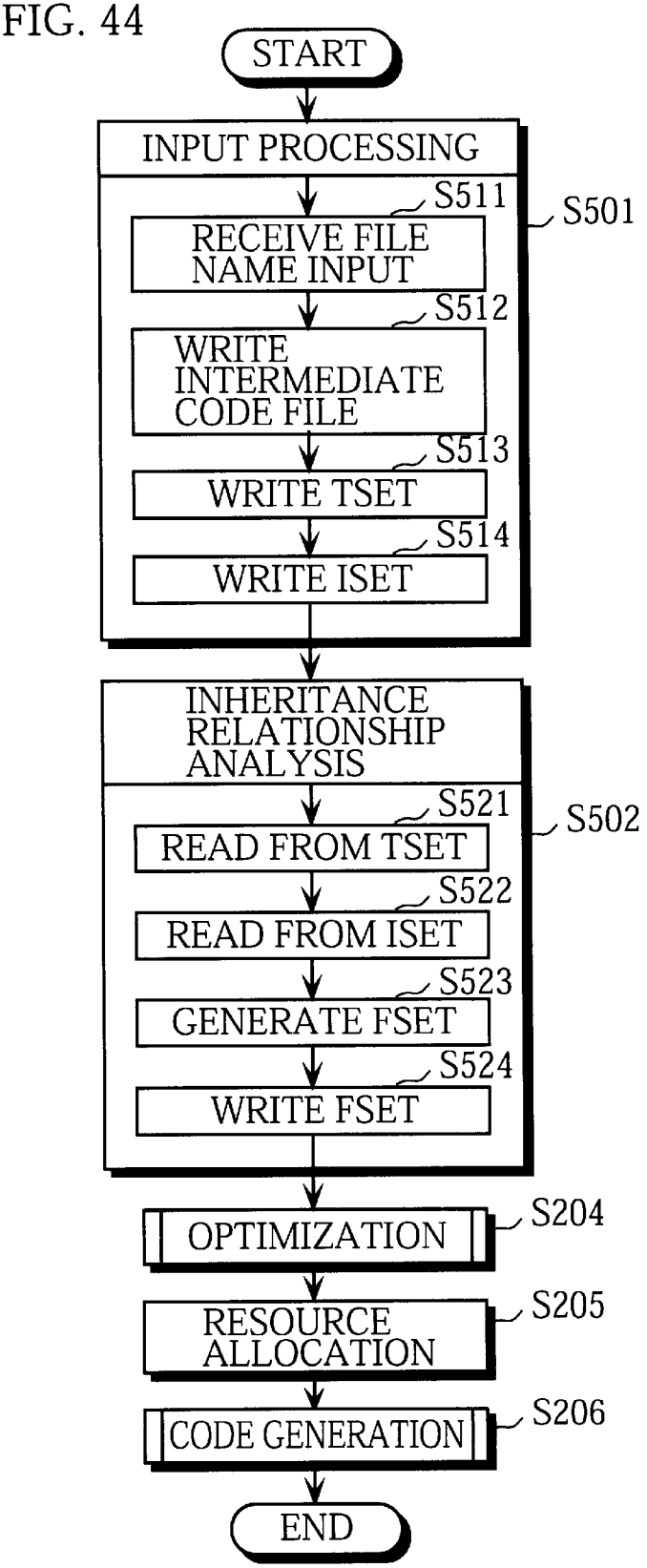
FIG. 44 is a flowchart showing the overall operation of a compiling apparatus 10b.

2.2 Operation of Compiling Apparatus 110b The following is an explanation of the compiling apparatus 10b with reference to the flowchart shown in FIG. 44.

Steps S204 to S206 of the flowchart in FIG. 44 are the same as steps S204 to S206 of the flowchart in FIG. 18, and so explanation of these steps is omitted here.

In step S501, the intermediate code input unit 55 in the compiling unit 10b receives an input file name from an operator, and converts the input file name to a file name for an intermediate file (step S511). Then, the intermediate code input unit 55 reads an intermediate file with the converted file name from the intermediate code storage unit 54, and writes the read file into the third storage unit 37 (step S512). The intermediate code input unit 55 reads the total class definition set TSET from the total class definition set storage unit 15 in the inheritance relationship unit 51, and writes the read total class definition set TSET in the third storage unit 37 (step S513), reads the inherited class set ISET from the inherited class set storage unit 18, and writes the read inherited class set ISET into the third storage unit 37 (step S514).

Next, in step S502, the inherited relation analyzing unit 56 reads all the class definitions included in the total class definition set TSET stored in the third storage unit 37 (step S521), and reads all the class names stored in the inherited class set ISET (step S522). Then, the inherited relation analyzing unit 56 deletes class definitions shown by all of the class names included in the read inherited class set ISET from the class definitions included in the total class definition set TSET (step S523), and writes the remaining class definitions into the final class storage unit 35 as a final class storage set FSET (step S524).

3 Conclusion

As explained above, the optimization information analyzing apparatus in the present invention generates intermediate code, and total class definition and inherited class sets. Then the compiling apparatus of the present invention extracts classes which are not inherited from the generated total class definition and inherited class sets, and converts virtual function calls for the extracted non-inherited classes to direct function calls. This means that opportunities for optimization are increased, and the number of generated executable instructions is reduced.

IV Fourth Embodiment

The following is an explanation of a program conversion apparatus 120c (not shown) in a fourth embodiment of the invention.

The program conversion apparatus 120c, like the program conversion apparatus 120b, includes an optimization information analyzing apparatus 130c and a compiling apparatus 110c, collects information relating to virtual functions as optimization information, generates program code, and performs optimization using the collected information and the generated program code.

1 Optimization Information
Analyzing Apparatus 130c

The following is an explanation of the optimization information analyzing apparatus 130c.

1.1 Construction of Optimization Information Analyzing Apparatus 130c

Figure 45:
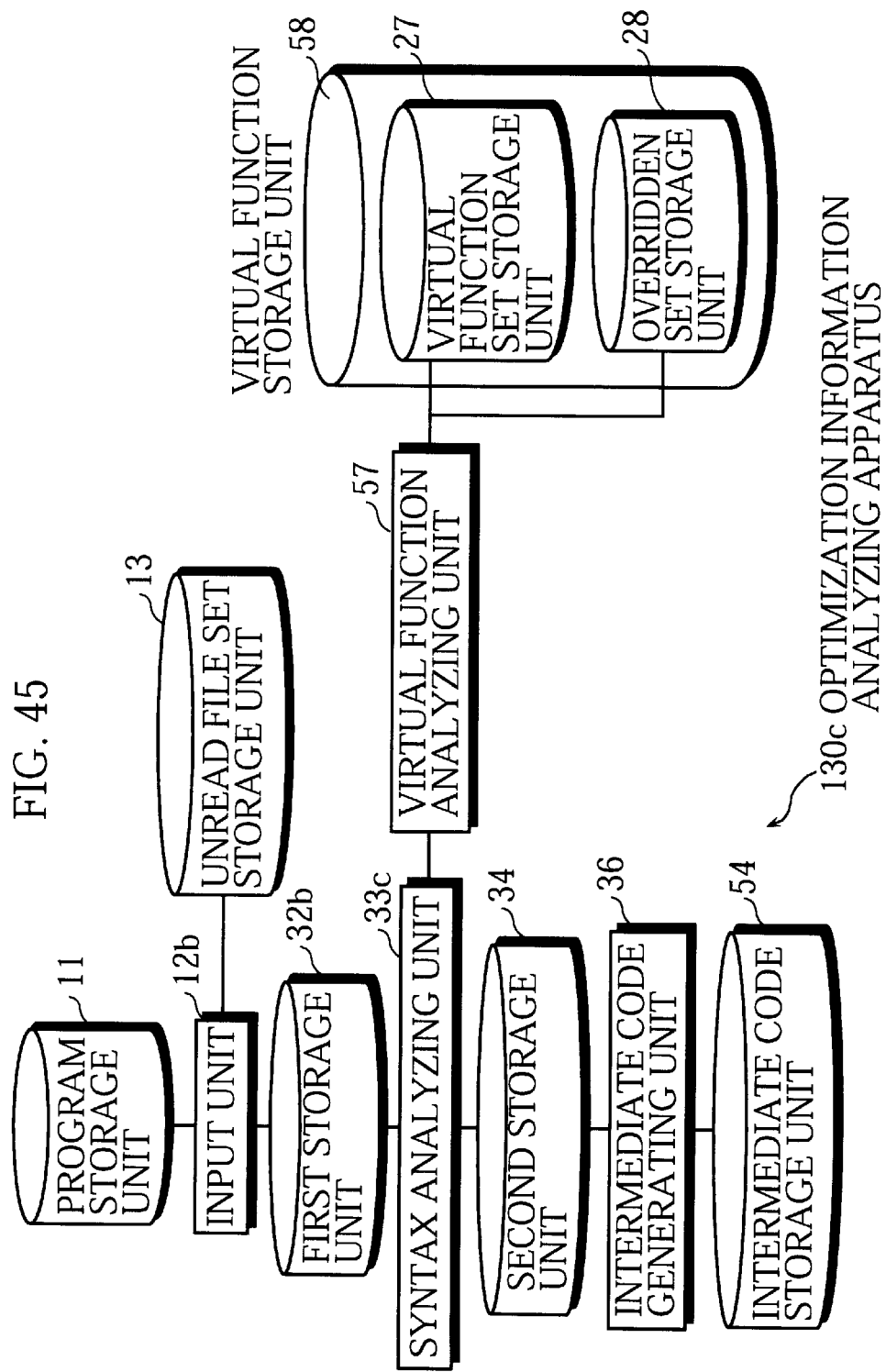
FIG. 45 is a block diagram showing a construction of an optimization information analyzing apparatus 130c in a program conversion apparatus 120c of a fourth embodiment of the invention.

The optimization information analyzing apparatus 130c, as shown in FIG. 45, includes a program storage unit 11, an input unit 12b, an unread file set storage unit 13, a first storage unit 32b, a syntax analyzing unit 33c, a second storage unit 34, an intermediate code generating unit 36, a virtual function analyzing unit 57, a virtual function storage unit 58, and an intermediate code storage unit 54. The virtual function storage unit 58 includes a virtual function set storage unit 27 and an overridden set storage unit 28.

The optimization information apparatus 130c has a syntax analyzing unit 33c, a virtual function analyzing unit 57 and a virtual function storage unit 58 instead of the syntax analyzing unit 33b, inheritance relationship extracting unit 50 and inheritance relationship storage unit 51 included in the optimization information analyzing apparatus 130.

The following explanation focuses on the differences between the optimization information analyzing apparatus 130c and the optimization information analyzing apparatus 130.

Syntax Anallyzing Unit 33c

The syntax analyzing unit 33c reads tokens in turn from files stored in the first storage unit 32b, performs conventional syntax analysis, attaches file names to the analysis results, and writes them into the second storage unit 34. Conventional syntax analysis is a well-known technique and so explanation is omitted here.

When the analyzed syntax is a class definition statement, the syntax analyzing unit 33c generates a set VSET1 including all virtual functions VF declared in the analyzed class definition statement, outputs the set VFSET1 of generated virtual functions, and the analyzed class definition to the virtual function analyzing unit 57.

The syntax analyzing unit 33c repeats processes for extraction of tokens, conventional syntax analysis, generation of a set VFSET1 when the analyzed syntax is a class definition, and output of the class definition and set VFSET1, until reading of tokens from all of the files stored in the first storage unit 32b has been completed.

Virtual Function Set Storage Unit 27, and Overridden set Storage Unit 28

The virtual function set storage unit 27, and the overridden set storage unit 28 are the same as the virtual function set storage unit 27 and the overridden set storage unit 28 in the optimization information attaching apparatus 100a, so explanation is omitted here.

Virtual Function Analyzing Unit 57

The virtual function analyzing unit 57 has a virtual function set VFSET used as an internal variable. This virtual function set VFSET is the same as the virtual function set VFSET in the optimization information attaching apparatus 100*a*.

The virtual function analyzing unit 57 receives the class definition statement and the virtual function set VFSET1 from the syntax analyzing unit 33*c*, and judges whether a base class is included in the received class definition statement.

If a base class is not included, the virtual function 57 stores a class name C1 included in the received class definition statement into an area storing a class name for the to virtual function set VFSET, and deletes data from an area storing a class name and function name pairs in the virtual function set VFSET.

If a base class is included, the virtual function analyzing unit 57 obtains a virtual function set having the base class C2 included in the class definition as a class name from the virtual function set storage unit 27, takes the obtained virtual function set as the virtual function set VFSET, and stores the class name C1 included in the class definition statement in the area storing the class name of the virtual function set VFSET, instead of the base class C2.

Next, the virtual function analyzing unit 57 judges whether each virtual function VF written in the set of virtual functions VFSET1 obtained from the syntax analyzing unit 33*c* is present in the virtual function set VFSET.

If a virtual function VF is judged to be in the virtual function set VFSET, the virtual function analyzing unit 57 writes a paired virtual function VF' and a class name in the overridden set OVSET in the overridden set storage unit 28, the virtual function VF' being a function in the virtual function set VFSET with the same name as the virtual function VF. Then, the virtual function analyzing unit 57 deletes the paired virtual function VF' and corresponding class name from the virtual function set VFSET, replacing them with the virtual function VF and the class name C1 included in the class definition statement.

If the virtual function VF is judged not to be in the virtual function set VFSET, the virtual function analyzing unit 57 writes a paired virtual function VF and class name C1 defined in the class definition statement into the area for storing pairs inside the virtual function set VFSET.

Next, the virtual function analyzing unit 57 writes the virtual function set VFSET into the virtual function set storage unit 27.

Here, as in the second embodiment, the virtual function set 1151 shown in FIG. 31 and the overridden set shown in FIG. 32 are formed from the file 1101 shown in FIG. 30. Furthermore, the virtual function set 1161 shown in FIG. 31 is formed from the file 1102 shown in FIG. 30.

1.2 Operation of Optimization Information Analyzing Apparatus 130*c*

Overall Operation of Optimization Information Analyzing Apparatus 130*c*

The overall operation of the optimization information analyzing apparatus 130*c* is identical to the overall operation of the optimization information analyzing apparatus 130 shown in the flowchart of FIG. 41, except for the differing points explained below.

In step S406, the syntax analyzing unit 33*b* of the optimization information analyzing apparatus 130 outputs a class definition C1 and a base class set BSET to the inheritance relationship extracting unit 50, and the inheritance relationship extracting unit 50 extracts inheritance relationships. Here, instead the syntax analyzing unit 33*c* in the optimization information analyzing apparatus 130*c* outputs a class definition statement and a virtual function set VFSET1 to the virtual function set analyzing unit 57, and the virtual function set analyzing unit 57 performs the following virtual function analysis processing.

Operation of Virtual Function Analysis Unit 57

The operation of the virtual function analyzing unit 57 is the same as that of the virtual function analyzing unit 26 in the second embodiment, and is explained with reference to the flowchart in FIG. 35.

The virtual function analyzing unit 57 receives a class definition statement and a virtual function set VFSET1 from the syntax analyzing unit 33*c*, and judges whether a base class is written in the received class definition statement. If a base class is not written in the class definition statement (step S321), the virtual function analyzing unit 57 stores a class name C1 defined in the class definition statement into the area storing the class name for the virtual function set VFSET, and deletes the area in which pairs from the VFSET are stored (step S323). If a base class is written in the class definition statement (step S321), the virtual function analyzing unit 57 obtains a virtual function set having a base class C2 written in the class definition statement as a class name from the virtual function set storage unit 27, takes the obtained virtual function set to be virtual function set VFSET, and stores the class name C1 defined in the class definition statement instead of the base class C2 in the area storing the class name for the virtual function set VFSET (step S322).

Next, the virtual function analyzing unit 57 repeats steps S325 to S328 for each virtual function VF included in the virtual function set VFSET1 obtained from the syntax analyzing unit 33*c*.

In steps S325 to S328, the virtual function analyzing unit 57 judges whether a virtual function VF is present in the virtual function set VFSET, and if the virtual function VF is judged to be in the set (step S325), writes a paired virtual function VF' and corresponding class name into the overridden function set OVSET in the overridden function set storage unit 28, the function VF' being a function from the virtual function set VFSET having the same name as the virtual function VF (step S326). Then, the virtual function analyzing unit 57 deletes the virtual function VF' and the corresponding class name from the virtual function set VFSET, replacing them with the virtual function VF and the class name C1 defined in the class definition statement into the (step S327).

If the virtual function VF is judged not to be in the virtual function set VFSET (step S325), the virtual function analyzing unit 57 writes the pair of the class name C1 defined in the class definition statement and the virtual function VF into the area storing pairs for the virtual function VFSET (step S328).

Next, the virtual function analyzing unit 57 writes the virtual function set VFSET in the virtual function set storage unit 27 (step S330).

Compiling Apparatus 110*c*

The following is an explanation of the compiling apparatus 110*c*.

2.1 Compiling Apparatus 110*c*

Figure 46:
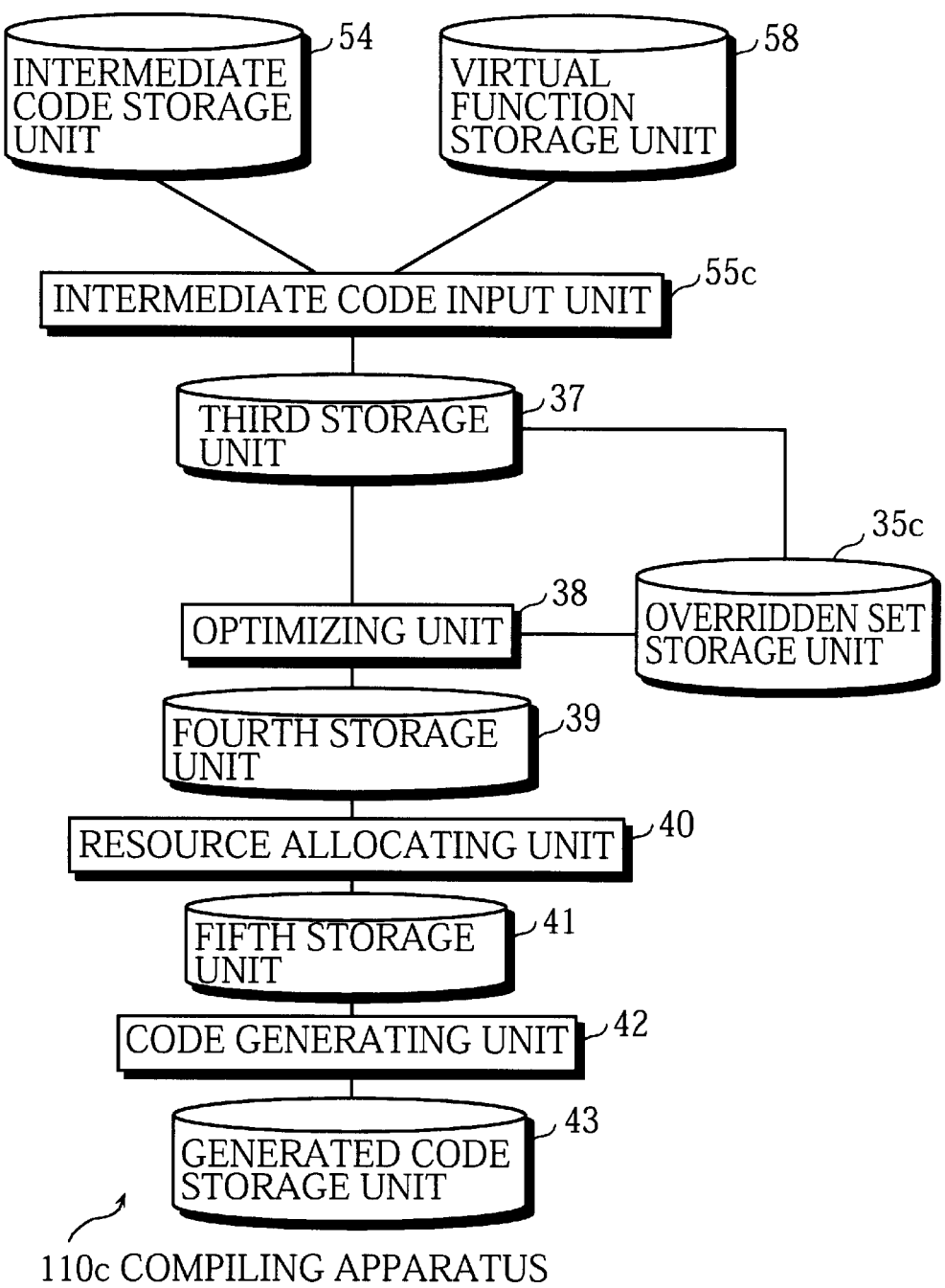
FIG. 46 is a block diagram showing a construction of the compiling apparatus 110c in the program conversion apparatus 120c.

The compiling apparatus 110*c* shown in FIG. 46 includes an intermediate code storage unit 54, a virtual function storage unit 58, an intermediate code input unit 55*c*, a third storage unit 37, an overridden set storage unit 35*c*, an optimizing unit 38, a fourth storage unit 39, a resource allocating unit 40, a fifth storage unit 41, a code generating unit 42 and a generated code storage unit 43. The compiling apparatus 110*c* includes the overridden set storage unit 35*c* instead of the inheritance relationship analyzing unit 56 and final class storage unit 35 in the compiling apparatus 110b, and the intermediate code input unit 55c instead of the intermediate code input unit 55 in the compiling apparatus 10b.

Those components of the compiling apparatus 110c are identical to components of the compiling apparatus 110b having the same numerical references. The following explanation focuses on those components that differ from the compiling apparatus 110b.

Virtual Function Storage Unit 58

The virtual function storage unit 58, like the virtual function storage unit 58 in the optimization information analyzing apparatus 130c, includes a virtual function set storage unit 27 and an overridden set storage unit 28. The overridden set storage unit 28 stores the results of analysis performed by the virtual function analyzing unit 57.

Intermediate Code Input Unit 55c

The intermediate code input unit 55c, like the intermediate code input unit 55, receives an input character string from an operator, parses the received character string, and generates one command name and at least one file name. Then, the intermediate code input unit 55c converts the generated at least one file name to an intermediate file name, reads at least one file having the converted at least one file name from the intermediate code storage unit 54, and writes the read file in the third storage unit 37. The intermediate code input unit 55c further reads an overridden set OVSET from the overridden set storage unit 28, and writes the read overridden set OVSET into the overridden set storage unit 35c.

Note that the intermediate code input unit 55c, instead of receiving an input file name from an operator and reading intermediate code, may read all of the intermediate code files stored in the intermediate code storage unit 54.

Overridden set Storage Unit 35c

The overridden set storage unit 35c stores overridden functions. An overridden function includes a paired class name and virtual function name.

Optimizing Unit 38

The optimizing unit 38, like the optimizing unit 38 in the second embodiment, reads an intermediate code sequence stored in the third storage unit 37 and if the command name for the read intermediate code sequence is a virtual function call, judges whether the class name and function name included in the intermediate code sequence are stored in the overridden set storage unit 35c. If these items are stored, the optimizing unit 38 performs conventional optimization, and if not, rewrites the virtual function flag included in the read intermediate code sequence as real, indicating that the function is not a virtual function, and writes the intermediate code sequence in the fourth storage unit 39.

As in the second embodiment, the example overridden set shown in FIG. 32 has a class X and a function f. In the file 1103 in FIG. 30, virtual function calls are performed in the assignment statements for the variables x1, x2, y1 and y2.

A virtual function called by the right side of the assignment statement for the variable x1 is a function f belonging to class X, so this function is included in the overridden set, and a conventional virtual function call is performed.

The virtual functions called by the right side of the assignment statements for the variables x2, y1 and y2 are respectively a function g belonging to class X, a function f belonging to class Y and a function g belonging to class Y. This means that none of these functions is included in the overridden set, and function calls can therefore be changed to direct function calls.

2.2 Operation of Compiling Apparatus 110c

The following is an explanation of compiling apparatus 110c.

Overall Operation of Compiling Apparatus 110c

Figure 47:
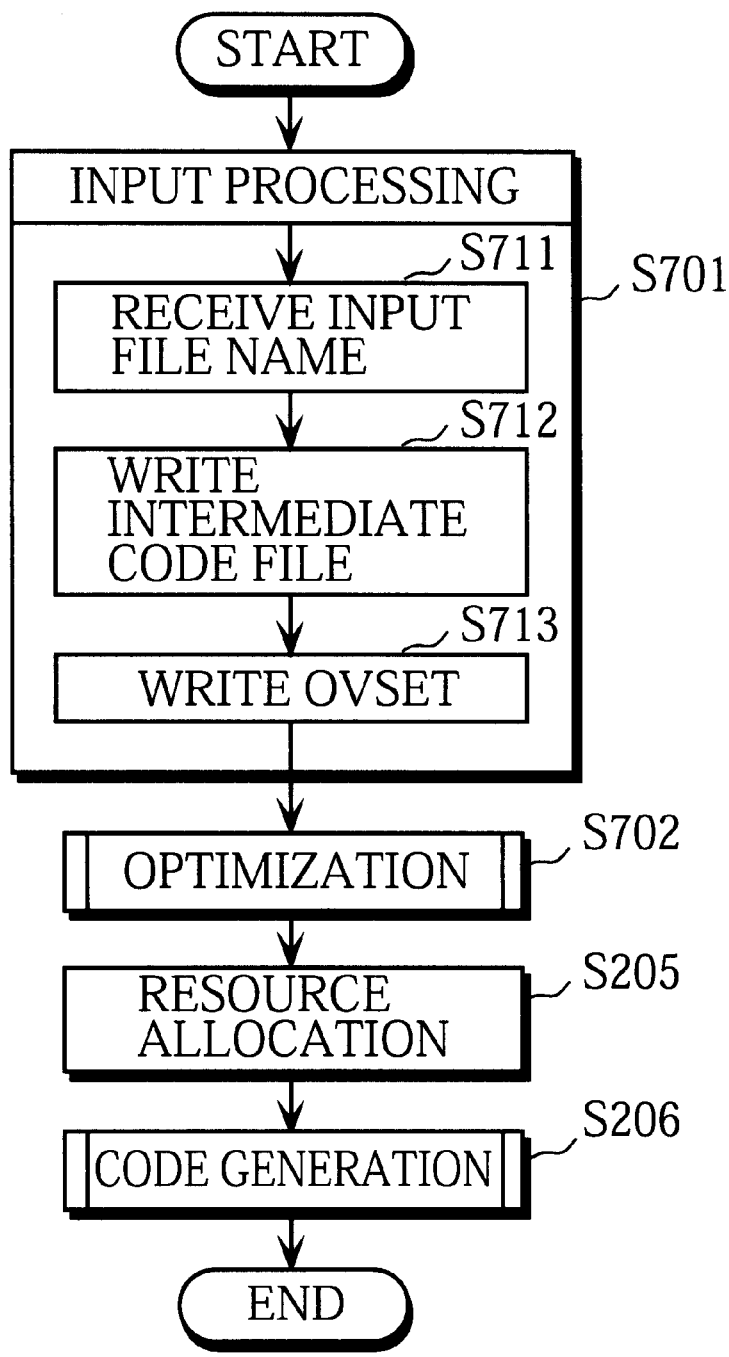
FIG. 47 is a flowchart showing the overall operation of the compiling apparatus 110c.

The following is an explanation of the overall operation of compiling apparatus 110c, with reference to the flowchart in FIG. 47.

Steps S205 and S206 of the flowchart of FIG. 47 are the same as steps S205 and S206 of the flowchart in FIG. 18, so explanation is omitted here.

In step S701, the intermediate code input unit 55c in the compiling apparatus 110c receives an input file name from an operator, and converts it to a file name for an intermediate code file (step S711), reads a corresponding file from the intermediate code storage unit 54, and writes the read file into the third storage unit 37 (step S712). Then, the intermediate code input unit 55c reads an overridden set OVSET from the overridden set storage unit 28 in the virtual function storage unit 58, and writes the read overridden set OVSET into the overridden set storage unit 35c (step S713).

Next, the optimizing unit 38 in the compiling apparatus 110c performs the following optimization (step S702).

Operation of Optimizing Unit 38

The operation of the optimizing unit 38 is explained with reference to the flowchart of FIG. 38.

The optimizing unit 38 reads an intermediate code sequence stored in the third storage unit 37, and judges whether the command name of the read intermediate code sequence is a function call, and whether the virtual function flag is virtual. If the command is a virtual function call (step S381), the optimizing unit 38 judges whether the class name and function name included in the read intermediate code sequence are stored in the overridden set storage unit 35c. If the class name and function name are not stored (step S382), the virtual function flag included in the read intermediate code sequence is rewritten as real, and the intermediate code sequence is written into the fourth storage unit 39 (step S383). Processing is then repeated.

If the class name and function name included in the intermediate code sequence are stored in the overridden set storage unit 35c (step S382), the optimizing unit 38 performs conventional optimization, and writes the optimized intermediate code sequence into the fourth storage unit 39 (step S384). Processing is then repeated.

3 Conclusion

As explained above, a virtual function call for virtual functions which are not overridden is converted to a direct function call, enabling opportunities for optimization to be increased and the number of executable instructions generated to be reduced.

As in the second embodiment, FIG. 39A and 39B show examples of executable instructions generated from the file 1103 in FIG. 30. FIG. 39A shown the executable instructions generated when virtual function calls are using without alteration, as in a conventional method, and FIG. 39B the executable instructions generated when those virtual functions which are not overridden are converted to direct function calls. In this latter example, the above optimization is applied and inline expansion is performed on the functions, so that the number of generated executable instructions is reduced.

Alternatives

The invention has been explained in relation to the above embodiments, but need not, of course, be restricted to such constructions. The invention may also include the following:

1. The invention may be realized by a method that operates in the same way as the constructions described in the embodiments, or by a computer program which can be distributed by being recorded on a floppy disk or similar computer-readable recording medium or via a network, enabling the computer program to be easily implemented in a different computer system.

2. The invention may be a combination of any of the above embodiments and the above alternative.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A program conversion apparatus that generates at least one executable instruction from a source program written in an object-orientated programming language, and comprises:
   - a storage means for storing the source program including a plurality of class definitions and a call instruction having a function name, each class definition defining a class, an inheritance relationship between the class and another class, and a virtual function belonging to the class and identified by the function name,
   - only one of the virtual functions defined in the plurality of class definitions being executed when the call instruction is executed;
   - a judging means for judging whether a single virtual function from the virtual functions can be determined as the virtual function identified by the function name in the call instruction, judgement performed by referring to the source program without executing the call instruction;
   - a generating means for generating, when a single function is determined, an executable instruction for calling directly an executable instruction group corresponding to the single virtual function.

2. The program conversion apparatus of claim 1, wherein:
   the judging means judges whether a single virtual function can be determined by using the class definitions to judge whether a virtual function identified by the function name in the call instruction belongs to a class that is not inherited by another class; and
   the generating means generates the executable instruction when the virtual function belongs to a class that is not inherited by another class.

3. The program conversion apparatus of claim 2, wherein:
   when a class inherits another class, a class definition in the source program stored in the storage means includes the other class, the other class being a base class; and
   the judging means includes:
   - a class extracting means for reading all class definitions included in the source program, extracting classes from the read class definitions, and storing the extracted classes;
   - an inheritance relationship extracting means for reading all class definitions included in the source program, extracting base classes from the read class definitions, and storing the extracted base classes;
   - an inheritance relationship analyzing means for extracting classes from the classes stored in the class extracting means, excluding the base classes stored in the inheritance relationship extracting means, and storing the extracted classes;
   - an optimization information attaching means for attaching optimization information to the source program stored by the storage means when the source program includes a class definition including a class stored in the inheritance relationship analyzing means; and
   - a class judging means for judging, using the optimization information attached to the source program, whether a virtual function identified by the function name in the call instruction belongs to a class that is not inherited by another class.

4. The program conversion apparatus of claim 3, wherein:
   the optimization information attaching means attaches optimization information to the source program so as to correspond to class definitions that define classes stored by the inheritance relationship analyzing means.

5. The program conversion apparatus of claim 3, wherein:
   the optimization information attaching means attaches optimization information to the source program so as to correspond to virtual functions included in class definitions that define classes stored in the inheritance relationship analyzing means.

6. The program conversion apparatus of claim 5, wherein the optimization information is a keyword used in an object-orientated programming language.

7. The program conversion apparatus of claim 5, wherein the optimization information is a character string unique to the program conversion apparatus.

8. The program conversion apparatus of claim 2, wherein:
   the program conversion apparatus generates an executable program from the source program by first producing an intermediate program,
   when a class defined by a class definition in the source program inherits another class, the class definition includes a base class showing the other class, and
   the judging means includes:
   - a class extracting means for reading all class definitions included in the source program, and extracting classes from the read class definitions;
   - an inheritance relationship extracting means for reading all class definitions included in the source program, and extracting base classes from the read class definitions;
   - an inheritance relationship analyzing means for extracting classes from the classes extracted by the class extracting means, excluding the base classes extracted by the inheritance relationship extracting means,
   - an intermediate generating means for generating, from the call instruction included in the source program, an intermediate call instruction having a function name; and
   - an intermediate judging means for judging whether the virtual function called by the generated intermediate call instruction belongs to a class extracted by the inheritance relationship analyzing means; and
   wherein the generating means generates the executable instruction when the intermediate judging means judges that the virtual function belongs to an extracted class.

9. The program conversion apparatus of claim 1, wherein:
   the judging means judges whether a single virtual function can be determined by using a class definition included in the source program to judge whether a virtual function identified by the function name in the call instruction is overridden; and the generating means generates the executable instruction when the judging means judges that the virtual function is not overridden.

10. The program conversion apparatus of claim 9, wherein:

when a class defined by a class definition in the source program inherits another class, the class definition includes a base class showing the other class, and the judging means includes:

an overridden function extracting means for reading all class definitions included in the source program, and extracting overridden virtual functions by using the read class definitions, the overridden function extracting means including:

(1) a reading/judging unit for reading a class definition included in the source program, and judging whether the read class definition includes a base class, (2) a first determining unit for determining, when a base class is not included in the read class definition, that a virtual function included in the read class definition belongs to the class defined by the read class definition, and (3) a second determining unit for (a) provisionally determining, when a base class is included in the read class definition, that a virtual function determined to belong to the base class belongs to the class defined in the read class definition, (b) judging whether a virtual function included in the read class definition is identical to the provisionally determined virtual function, and (c) if the virtual functions are identical, determining that the virtual function included in the read class definition is to override the provisionally determined virtual function, and extracting the provisionally determined virtual function as an overridden function;

an optimization information attaching means for attaching optimization information showing an extracted overridden function to the source program; and an overridden judging means for judging whether an virtual function identified by the function name in the call instruction is an overridden function, using the optimization information attached to the source program; and wherein the generating means generates the executable instruction when the overridden judging means judges that the virtual function is an overridden function.

11. The program conversion apparatus of claim 9, generating an executable program from the source program via an intermediate program, wherein:

each class definition in the source program stored in the storage means includes, when a defined class inherits another class, a base class showing another class, and the judging means includes:

a overridden function extracting means for reading all class definitions included in the source program, and extracting overridden virtual functions by using the read class definitions, the overridden function extracting means including:

(1) a reading/judging unit for reading a class definition included in the source program, and judging whether the read class definition includes a base class;

(2) a first determining unit for determining, when a base class is not included in the read class definition, that a virtual function included in the read class definition belongs to the class defined by the read class definition;

a second determining unit for (a) provisionally determining, when a base class is included in the read class definition, that a virtual function determined to belong to the base class belongs to the class defined in the read class definition, (b) judging whether a virtual function included in the read class definition is identical to the provisionally determined virtual function, and (c) if the virtual functions are identical, determining that the virtual function included in the read class definition is to override the provisionally determined virtual function, and extracting the provisionally determined virtual function as an overridden function;

an intermediate generating means for generating, from the call instruction included in the source program, an intermediate call instruction having a function name; and an intermediate judging means for judging whether a virtual function identified by the function name in the generated intermediate call instruction is an overridden function; and wherein the generating means generates the executable instruction when the intermediate judging means judges that the virtual function is an overridden function.

12. A program conversion method used in a program conversion apparatus that generates at least one executable instruction from a source program written in an object-orientated programming language, and includes a storage means that stores the source program including a plurality of class definitions and a call instruction having a function name, wherein each class definition defines a class, an inheritance relationship between the class and another class, and a virtual function belonging to the class and identified by the function name, and only one of the virtual functions defined in the plurality of class definitions is executed when the call instruction is executed, and the program conversion method comprises:

a judging step judging whether a single virtual function from the virtual functions can be determined as the virtual function identified by the function name in the call instruction, judgement performed by referring to the source program without executing the call instruction; and a generating step generating, when a single function is determined, an executable instruction for calling directly an executable instruction group corresponding to the single virtual function.

13. A computer-readable recording medium storing a program conversion program used in a computer that generates at least one executable instruction from a source program written in an object-orientated programming language, and includes a storage means that stores the source program including a plurality of class definitions and a call instruction having a function name, wherein:

each class definition defines a class, an inheritance relationship between the class and another class, and a virtual function belonging to the class and identified by the function name, only one of the virtual functions defined in the plurality of class definitions being executed when the call instruction is executed; and the program conversion program comprises:

a judging step judging whether a single virtual function from the virtual functions can be determined as the virtual function identified by the function name in the call instruction, judgement performed by referring to the source program without executing the call instruction; and a generating step generating, when a single function is determined, an executable instruction for calling directly an executable instruction group corresponding to the single virtual function.

14. The computer-readable recording medium of claim 13, wherein:

the judging step judges whether a single virtual function can be determined by using the class definitions to judge whether a virtual function identified by the function name in the call instruction belongs to a class that is not inherited by another class; and the generating step generates the executable instruction when the virtual function belongs to a class that is not inherited by another class.

15. The computer-readable recording medium of claim 14, wherein:

when a class inherits another class, a class definition in the source program stored in the storage means includes the other class, the other class being a base class; and the judging step includes:

a class extracting step reading all class definitions included in the source program, extracting classes from the read class definitions, and storing the extracted classes;

an inheritance relationship extracting step reading all class definitions included in the source program, extracting base classes from the read class definitions, and storing the extracted base classes;

an inheritance relationship analyzing step extracting classes from the classes stored in the class extracting step, excluding the base classes stored in the inheritance relationship extracting step, and storing the extracted classes;

an optimization information attaching step attaching optimization information to the source program stored by the storage means when the source program includes a class definition including a class stored in the inheritance relationship analyzing step; and a class judging step judging, using the optimization information attached to the source program, whether a virtual function identified by the function name in the call instruction belongs to a class that is not inherited by another class.

16. The computer-readable recording medium of claim 15, wherein:

the optimization information attaching step attaches optimization information to the source program so as to correspond to class definitions that define classes stored by the inheritance relationship analyzing step.

17. The computer-readable recording medium of claim 14, wherein:

the computer generates an executable program from the source program by first producing an intermediate program, when a class defined by a class definition in the source program inherits another class, the class definition includes a base class showing the other class, and the judging step includes:

a class extracting step reading all class definitions included in the source program, and extracting classes from the read class definitions;

an inheritance relationship extracting step reading all class definitions included in the source program, and extracting base classes from the read class definitions;

an inheritance relationship analyzing step extracting classes from the classes extracted by the class extracting step, excluding the base classes extracted by the inheritance relationship extracting step, an intermediate generating step generating, from the call instruction included in the source program, an intermediate call instruction having a function name; and an intermediate judging step judging whether the virtual function called by the generated intermediate call instruction belongs to a class extracted by the inheritance relationship analyzing step; and wherein the generating step generates the executable instruction when the intermediate judging step judges that the virtual function belongs to an extracted class.

18. The computer-readable recording medium of claim 13, wherein:

the judging step judges whether a single virtual function can be determined by using a class definition included in the source program to judge whether a virtual function identified by the function name in the call instruction is overridden; and the generating step generates the executable instruction when the judging step judges that the virtual function is not overridden.

19. The computer-readable recording medium of claim 18, wherein:

when a class defined by a class definition in the source program inherits another class, the class definition includes a base class showing the other class, and the judging step includes:

an overridden function extracting step reading all class definitions included in the source program, and extracting overridden virtual functions by using the read class definitions, the overridden function extracting step including:

(1) a reading/judging step reading a class definition included in the source program, and judging whether the read class definition includes a base class, (2) a first determining step determining, when a base class is not included in the read class definition, that a virtual function included in the read class definition belongs to the class defined by the read class definition, and (3) a second determining step (a) provisionally determining, when a base class is included in the read class definition, that a virtual function determined to belong to the base class belongs to the class defined in the read class definition, (b) judging whether a virtual function included in the read class definition is identical to the provisionally determined virtual function, and (c) if the virtual functions are identical, determining that the virtual function included in the read class definition is to override the provisionally determined virtual function, and extracting the provisionally determined virtual function as an overridden function;

an optimization information attaching step attaching optimization information showing an extracted overridden function to the source program; and an overridden judging step judging whether an virtual function identified by the function name in the call instruction is an overridden function, using the optimization information attached to the source program; and wherein the generating step generates the executable instruction when the overridden judging step judges that the virtual function is an overridden function.

20. The computer-readable recording medium of claim 18, generating an executable program from the source program via an intermediate program, wherein:

each class definition in the source program stored in the storage means includes, when a defined class inherits another class, a base class showing another class, and the judging step includes:

a overridden function extracting step reading all class definitions included in the source program, and extracting overridden virtual functions by using the read class definitions, the overridden function extracting step including:

(1) a reading/judging step reading a class definition included in the source program, and judging whether the read class definition includes a base class;

(2) a first determining step determining, when a base class is not included in the read class definition, that a virtual function included in the read class definition belongs to the class defined by the read class definition;

a second determining step (a) provisionally determining, when a base class is included in the read class definition, that a virtual function determined to belong to the base class belongs to the class defined in the read class definition, (b) judging whether a virtual function included in the read class definition is identical to the provisionally determined virtual function, and (c) if the virtual functions are identical, determining that the virtual function included in the read class definition is to override the provisionally determined virtual function, and extracting the provisionally determined virtual function as an overridden function;

an intermediate generating step generating, from the call instruction included in the source program, an intermediate call instruction having a function name; and an intermediate judging step judging whether a virtual function identified by the function name in the generated intermediate call instruction is an overridden function; and wherein the generating step generates the executable instruction when the intermediate judging step judges that the virtual function is an overridden function.

* * * * *